United States Patent [19]

Sako et al.

[11] Patent Number: 5,099,446

[45] Date of Patent: Mar. 24, 1992

[54] DATA TRANSFER APPARATUS AND DATA TRANSFER SYSTEM

[75] Inventors: Kazuya Sako; Masaaki Nagami; Takeshi Chono; Shoji Fujimoto; Katsumaro Yasu, all of Kobe, Japan

[73] Assignee: Fujitsu Ten Limited, Hyogo, Japan

[21] Appl. No.: 295,949

[22] PCT Filed: Apr. 28, 1988

[86] PCT No.: PCT/JP88/00431

§ 371 Date: Dec. 28, 1988

§ 102(e) Date: Dec. 28, 1988

[87] PCT Pub. No.: WO88/08606

PCT Pub. Date: Nov. 3, 1988

[30] Foreign Application Priority Data

| Apr. 28, 1987 | [JP] | Japan | 62-105536 |
| May 14, 1987 | [JP] | Japan | 62-118285 |
| May 30, 1987 | [JP] | Japan | 62-135387 |
| Jul. 28, 1987 | [JP] | Japan | 62-187996 |
| Aug. 26, 1987 | [JP] | Japan | 62-211585 |
| Dec. 1, 1987 | [JP] | Japan | 62-183890 |
| Dec. 1, 1987 | [JP] | Japan | 62-304898 |

[51] Int. Cl.⁵ .................... G06F 7/38
[52] U.S. Cl. .................... 364/748
[58] Field of Search .................... 364/748

[56] References Cited

U.S. PATENT DOCUMENTS

| 3,829,673 | 8/1974 | Bouton, Jr. et al. | 364/748 |
| 4,208,722 | 6/1980 | Rasala et al. | 364/748 |
| 4,386,413 | 5/1983 | Vignes et al. | 364/748 |
| 4,758,975 | 7/1988 | Omoda et al. | 364/748 |
| 4,760,551 | 7/1988 | Yokomizo et al. | 364/748 |
| 4,796,217 | 1/1989 | Takahashi et al. | 364/748 |
| 4,799,182 | 1/1989 | Marwood | 364/748 |

Primary Examiner—Salvatore Cangialosi
Attorney, Agent, or Firm—Wenderoth, Lind & Ponack

[57] ABSTRACT

When transferring data between plural electronic apparatus, the apparatus are composed so as to transfer floating decimal point data possessing the mantissa portion and exponent portion. Therefore, when transferring fixed decimal point data not having such divisions, a vacant time is left in the composition responsible for transfer, and the number of channels of the input/output data is limited unreasonably. To solve such problems, an apparatus it is designed to store, as well as to input and output, the fixed decimal point data also in the exponent portion storage region other than the mantissa portion storage region in the apparatus for storing fixed decimal point data.

6 Claims, 47 Drawing Sheets

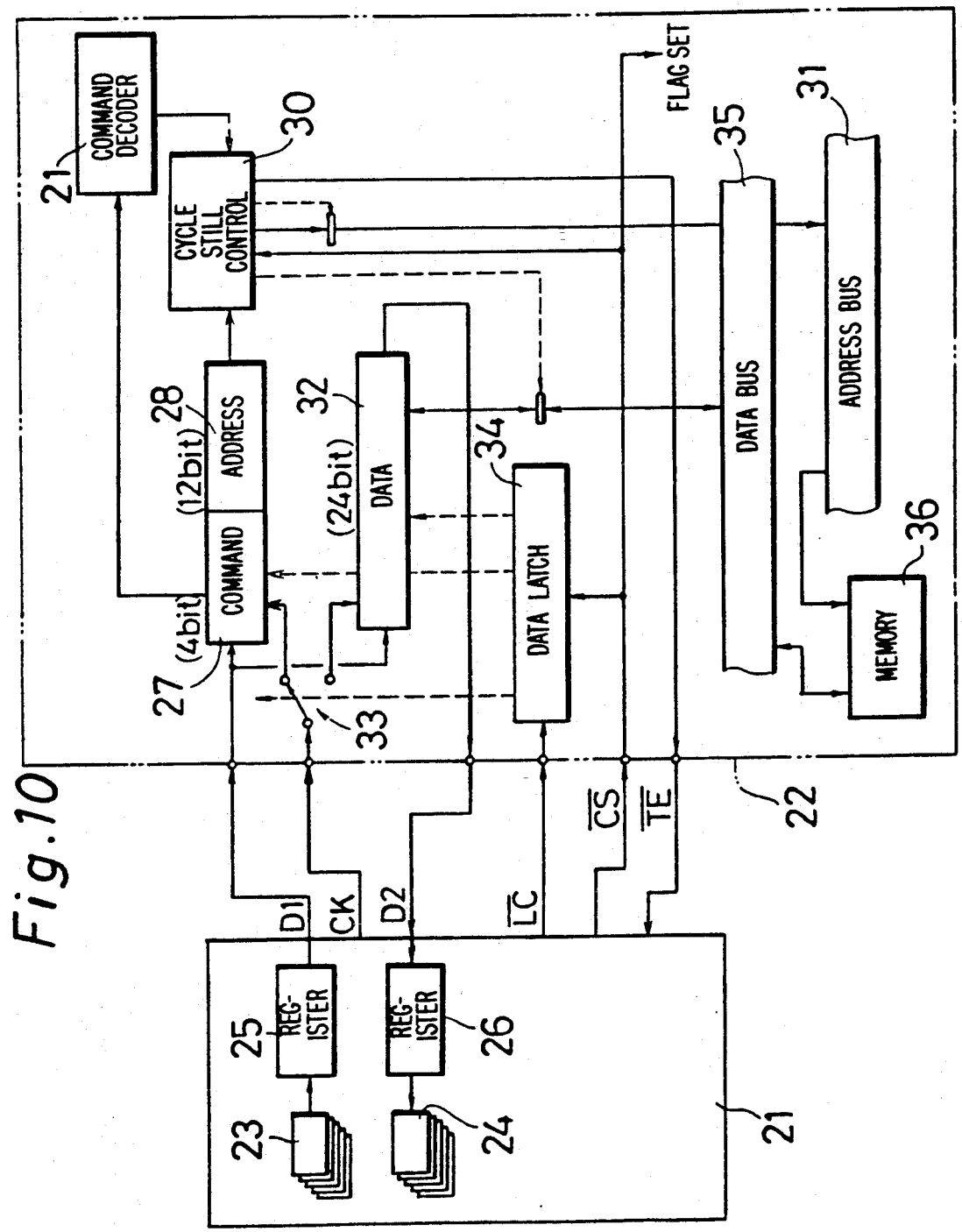

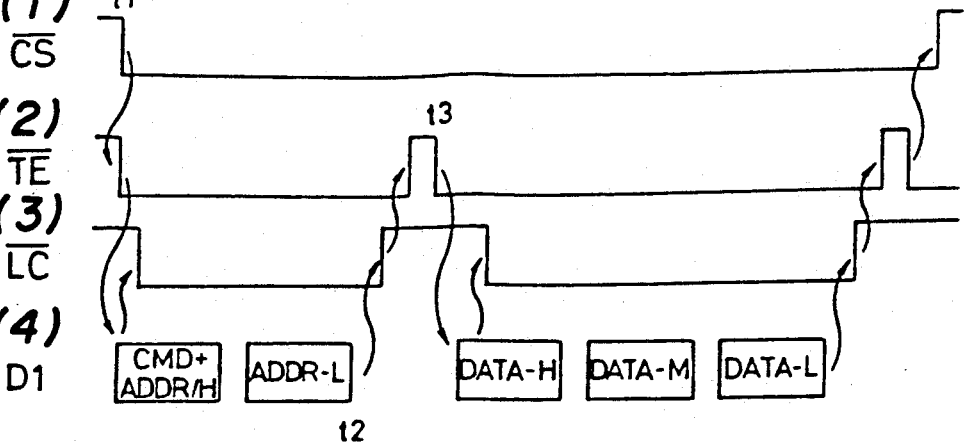
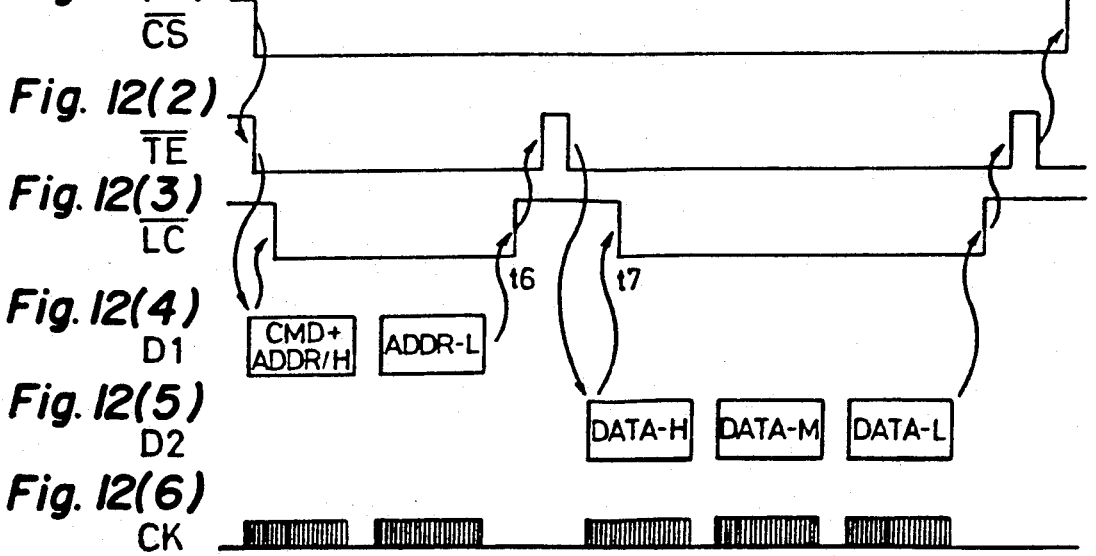

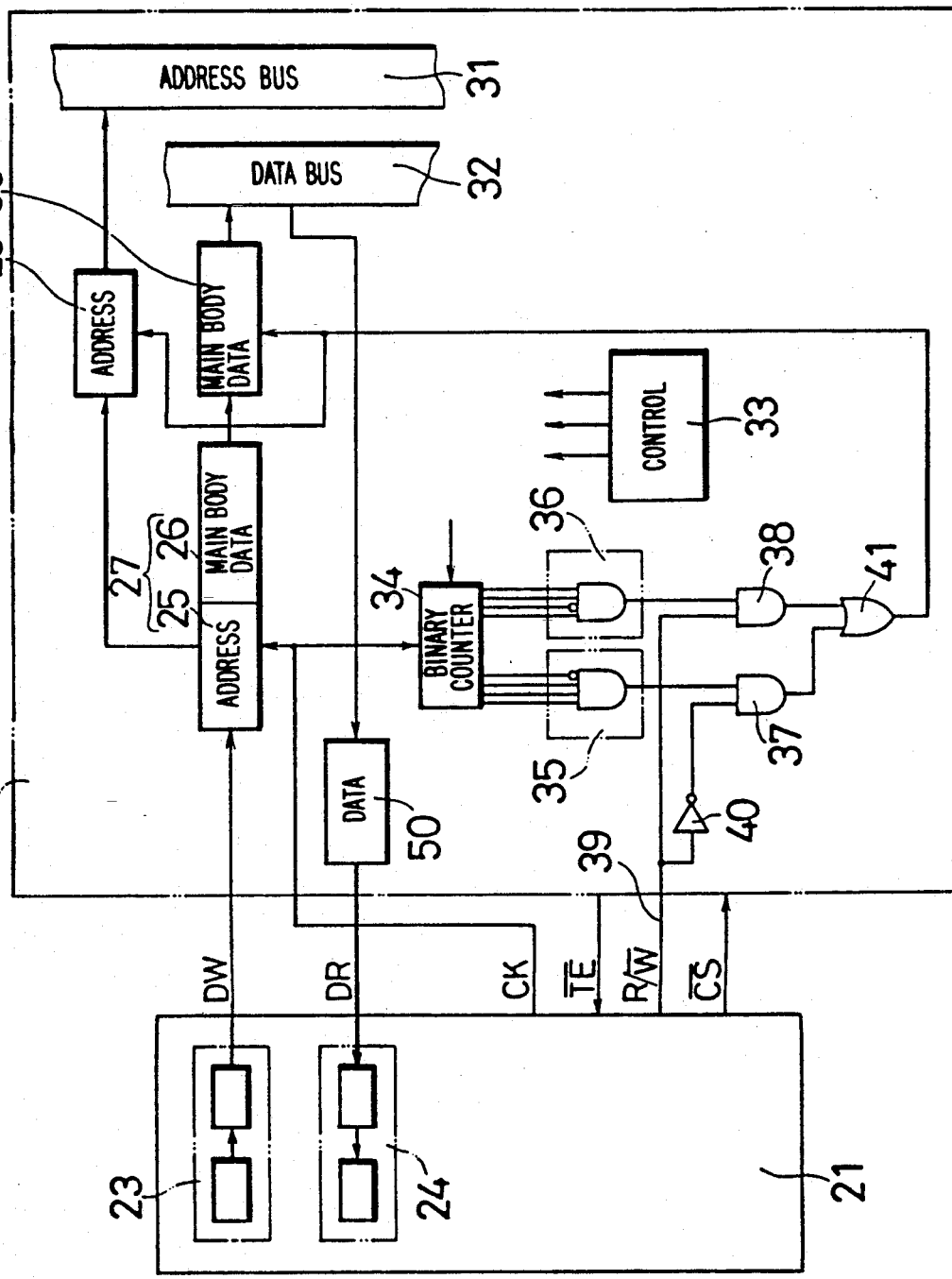

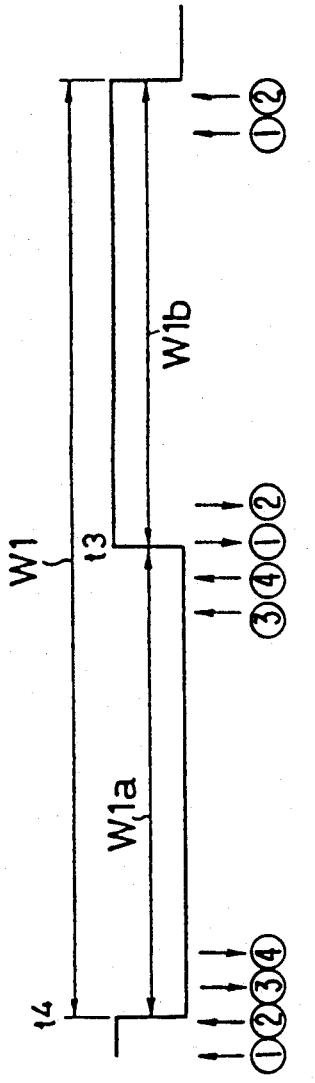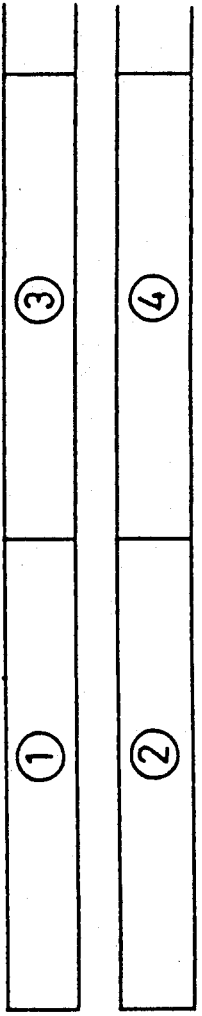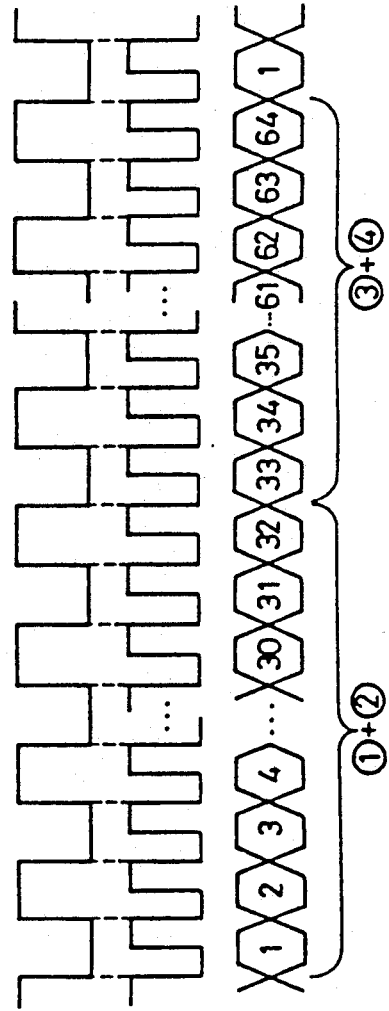

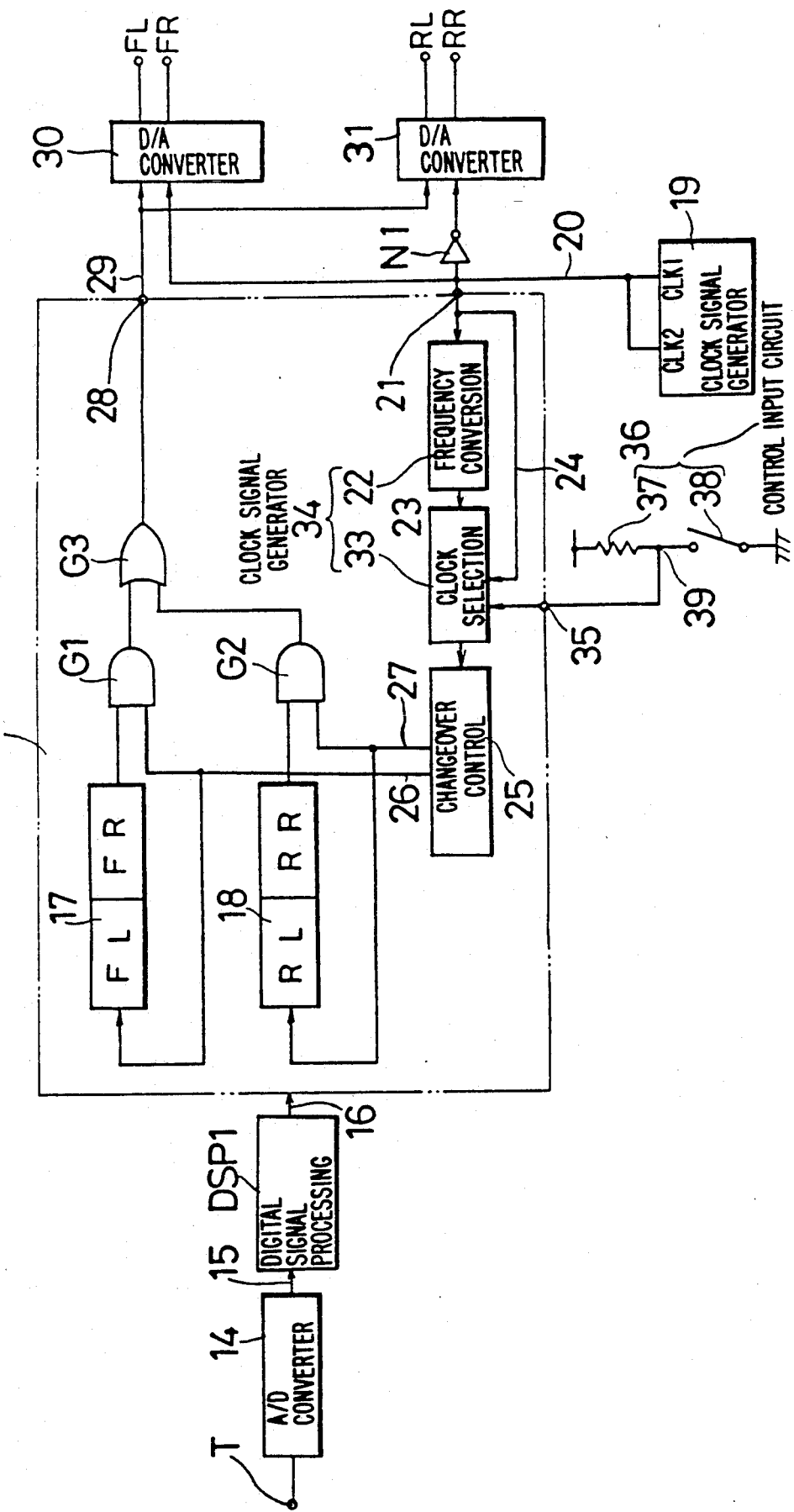

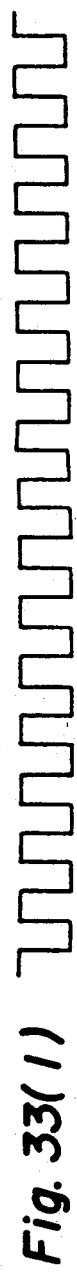 
Fig. 33(1)
Fig. 33(2)

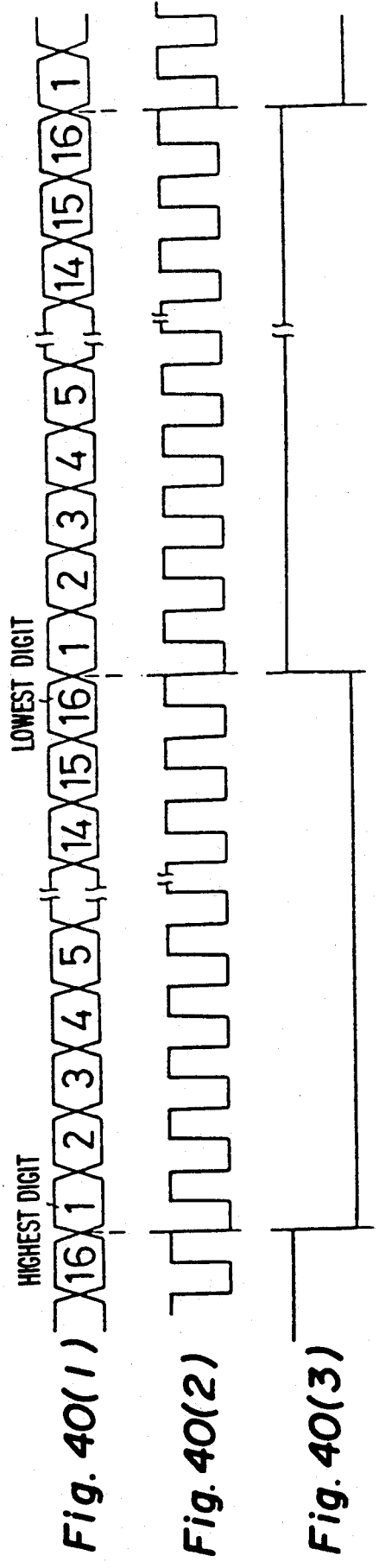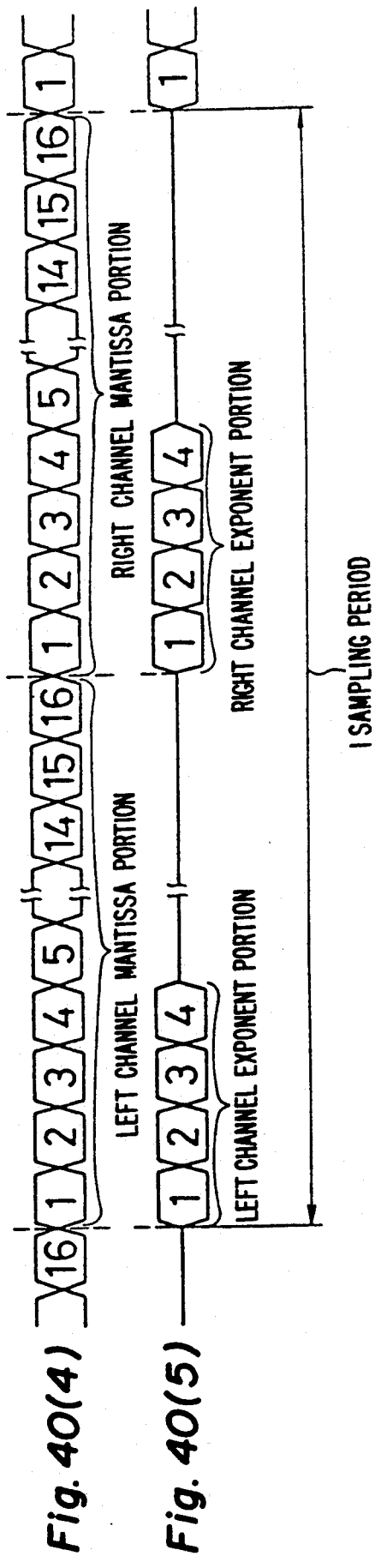

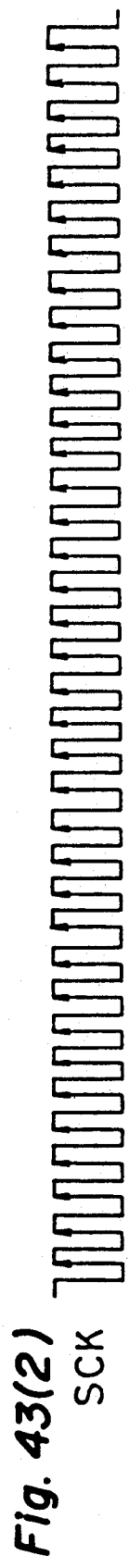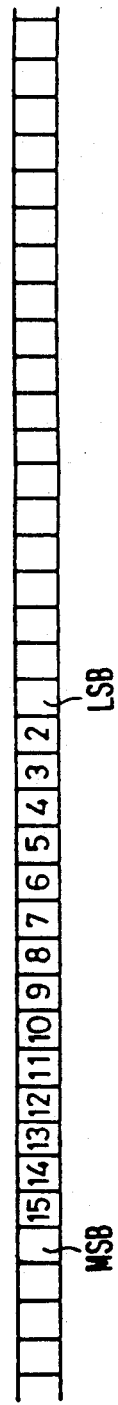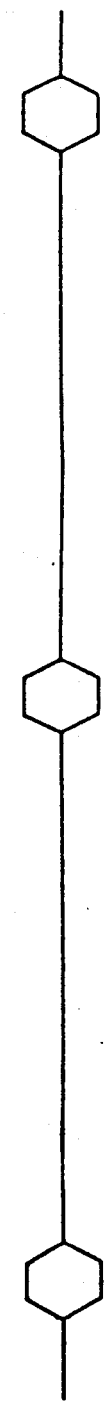
Fig. 43(1) SYNC
Fig. 43(2) SCK
Fig. 43(3)
Fig. 43(4)

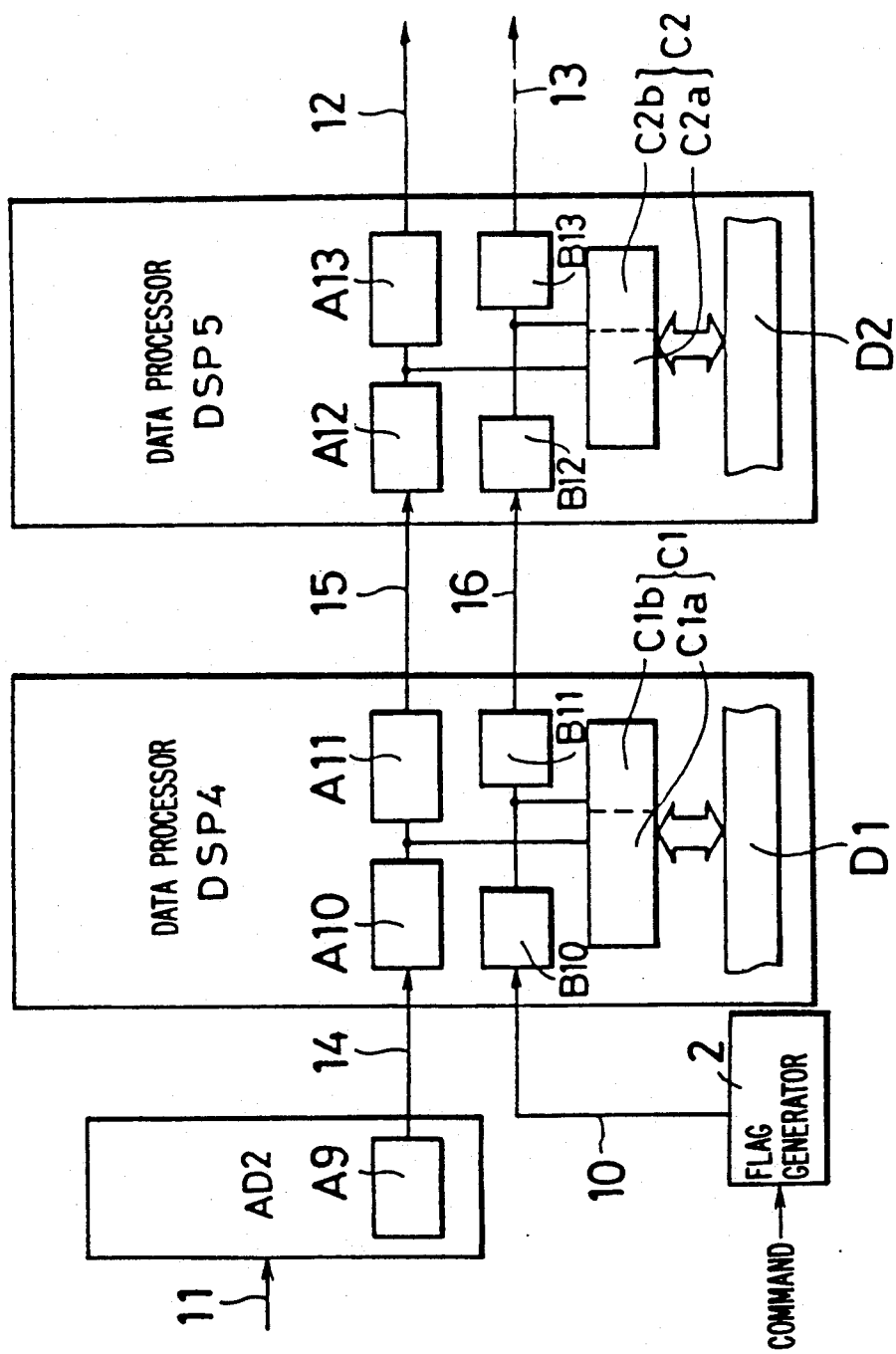
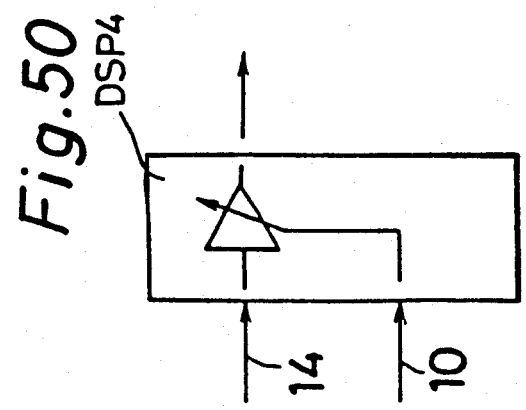
Fig.51
Fig.50

Figures 53(1), 53(2), 53(3), 53(4), 53(5), 53(6), 53(7):
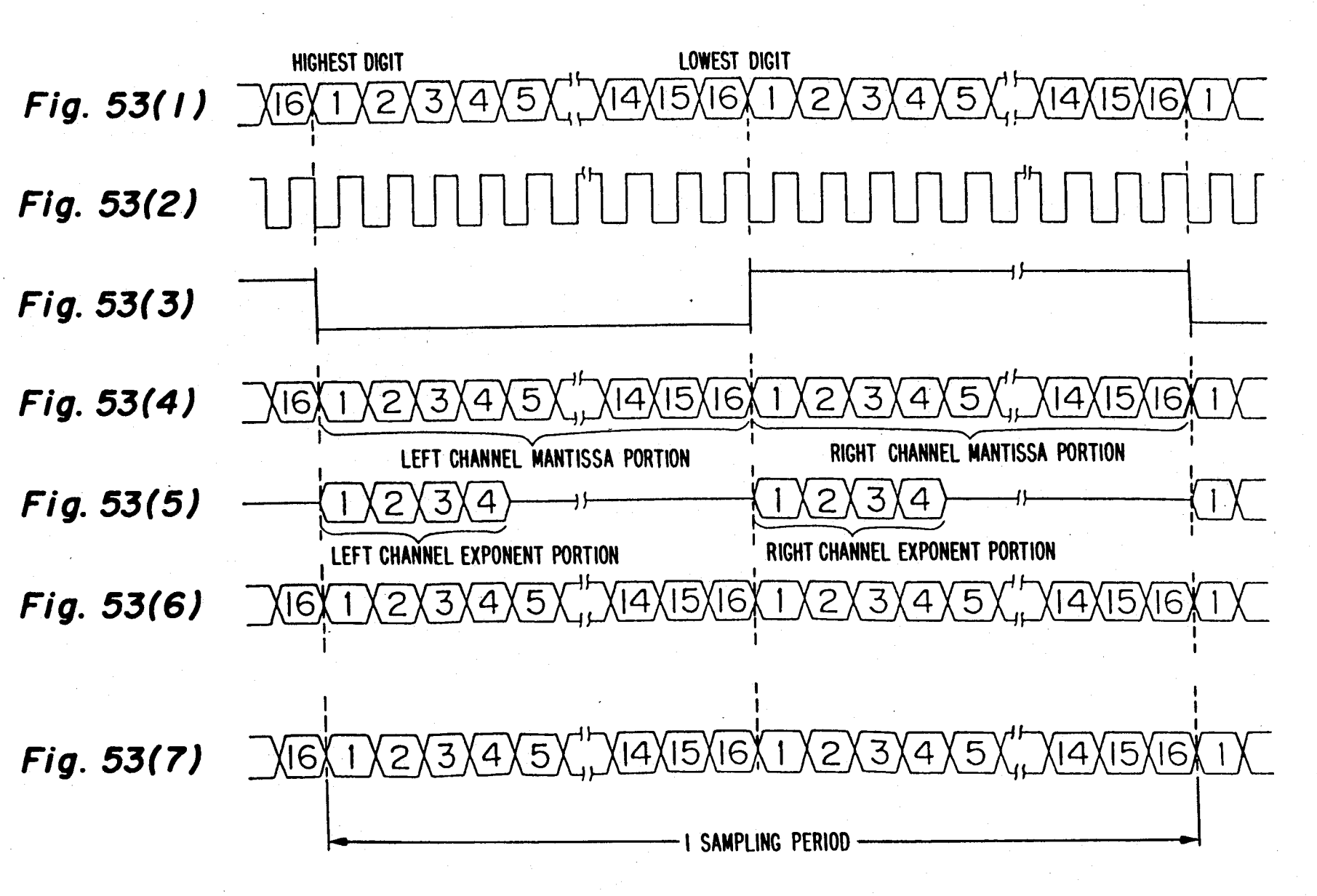

HIGHEST DIGIT, LOWEST DIGIT
LEFT CHANNEL MANTISSA PORTION
LEFT CHANNEL EXPONENT PORTION
RIGHT CHANNEL MANTISSA PORTION
RIGHT CHANNEL EXPONENT PORTION
1 SAMPLING PERIOD

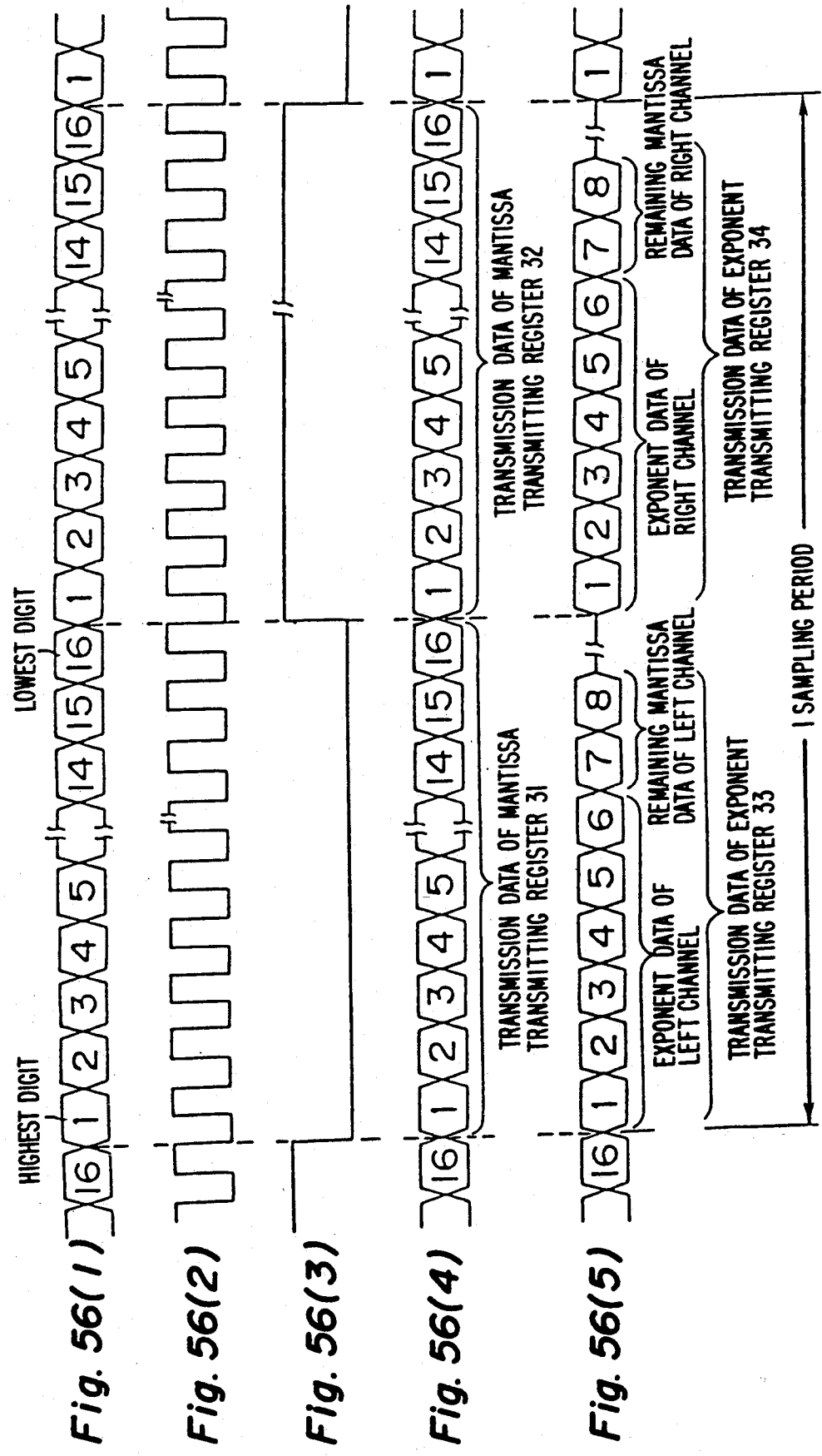

5,099,446

DATA TRANSFER APPARATUS AND DATA TRANSFER SYSTEM

FIELD OF THE INVENTION

The present invention relates to an apparatus for transfer of digital data and a system thereof.

BACKGROUND OF THE INVENTION

FIG. 1 is a block diagram showing a configuration of a conventional acoustic signal processor 1. The acoustic signal from an acoustic reproducing apparatus which is fed from an input terminal 3 and is converted into a digital value in an analog/digital converter 4 is applied in a digital signal processor 5 which is realized, for example, by a large scale integration circuit, and is subjected to arithmetic processing such as tone control. The acoustic signal data from the analog/digital converter 4 is fixed decimal point data, as shown in FIG. 2 (1), composed of a total of 32 bits, 16 bits each for right and left channels, per sampling period. In the digital signal processor 5, this 32-bit fixed decimal point data is converted into floating decimal point data of total 40 bits total as shown in FIG. 2 (2), composed of a 16-bit, mantissa portion (the portion a as expressed in the formula $a \times 2^b$) and 4-bit exponent portion (portion b in the above formula) for each of the right and left channels per sampling period in order to enhance the dynamic range or S/N ratio. This floating decimal point data is transferred to a digital signal processor 7 through line 6 for another arithmetic processing. In this digital signal processor 7, the acoustic signal is converted again into fixed decimal point data of 32 bits per sampling period, and is delivered from an output terminal 10 by way of a digital/analog converter 9.

In such acoustic signal processing, at the analog/digital converter 4 and digital/analog converter 9, 32-bit data is processed per sampling period, and at the digital signal processors 5 and 7, 40-bit data processing is carried out. Accordingly, in the analog/digital converter 4 and digital/analog converter 9, and in the digital signal processors 5 and 7, it is necessary to install respective clock signal generators 11 and 12, corresponding to the number of bits to be processed per sampling period, and the structure is thus complicated.

In other prior art, hence, two bit number converters are provided, and the 32-bit fixed decimal point data is converted into 40-bit floating decimal point data at the input side of the digital signal processor in the front stage, while the 40-bit floating decimal point data is converted into 32-bit fixed decimal point data at the output side of the digital signal processor in the rear stage, thereby selecting the clock ,frequency so as to generate 40 pulses per sampling period, and processing on the basis of the clock pulses from one clock generator.

In this conventional example, however, the bit number converting circuit is needed, and the structure thus cannot be simplified.

It is hence a primary object of the invention to present a data transfer apparatus and system which is simplified in structure, capable of arithmetically processing and transferring fixed decimal point data and floating decimal point data differing in the number of bits on the basis of a common clock signal.

It is another object of the invention to present a data transfer apparatus for eliminating unnecessary structure, reducing cost, and realizing advanced data processing, by setting up a different structure for transfer of fixed decimal point data, when transferring fixed decimal point data, by using the register for exponent portion transfer in the floating decimal point data.

It is a different object of the invention to present a data transfer apparatus capable of using effectively the register for mantissa portion transfer and the register for exponent portion transfer in floating decimal point data, for processing of floating decimal point data and fixed decimal point data, by setting these registers in the same bit length.

It is a further different object of the invention to present a data transfer apparatus capable of arithmetically processing and transferring on the basis of a common clock signal, without using particular converting circuitry, and without deteriorating the precision, if the bit length of the mantissa portion in the floating decimal point data to be arithmetically processed is longer than the bit length of the fixed decimal point data handled externally.

SUMMARY OF THE INVENTION

The invention provides a data transfer apparatus comprising:

a mantissa portion register for storing the mantissa portion of one or Plural sets of floating decimal point data, an exponent portion register for storing the exponent portion of the floating decimal point data, and a terminal for inputting/outputting individually the mantissa portion and exponent portion of the floating decimal point data, in which a clock signal from a clock signal generating source is commonly applied to the mantissa portion register and exponent portion register, and the two registers operate as being controlled synchronously.

The invention provides a data transfer system between data processors comprising a mantissa portion register and an exponent portion register for respectively storing the mantissa portion and exponent portion of floating decimal point data, in which the mantissa portion of the floating decimal point data is transferred serially and, the exponent portion is in parallel.

The invention provides a data transfer apparatus for arithmetically processing a floating decimal point data comprising:

a mantissa portion register and an exponent portion register for respectively storing a mantissa portion and an exponent portion of the floating decimal point data, in which the data can be input/output or internally set individually in the mantissa portion register and exponent portion register.

The invention provides a data transfer apparatus comprising an exponent portion register and a mantissa portion register for respectively storing an exponent portion of floating decimal point data and a mantissa portion in the same format as in the fixed decimal point data, in which the fixed decimal point data is stored in the mantissa portion register, and the other data is stored to input in the exponent portion register when fixed decimal point data is input.

The invention provides a data transfer apparatus comprising a mantissa portion register for storing a mantissa portion of floating decimal point data or fixed decimal point data, an exponent portion register for selectively storing an exponent portion of the floating decimal point data or the other arbitrary data and possessing the same bit length as the mantissa portion register, and a terminal for individually inputting or outputting contents in the mantissa portion register and exponent portion register, in which a clock signal from a clock signal generating source is commonly applied to the mantissa portion register and exponent portion register, and both registers are synchronously controlled to operate.

In order to achieve the above objects, this invention provides a data transfer apparatus comprising:

a mantissa portion register for storing part of a mantissa portion of floating decimal point data, an exponent portion register for storing an exponent portion of the floating decimal point data and a remaining part of the mantissa portion, and a terminal for individually inputting or outputting contents in the mantissa portion register and exponent portion register, in which a clock signal from a clock signal generating source is commonly applied to the mantissa portion register and exponent portion register, and both registers are synchronously controlled to operate.

The invention provides a data transfer apparatus comprising:

a mantissa portion register for sequentially storing the mantissa portions of plural sets of floating decimal point data, an exponent portion register for sequentially storing the exponent portions of the above floating decimal point data, switching means for connecting the mantissa portion register and exponent portion register to the terminal for transmitting or receiving by changing over, and control means for controlling the switching format of the switching means.

According to the invention, in one or plural sets of floating decimal point data such as sound signals, for example, the mantissa portion of the data is fed from the input terminal provided in correspondence to the mantissa portion register, and is stored in this register. The exponent portion of the data is fed from the input terminal provided in correspondence to the exponent portion register, and is stored in this register. To the mantissa portion register and exponent portion register, a clock signal from the clock signal generating source is commonly applied, and both registers are synchronously controlled to operate arithmetically, and the results of calculation are delivered to output, terminals individually provided for each register.

According to the invention, in the data transfer system between data processors having the mantissa portion register and exponent portion register for storing the mantissa portion and exponent portion of floating decimal point data, the mantissa portion of the floating decimal point data is serially transferred in, while the exponent portion of the floating decimal point is transferred parallel. Therefore, transfer of the fixed decimal point data of the same format as the mantissa portion of the floating decimal point data, for example, can be executed by using the same synchronous signal as in the floating decimal point data by using the same mantissa portion register, so that the data of either fixed decimal point data or floating decimal point data may be transferred in a simple structure.

Yet, according to the invention the since the mantissa portion register for storing the mantissa portion of the floating decimal point data and the exponent portion register for storing the exponent portion are separately provided, the individual data may be input/output or internally set in these registers, and therefore, for instance, sound signals of two channels can be arithmetically processed in the floating decimal point data and converted into fixed decimal point data to produce sound signals of four channels, and these sound signals of four channels can be stored in the mantissa register, and the sound signals for the superwoofer can be similarly produced and stored in the exponent portion register. By controlling the input and output by synchronizing the mantissa portion register and exponent portion register by, for example, a common clock signal, the sound signal data of four channels and the sound signal data for the superwoofer can be processed and delivered in the same processor. Thus, eliminating the waste present in the conventional structure, the cost can be reduced.

The data transfer apparatus according to the invention contains the mantissa portion register for storing the mantissa portion of floating decimal point data, and the exponent portion register for storing the exponent portion, so that the individual data may be entered in or delivered from these registers. Therefore, when entering fixed decimal point data having the same format as the mantissa portion of the floating decimal point data, the fixed decimal point data to be entered is stored in the mantissa portion register, and other data can be entered and stored in the exponent portion register.

According to the invention, the exponent portion register and mantissa portion register are set in the same bit length, and the exponent portion of the floating decimal point data or other arbitrary data can be selectively stored in the exponent portion register, so that arithmetic processing or transfer operation may be carried out by using a common clock signal, and when using the transfer apparatus in arithmetic processing or transfer of floating decimal point data, the mantissa portion register may function as the means for storing the mantissa portion of the floating decimal point data, while the exponent portion register may function as the means for storing the exponent portion of the floating decimal point data, or when using the transfer apparatus in arithmetic processing or transfer of fixed decimal point data, the mantissa portion register may function as the means for storing the fixed decimal point data, while the exponent portion register can store other arbitrary data, such as other fixed decimal point data.

Therefore, when using the transfer apparatus in arithmetic processing or transfer of fixed decimal point data, twice as much data as in the prior art can be arithmetically processed or transferred, and the common processor can be effectively used in processing of floating decimal point data and fixed decimal point data.

Because the invention comprises a mantissa portion register for storing part (n bits) of the mantissa portion of floating decimal point data composed of, for example, (n+$\Delta$n) bits, and an exponent portion register for storing the exponent portion (for example, m bits: m<n) of the floating decimal point data and the remaining portion ($\Delta$n bits) of the mantissa portion, if n-bit fixed decimal point data is entered from an external circuit such as analog/digital converter, this n-bit fixed decimal point data is stored in the mantissa portion register, and is coupled with the data (in this case, all 0 data) of the exponent portion data being entered by synchronous control by a common clock signal, and converted into floating decimal point data composed of the mantissa portion of (n+Δn) bits and the exponent portion of m bits to be processed arithmetically.

Further, when transferring (delivering) the floating decimal point data composed of the mantissa portion of (n+Δn) bits and the exponent portion of m bits in this format of floating decimal point data, the n-bit data of the mantissa portion of the floating decimal point data is stored in the mantissa portion register, while the remaining Δn-bit mantissa portion data and m-bit exponent portion data are stored in the exponent portion register. In the mantissa portion register and exponent portion register, consequently, a clock signal from the clock generating source is commonly applied, and the both registers are synchronously controlled, and the data are delivered from the output terminals individually provided for each register.

Furthermore, when transferring the floating decimal point data of the above format as fixed decimal point data, this floating decimal point data is converted into the data (fixed decimal point data) of which the exponent portion is expressed by the mantissa portion of (n+Δn) bits of only 0, and the data of upper n bits is stored in the mantissa portion register, and the remaining lower in bits of the data and the all 0 m bits of the data are stored in the exponent portion register. In the rear stage circuit, for example, the digital/analog converter, only the data of the mantissa portion register is received, and handled as n-bit fixed decimal point data.

Therefore, if the number of bits of the mantissa portion in the floating decimal point data to be processed arithmetically is longer than the bit length of the fixed decimal point data to be handled externally, arithmetic processing and transfer can be carried out on the basis of a common clock signal (n pulse signals per sampling period) without using any particular converting circuit, so that the precision of arithmetic calculation does not deteriorate if a plurality of processors are connected in use.

According to the invention, thus, the mantissa portion register and exponent portion register are selectively connected to the terminal for transmitting or terminal for receiving, by the switching means of which the switching format thereof is controlled by control means. Therefore, a Plurality of received floating decimal data are divided into the mantissa portion and exponent portion by the switching means, and are sequentially stored in the mantissa portion register and exponent portion register. The stored contents in the registers are selectively changed over by the switching means, and are sent out from the output terminal. Therefore, the fixed decimal point data can be transferred to the mantissa portion register for floating decimal point data, and the reverse transfer is also possible. Furthermore, the floating decimal point data stored in the mantissa portion register and exponent portion register may be respectively transferred to the corresponding mantissa portion register and exponent portion register.

BRIEF DESCRIPTION OF THE DRAWINGS

FIG. 10 is a block diagram showing a configuration of an embodiment of this invention;

FIGS. 11 (1)-(5) are timing chart to explain the writing action of the same configuration;

FIGS. 12 (1)-(6) are timing chart to explain the reading action of the same configuration;

FIG. 13 is a block diagram showing a configuration of an embodiment of the invention;

Figure 18:
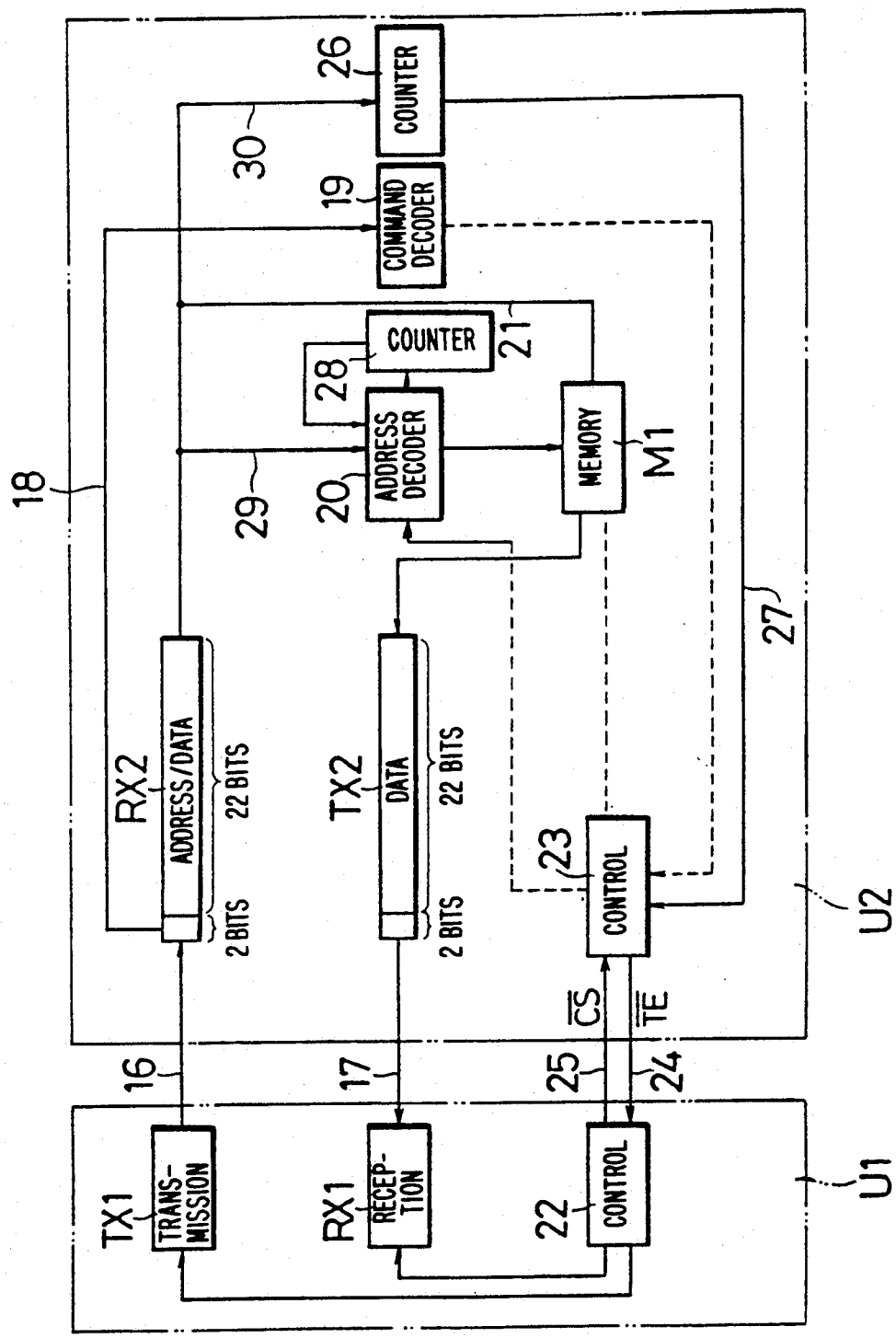
FIG. 18 is a block diagram of an embodiment of the invention.
Figure 20:
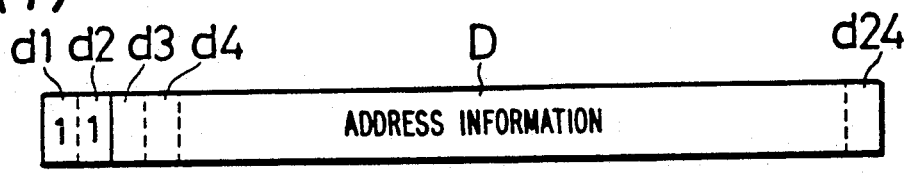
Figure 20:
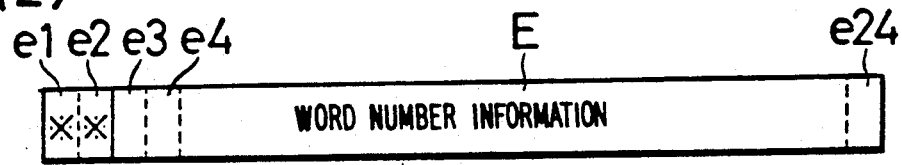
Figure 21:
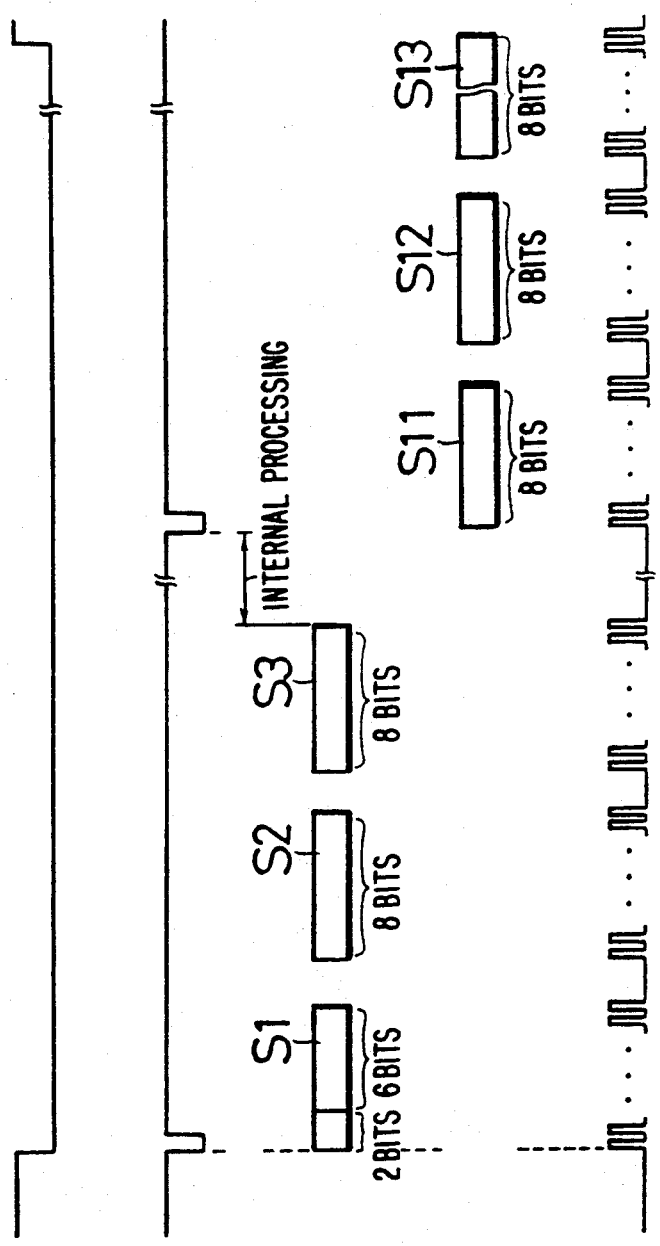
Figure 22:
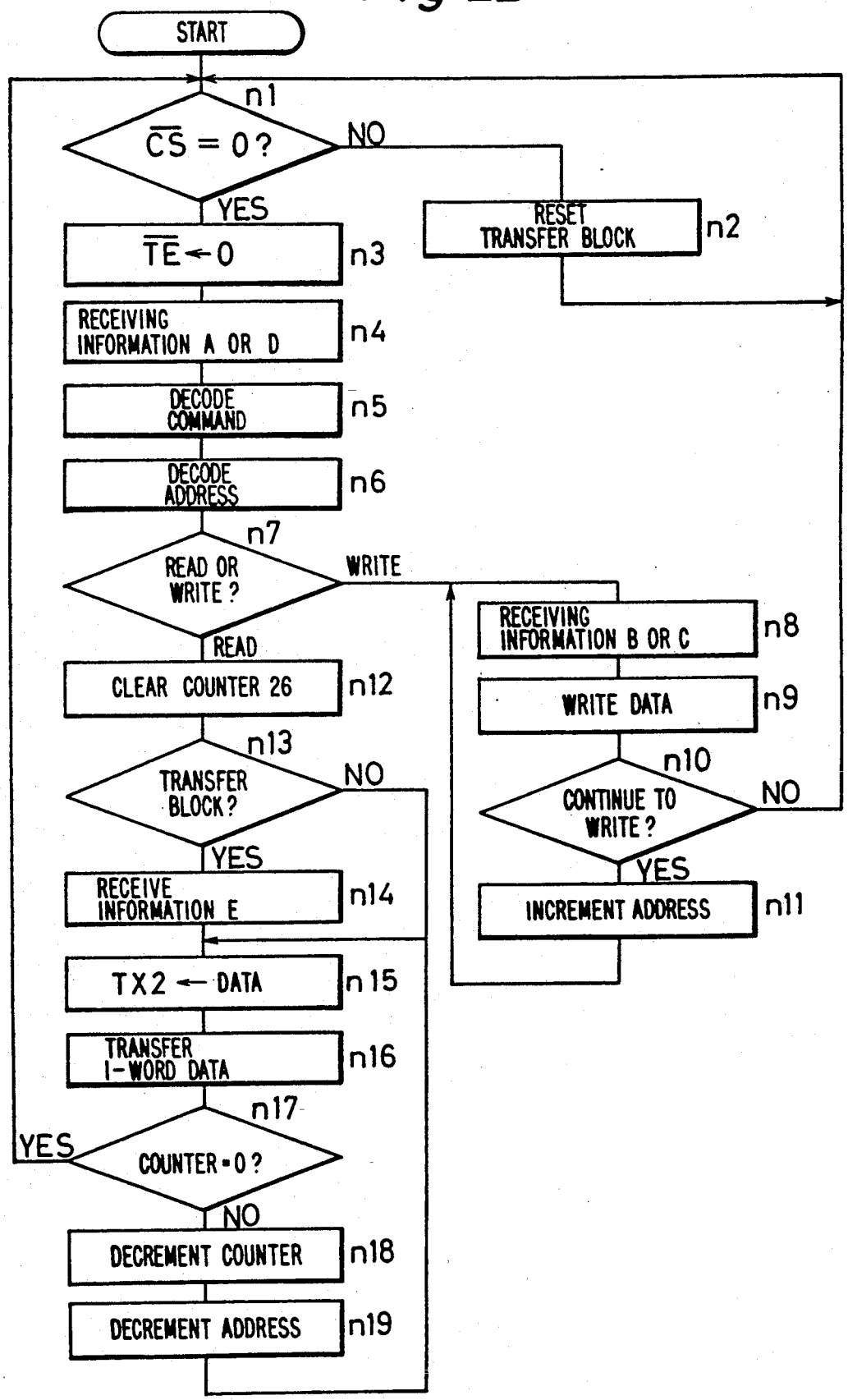
Figure 23:
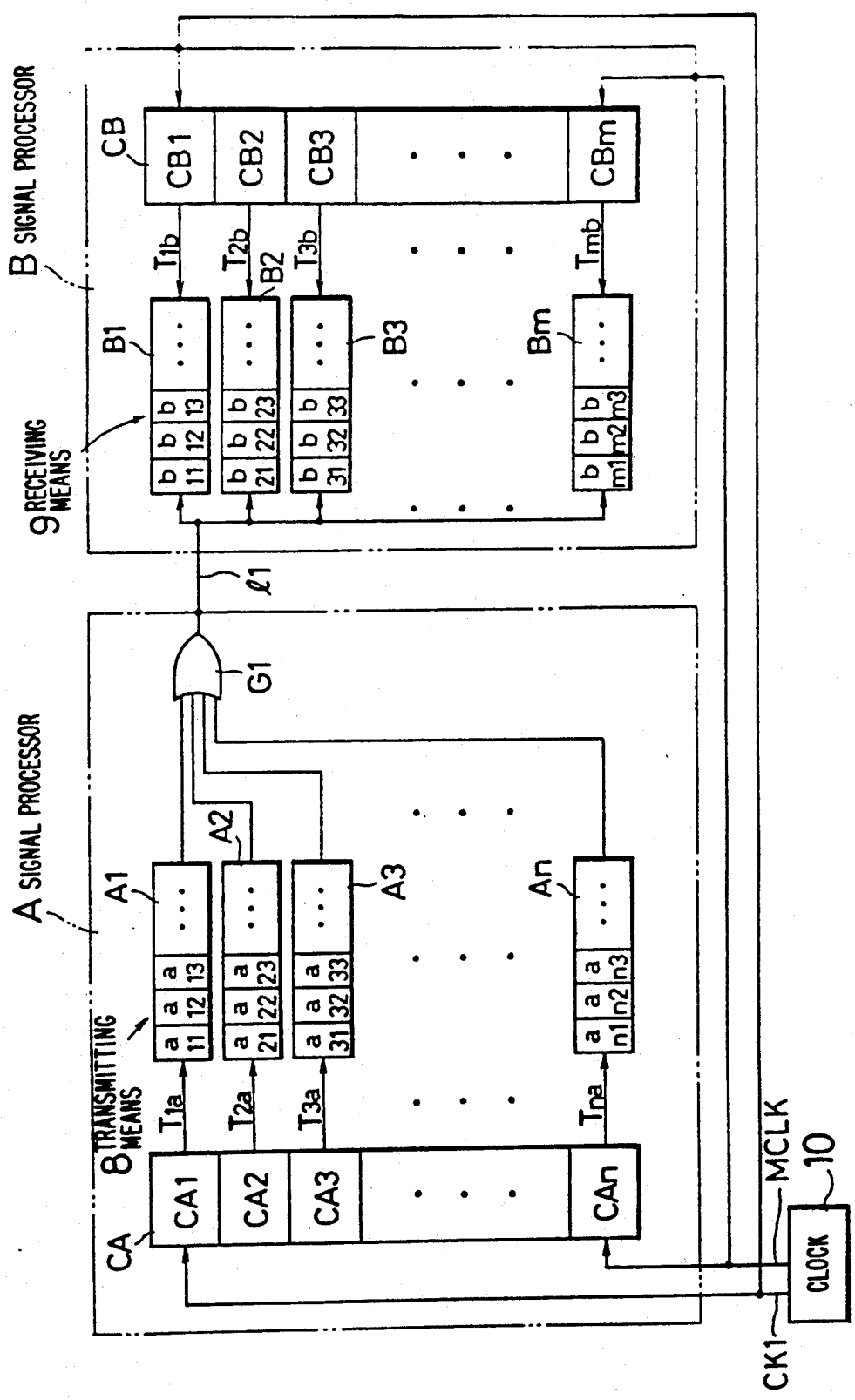
Figure 24:
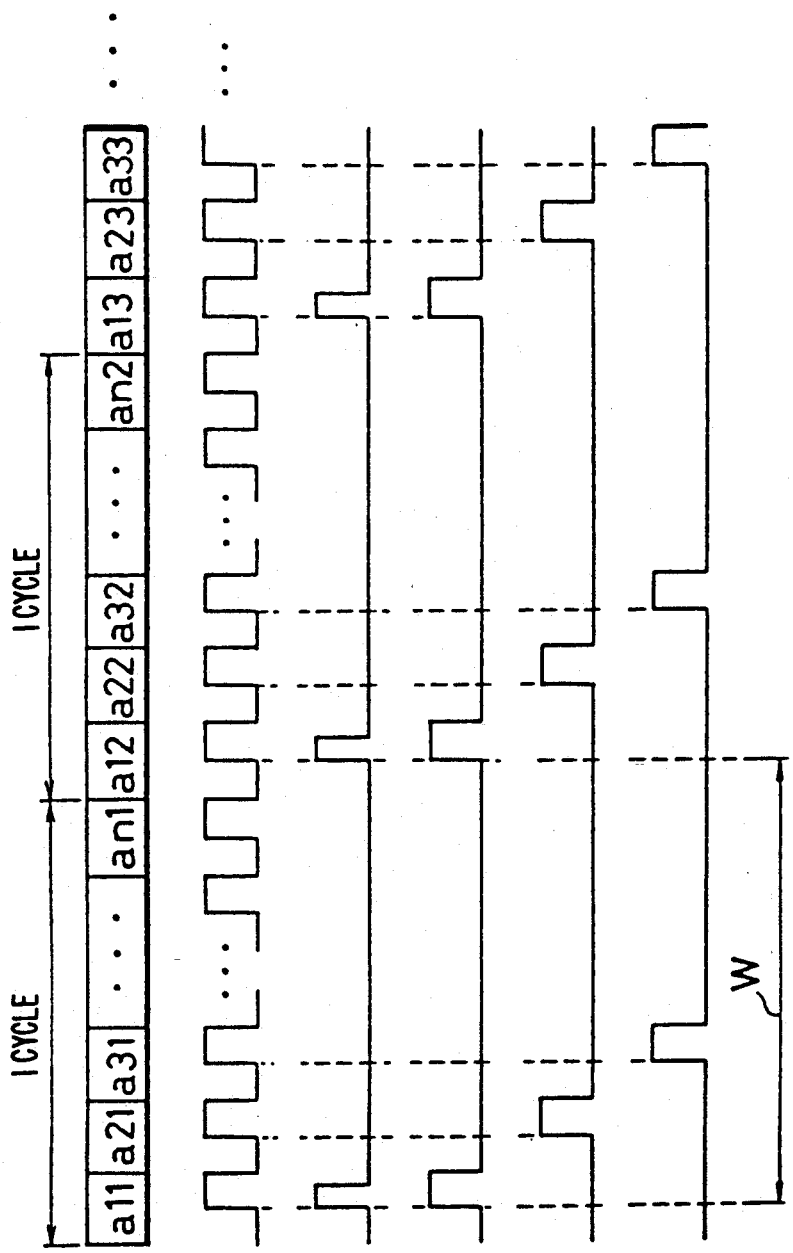
Figure 25:
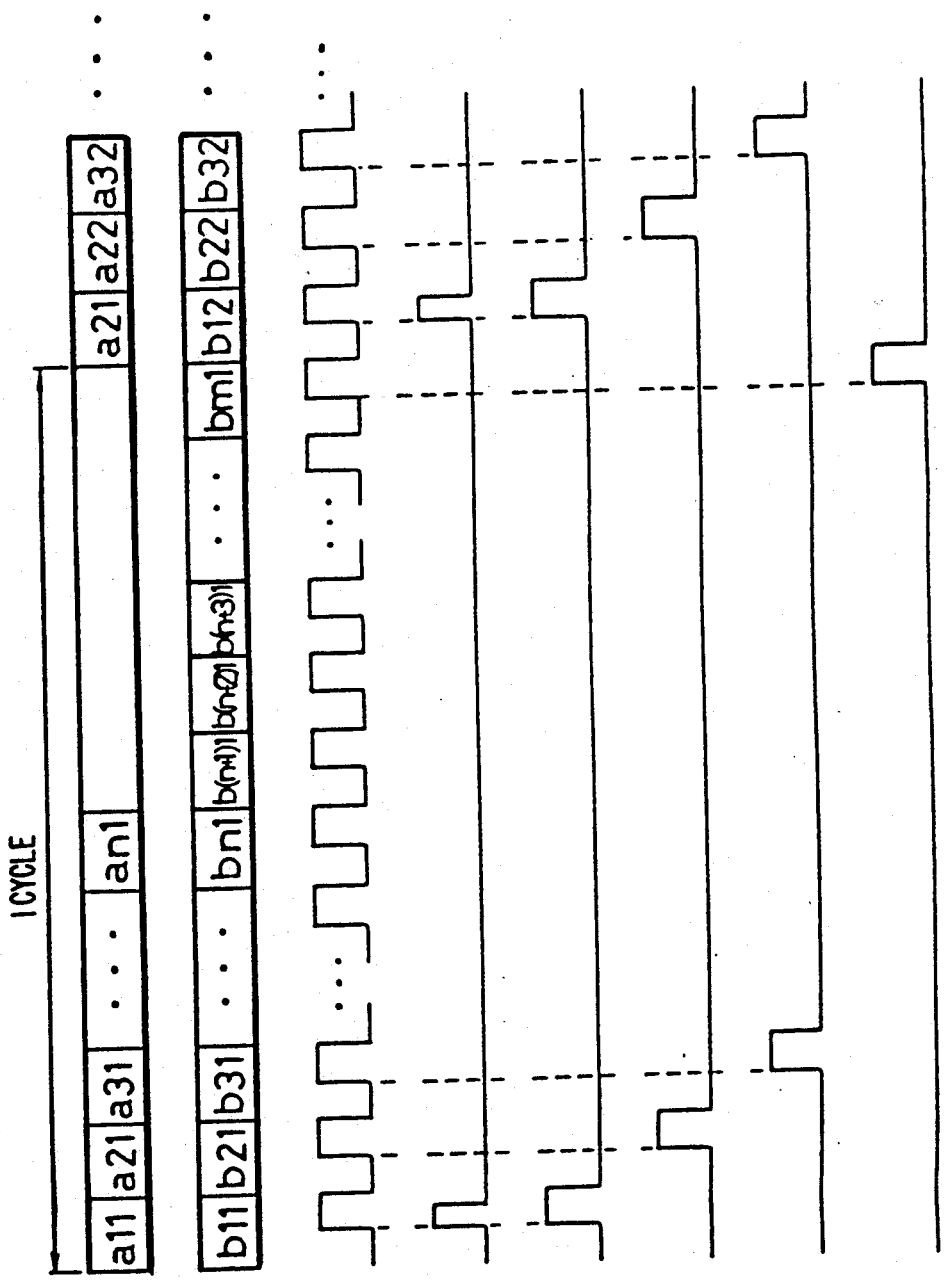
Figure 26:
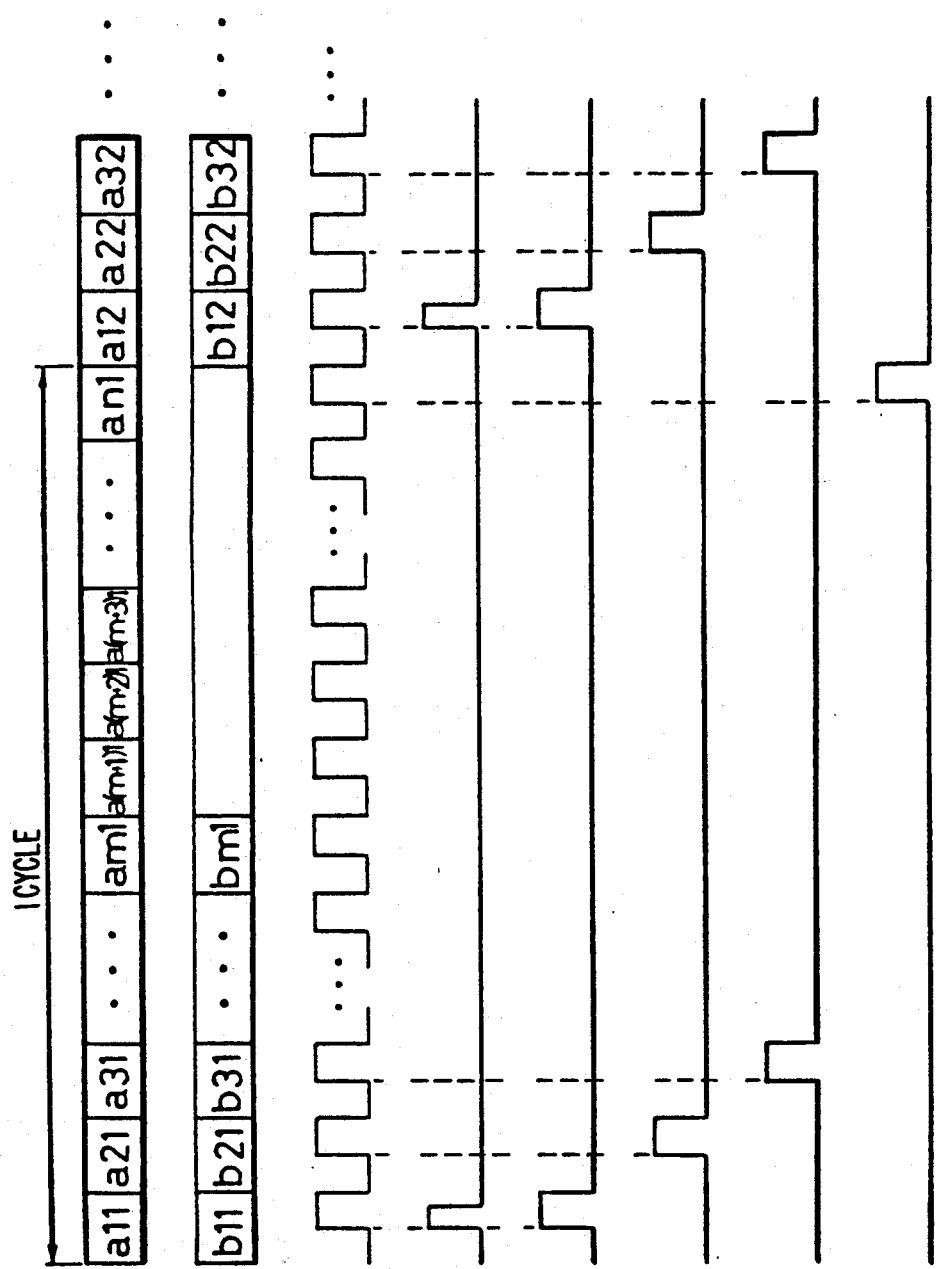
Figure 27:
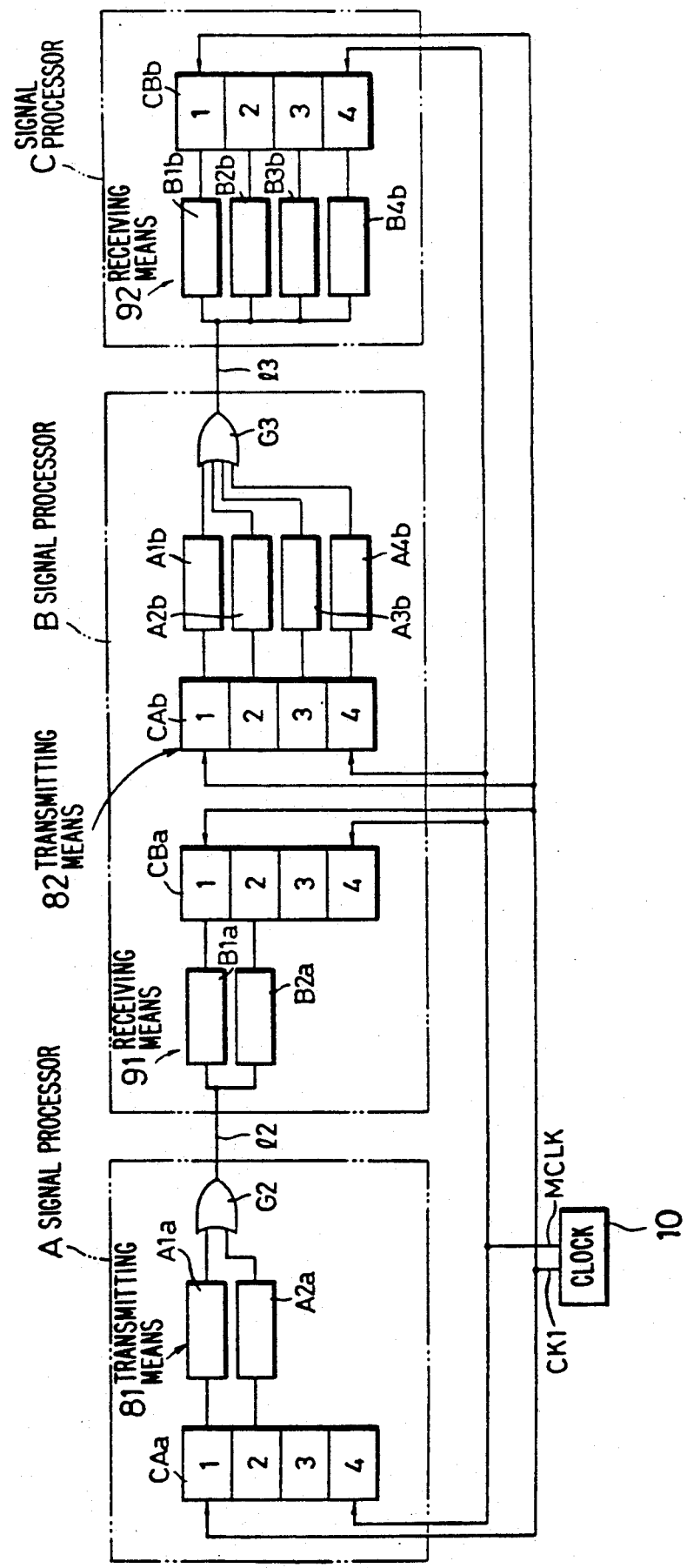
Figure 28:
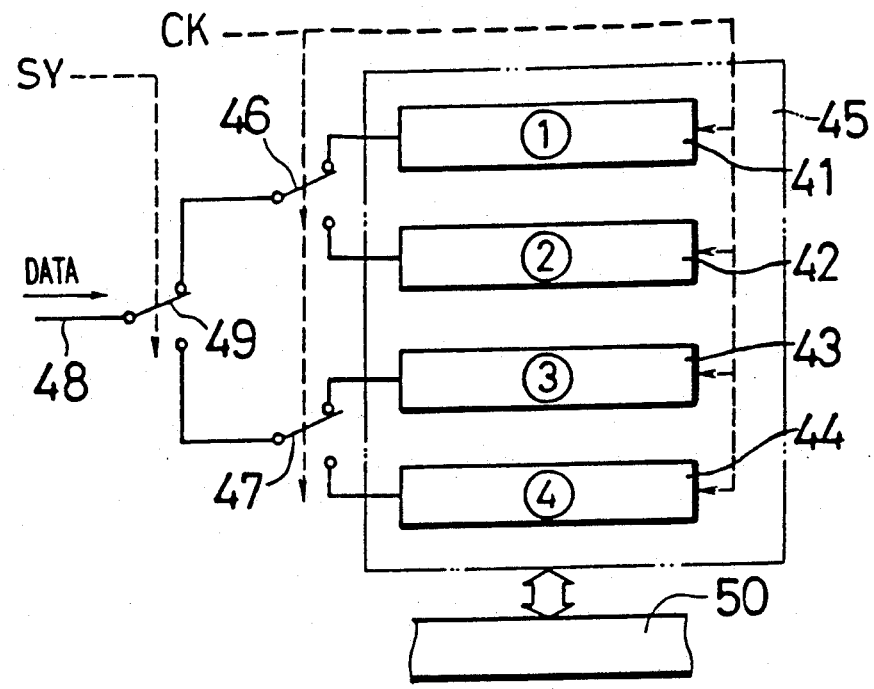
Figure 29:
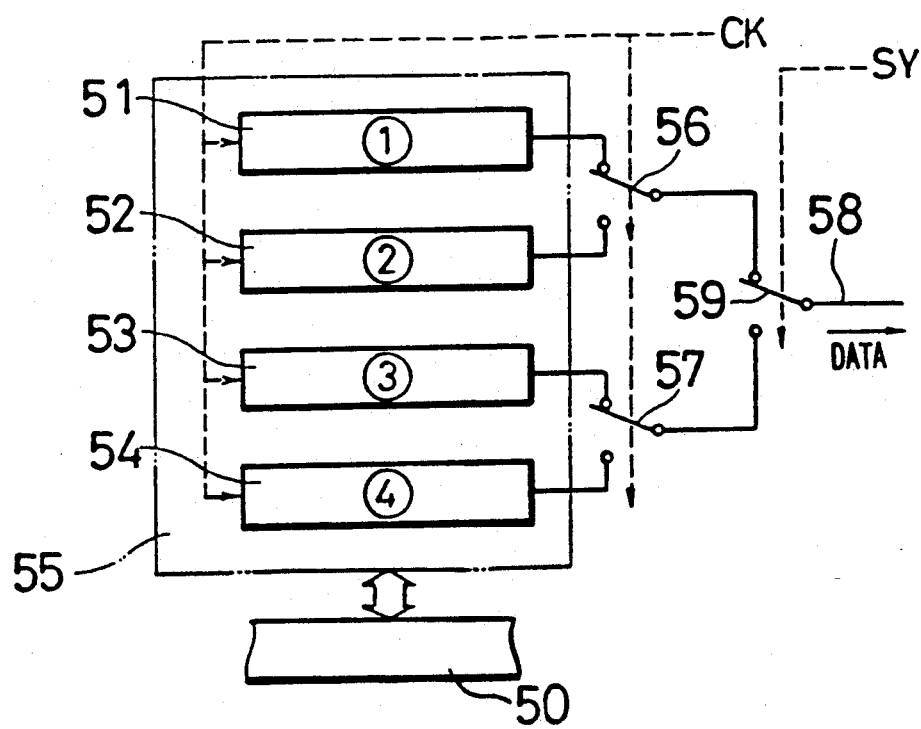
Figure 32:
Figure 32:
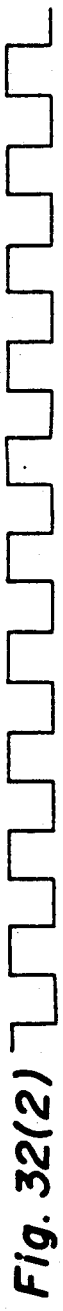
Figure 32:
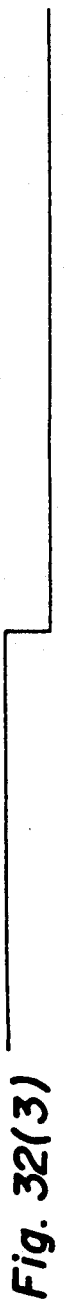
Figure 32:
Figure 32:
Figure 32:
Figure 32:
Figure 32:
Figure 32:
Figure 34:
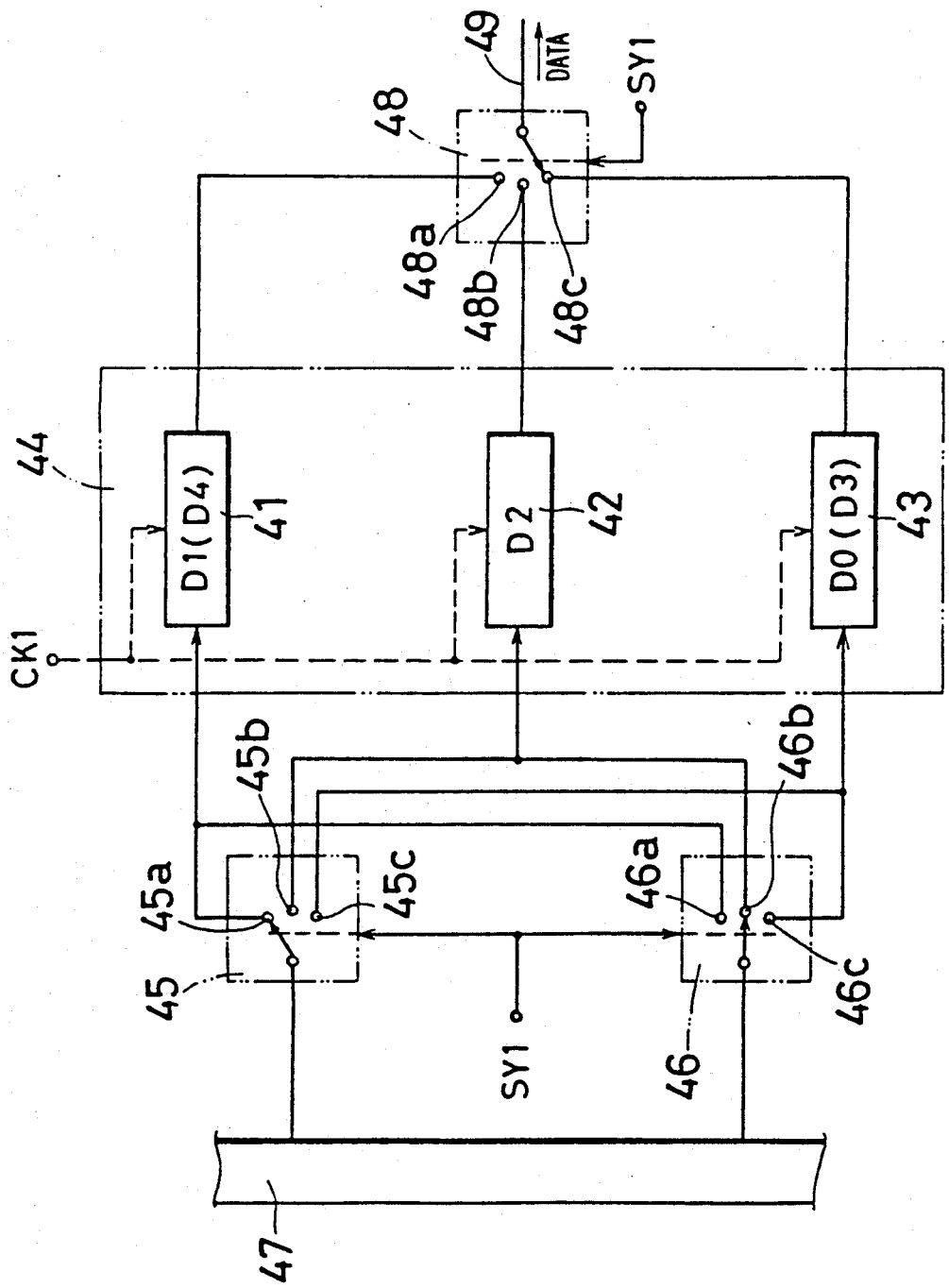
Figure 35:
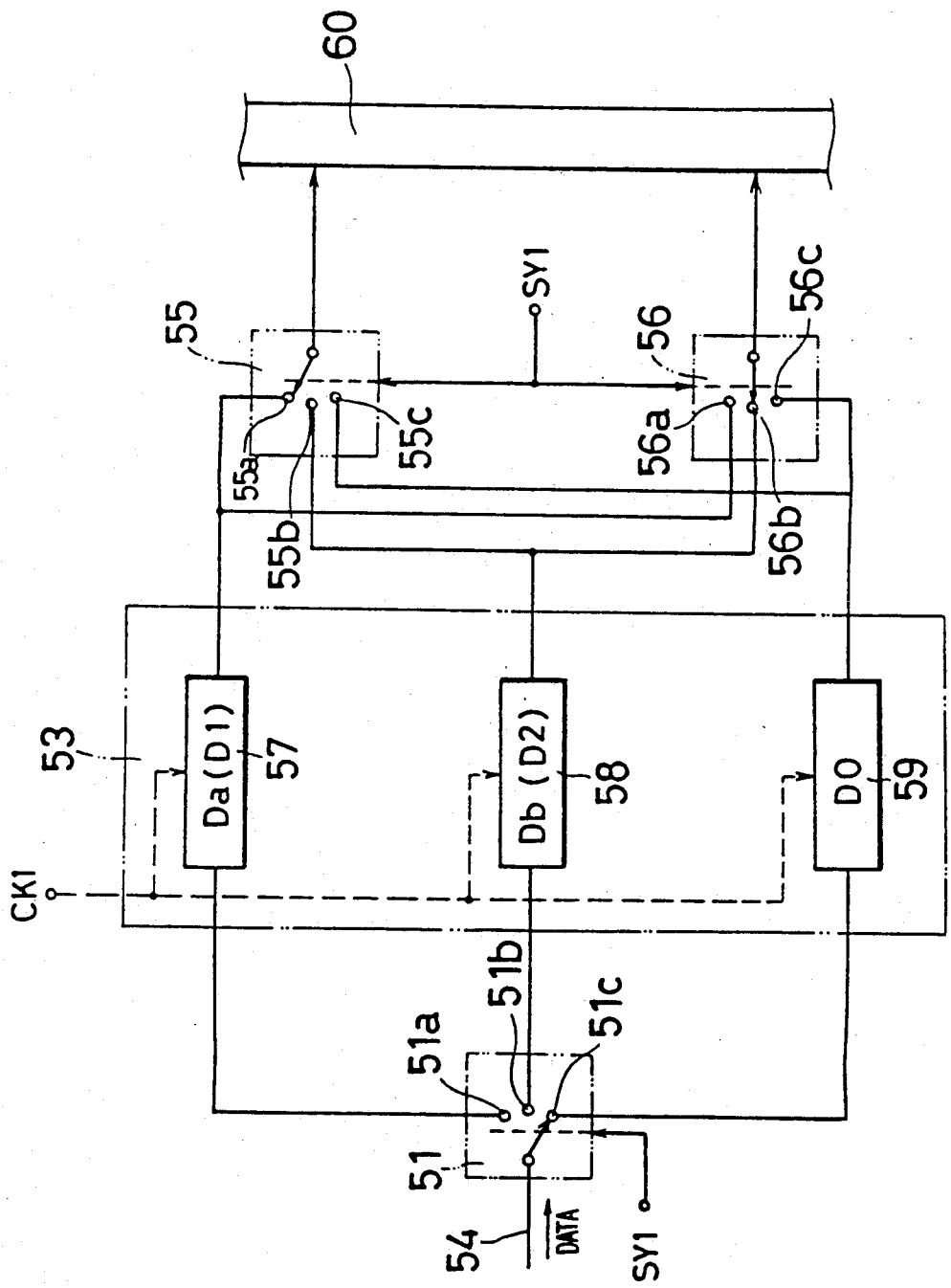
Figure 36:
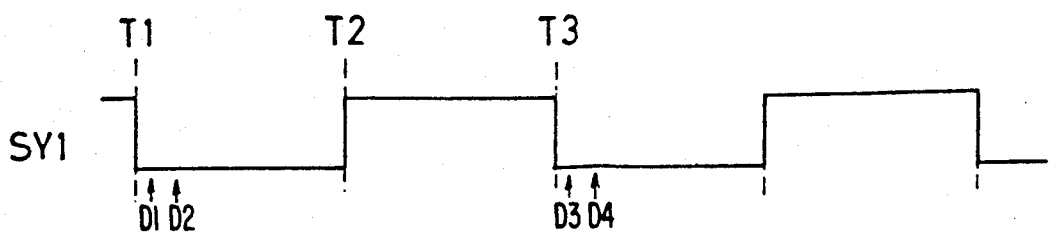
Figure 36:
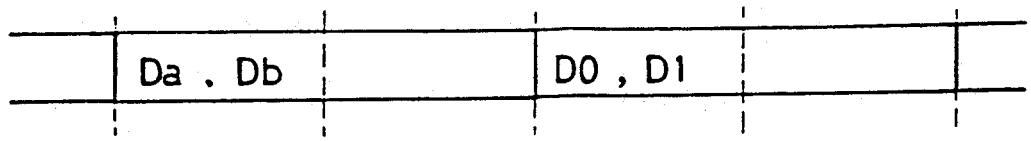
Figure 36:
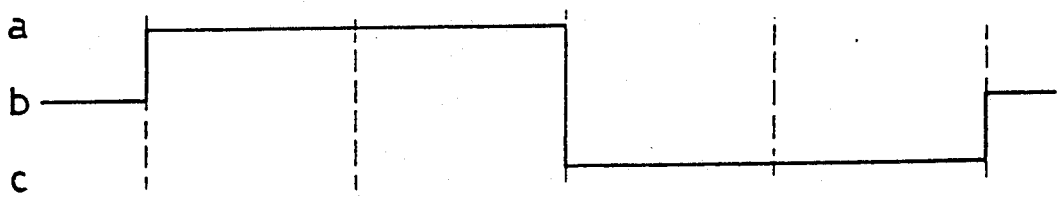
Figure 36:
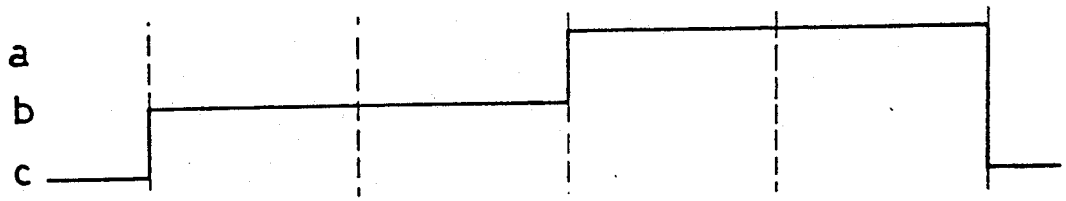
Figure 36:
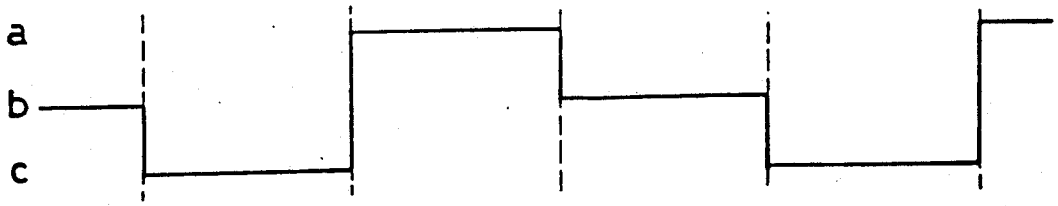
Figure 36:
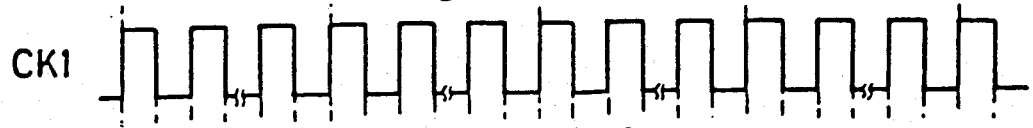
Figure 36:
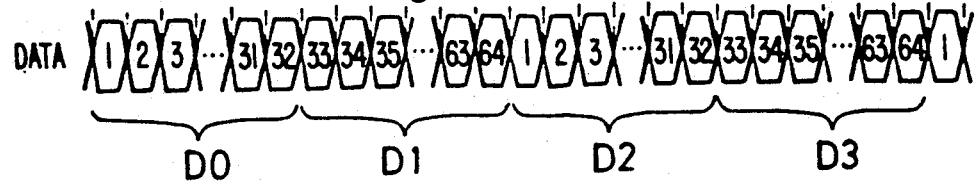
Figure 37:
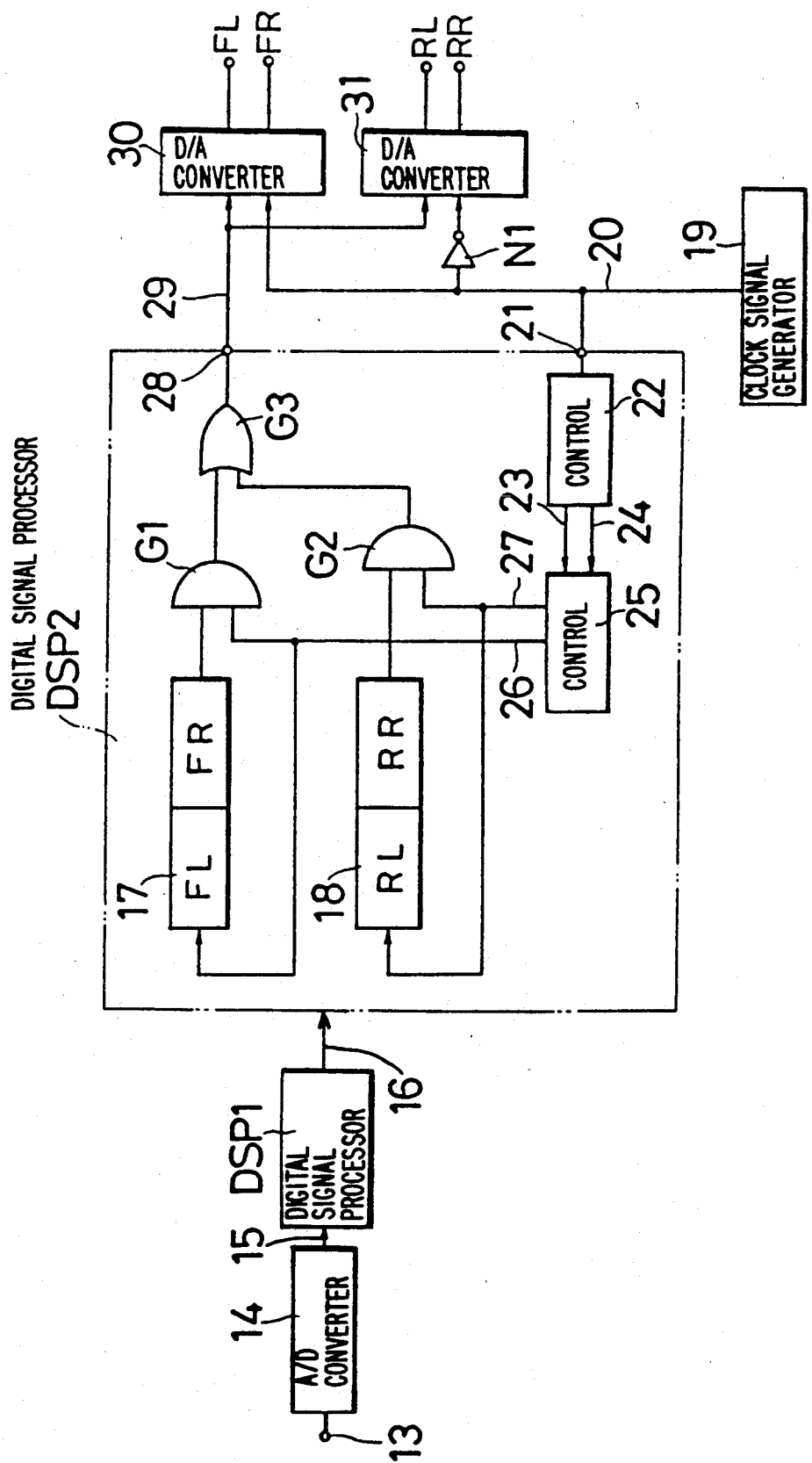
Figure 38:
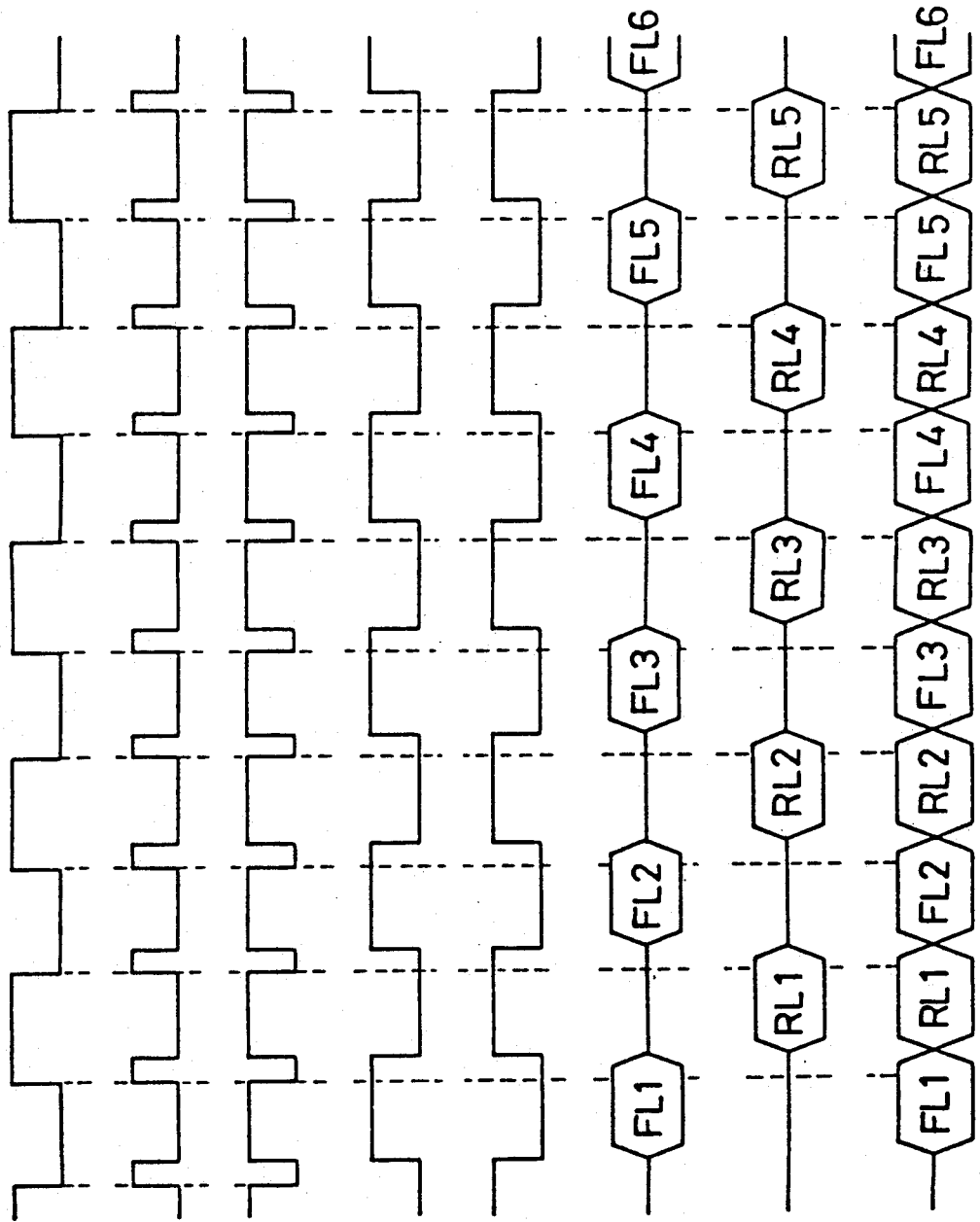
Figure 39:
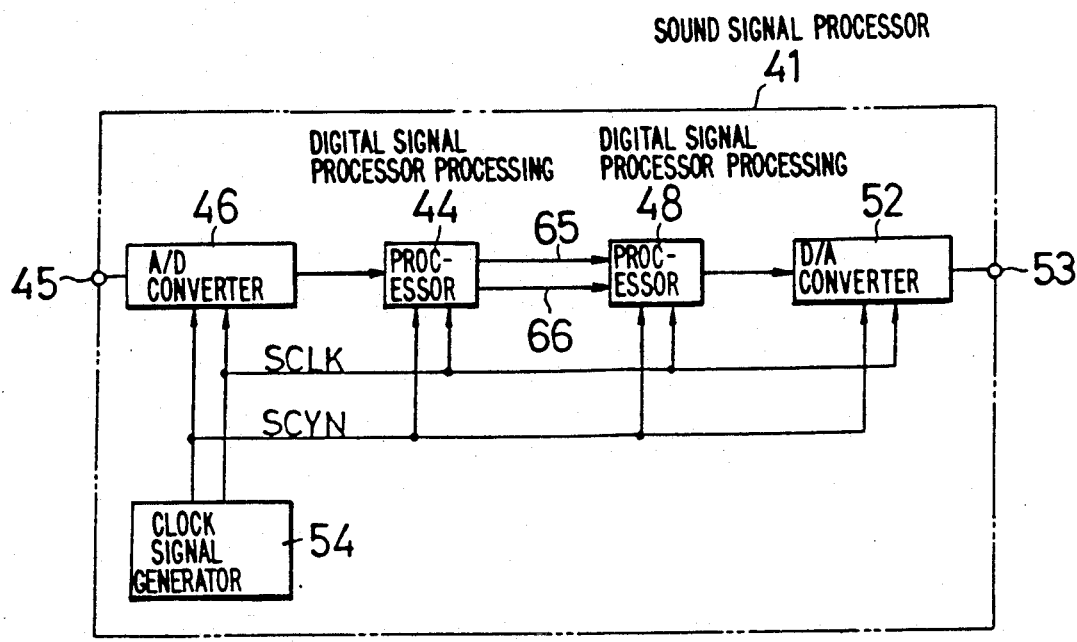
Figure 41:
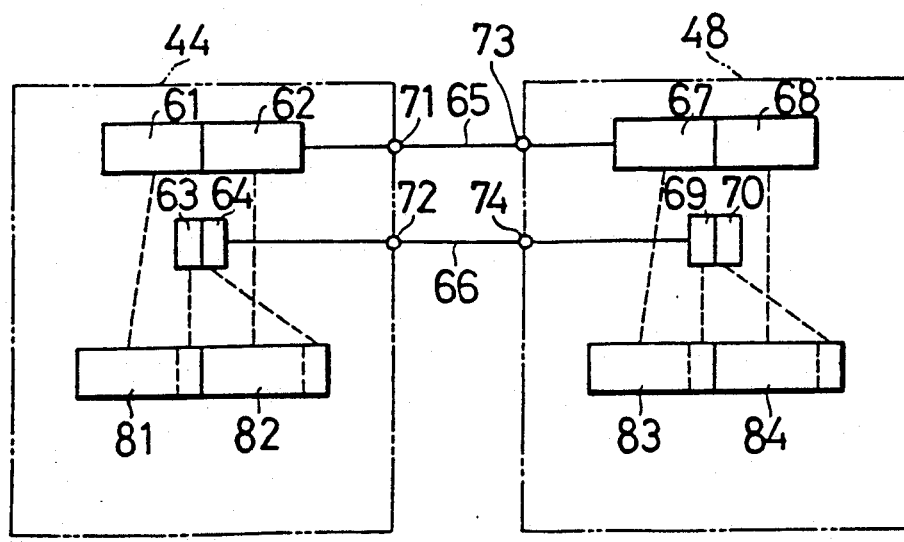
Figure 42:
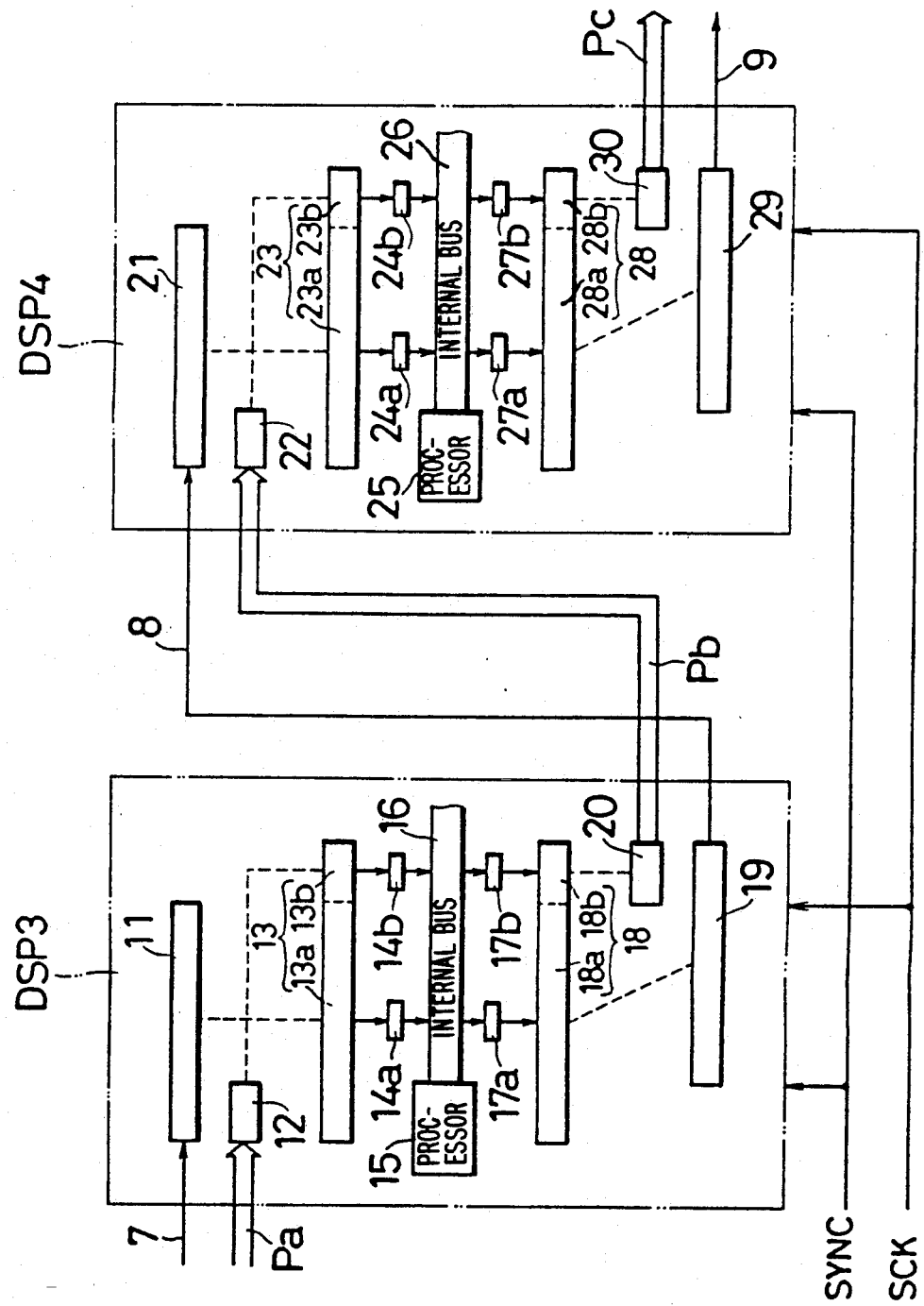
Figure 44:
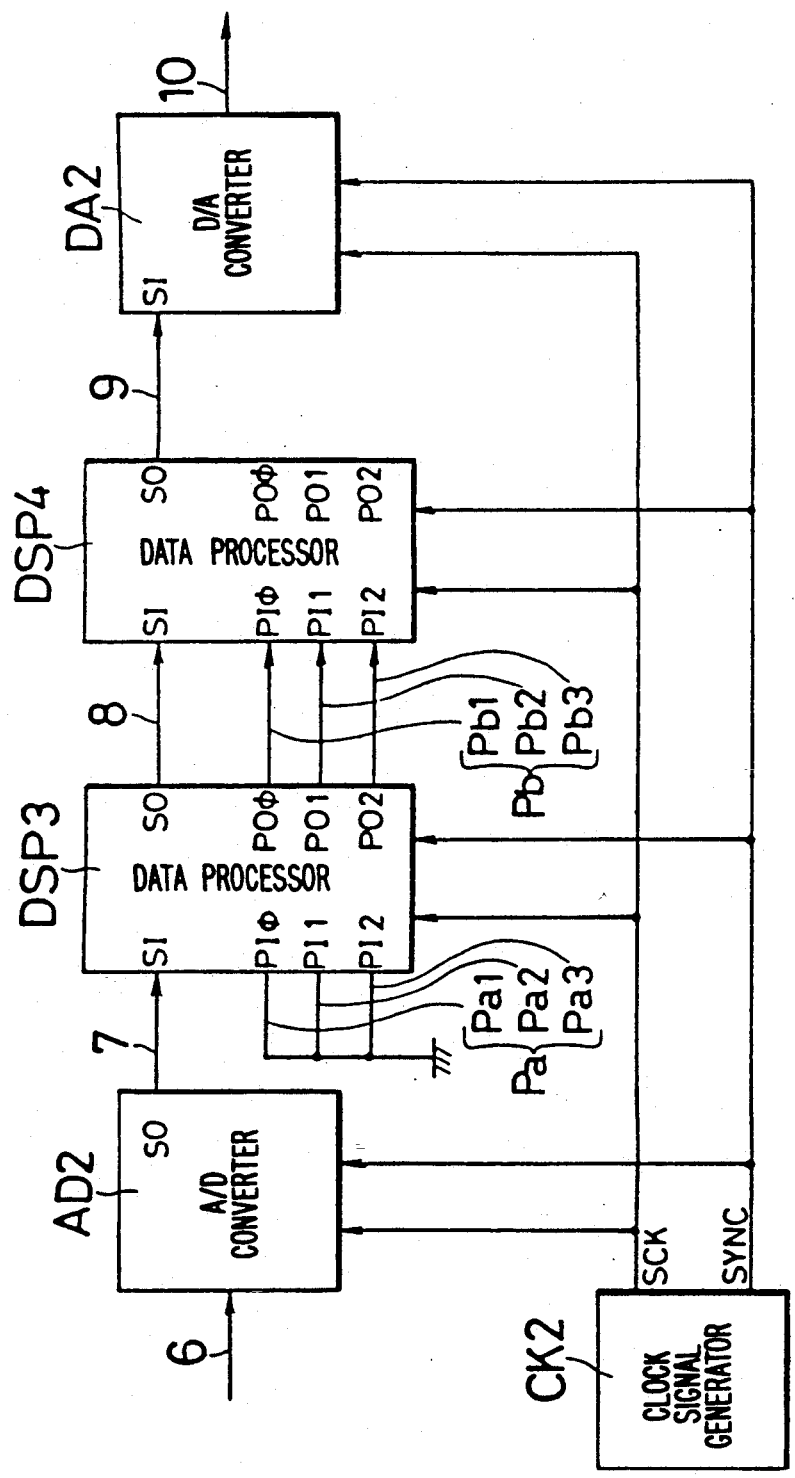
Figure 45:
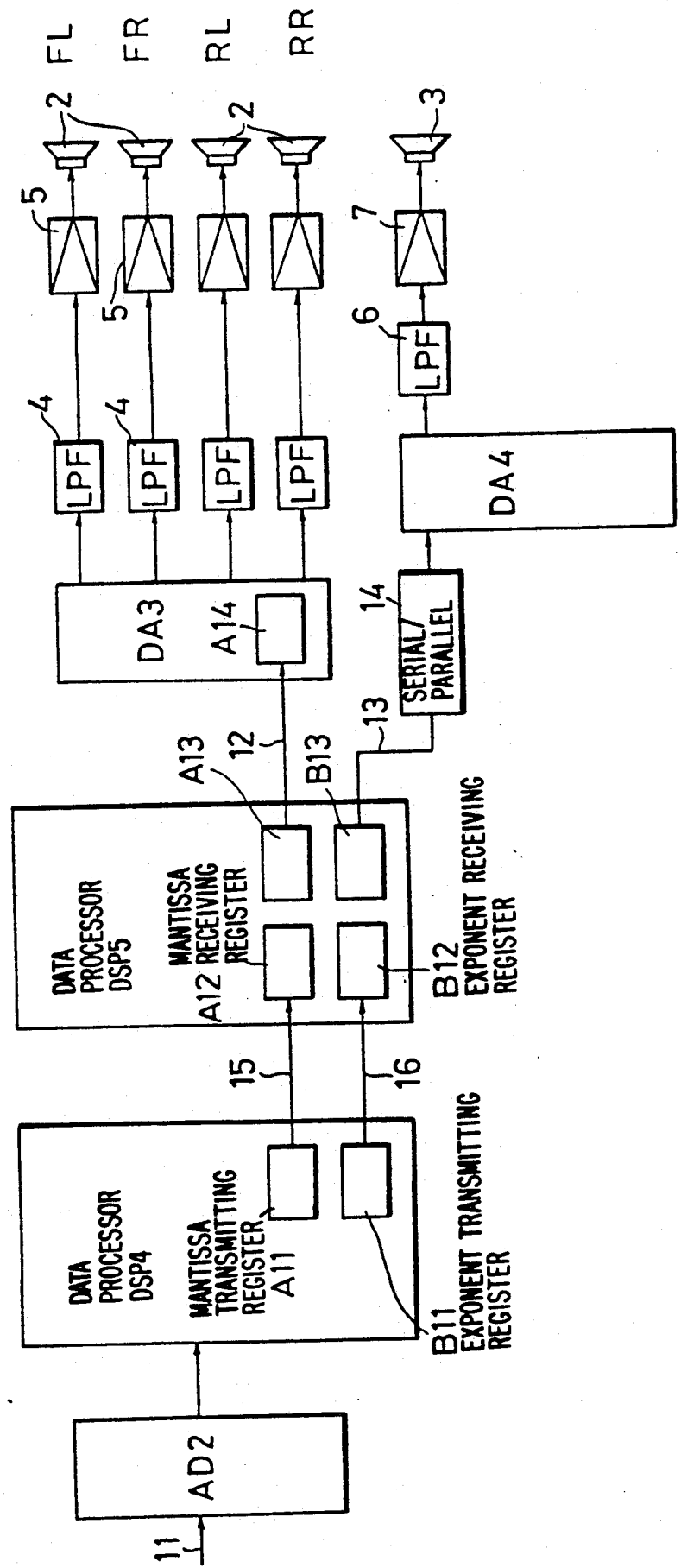
Figure 46:
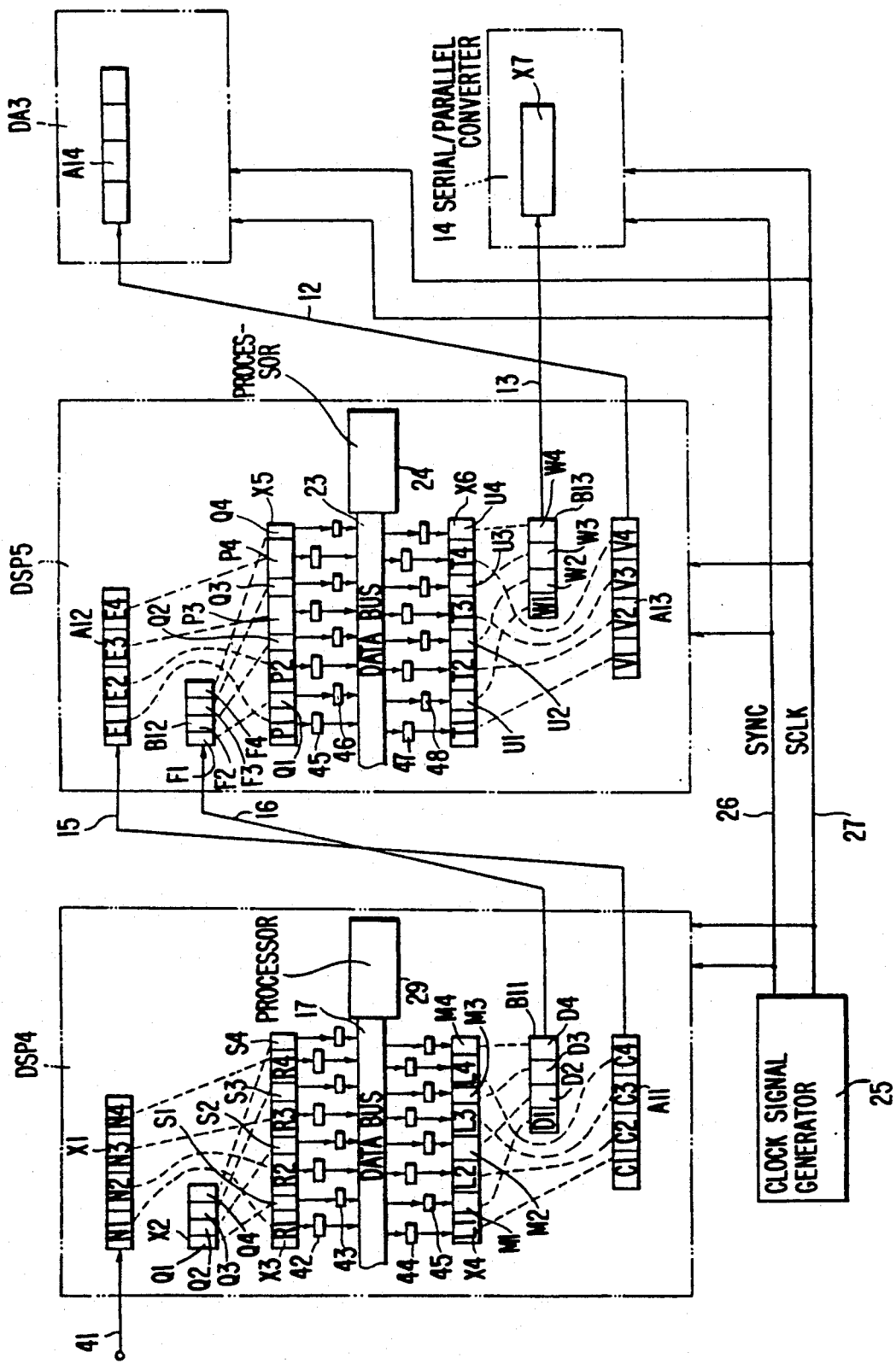
Figure 47:
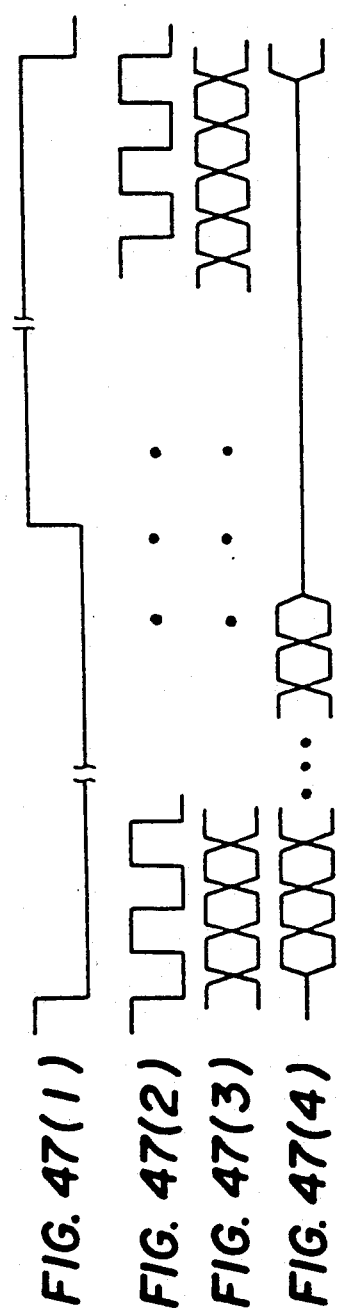
Figure 48:
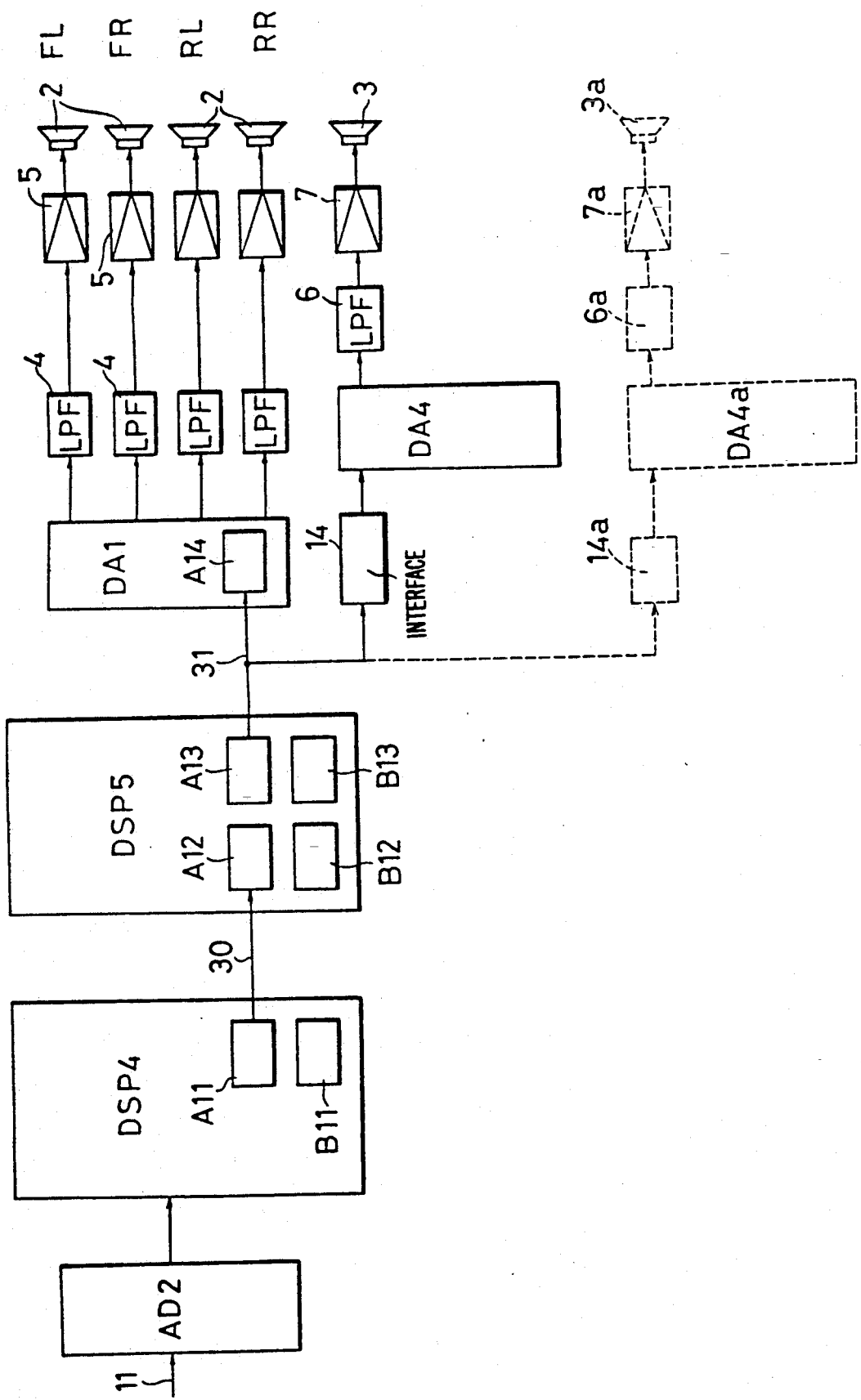
Figure 49:
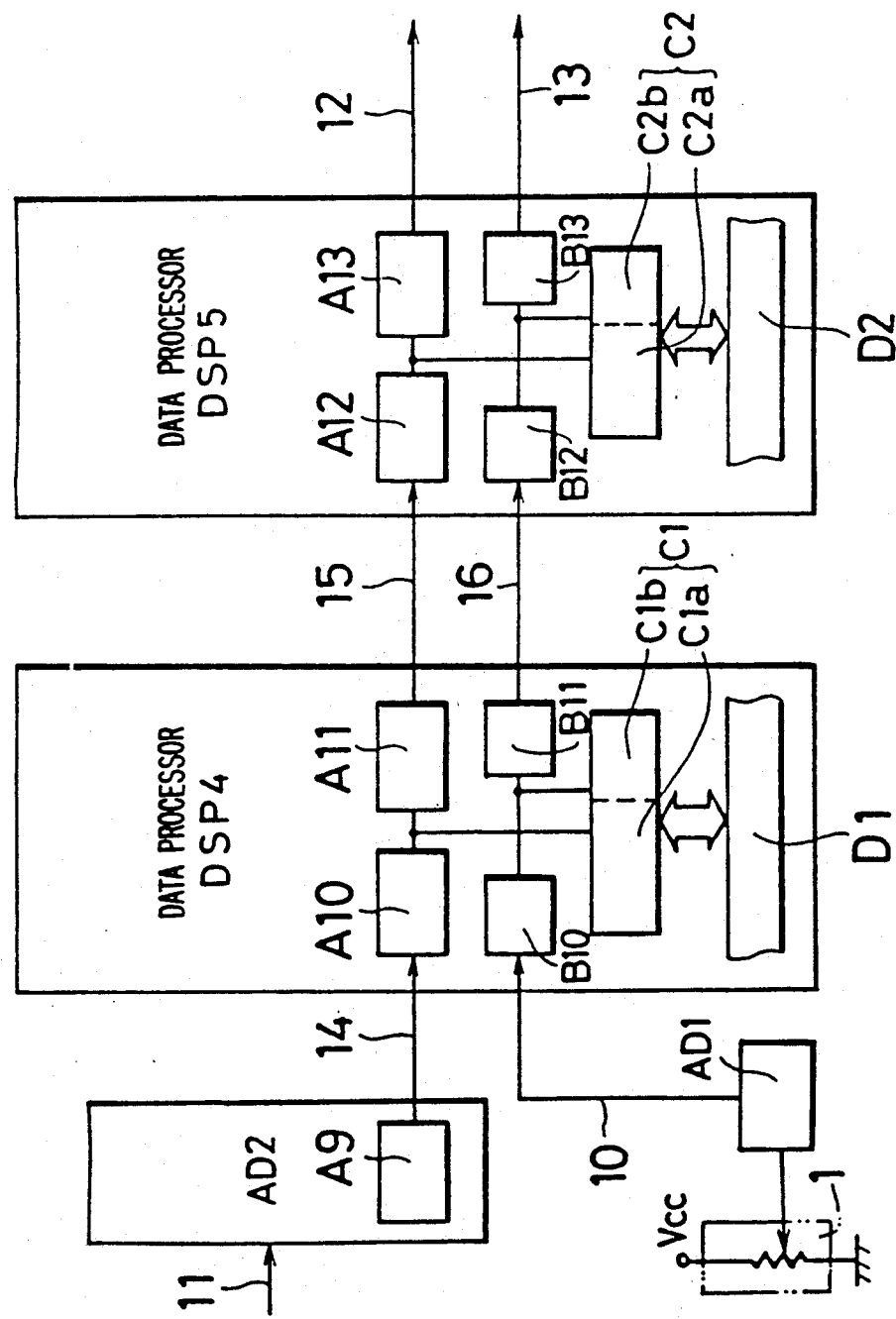
Figure 52:
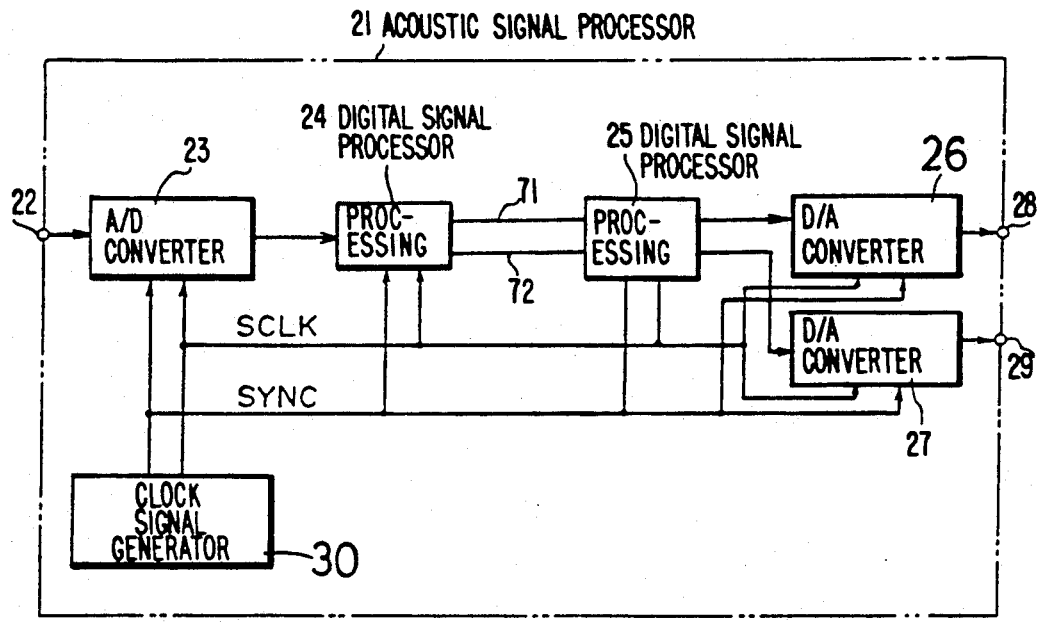
Figure 54:
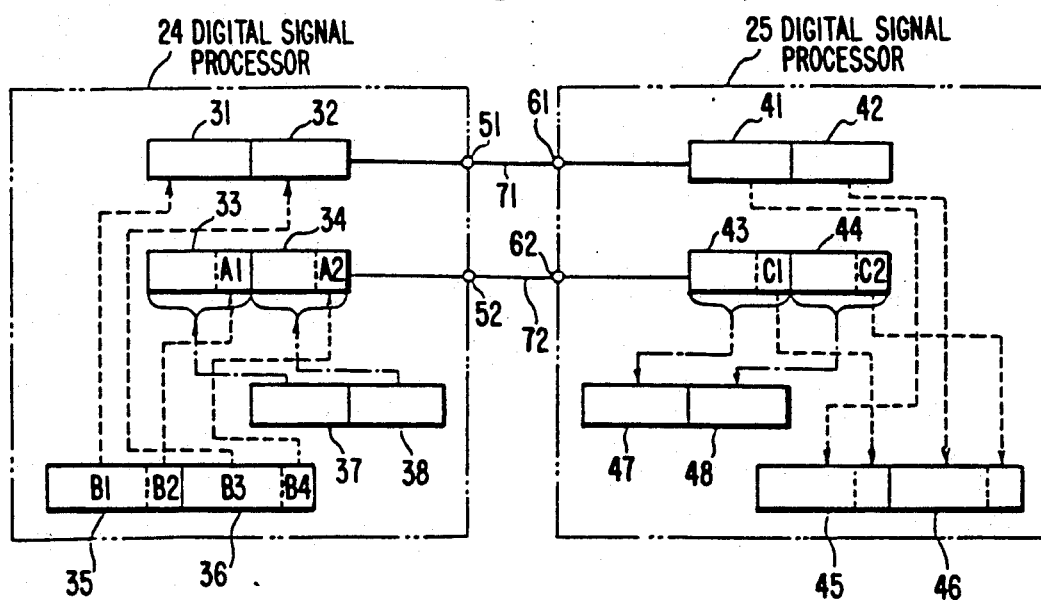
Figure 55:
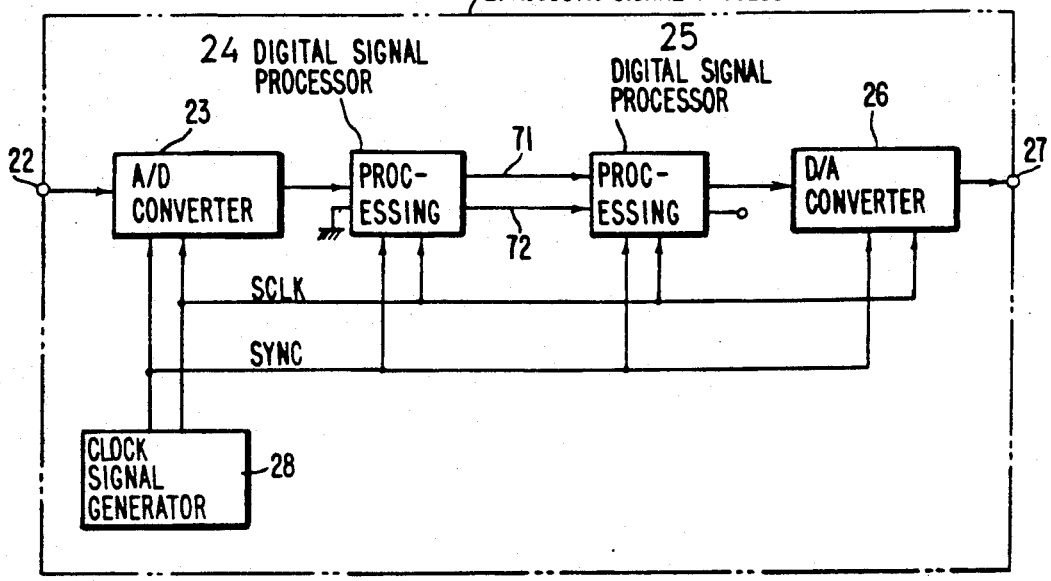
Figure 57:
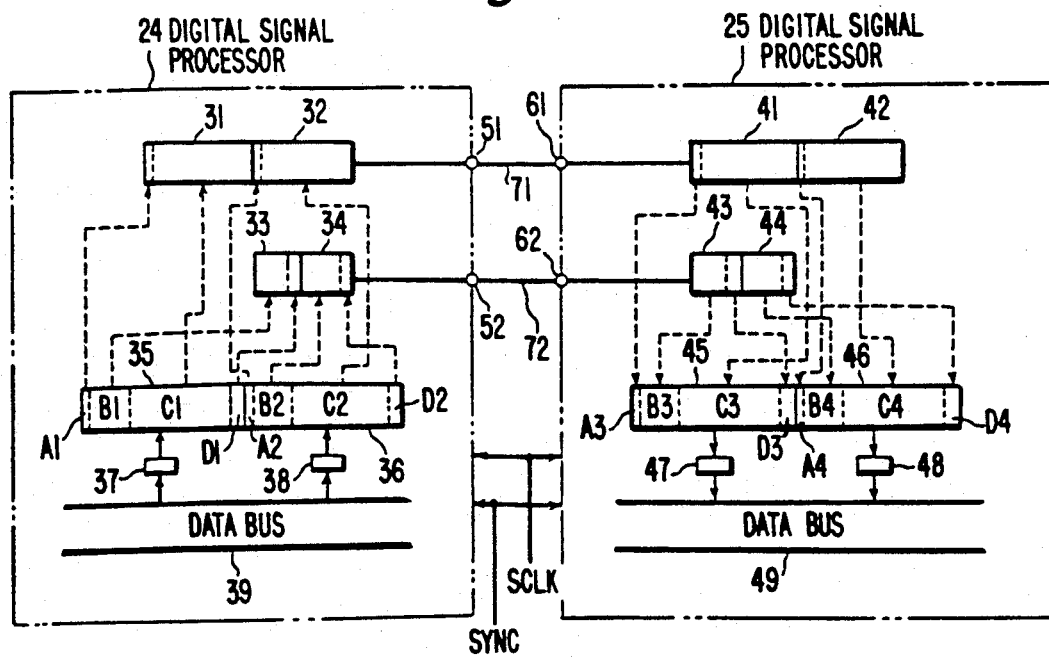

FIGS. (1)-(3) is a diagram to show the composition of combined information A to C to be led out into a line 16 when data is written into a memory M1 of a second processor U2 from a first processor U1;

FIG. 20 (1)-(5) is a diagram to show the composition of combined information D, E to be led out into the line 16 when reading out the data from the memory M1 of the second processor U2 into the first processor U1;

FIG. 21 is a waveform diagram to explain the operation of the embodiment shown in FIG. 18;

FIG. 22 is a flow chart to explain the operation of the embodiment shown in FIG. 18;

FIG. 23 is a block diagram of an embodiment of the invention;

FIG. 24 (1)-(6) is a diagram to explain the operation when the first plurality n and the second plurality m are equal to each other in the embodiment shown in FIG. 23;

FIG. 25 (1)-(8) is a diagram to explain the operation when the first plurality n is less than the second plurality m;

FIG. 26 (1)-(8) is a waveform diagram to explain the operation when the first plurality n exceeds the second plurality m;

FIG. 27 is a block diagram of a different embodiment of the invention;

FIG. 28 is a block diagram showing the composition of the receiving side of an embodiment of the invention;

FIG. 29 is a block diagram showing the composition of the transmitting side of the same embodiment;

FIG. 30 (1)-(6) is a timing chart to explain the operation of the same embodiment;

FIG. 31 is a block diagram of a sound signal processor 13 in an embodiment of the invention;

FIG. 32 (1)-(9) and FIG. 33 (1)-(2) are waveform diagrams to explain the operation;

FIG. 34 and FIG. 35 are block diagrams showing a basic composition of the transmitting side and receiving side according to an embodiment of the invention;

FIG. 36 (1)–(7) is a timing chart to explain the data transfer by the configuration shown in FIG. 34 and FIG. 35;

FIG. 37 is a block diagram of a main embodiment of the invention;

FIG. 38 (1)–(8) is a waveform diagram to explain the operation of the embodiment shown in FIG. 37;

FIG. 39 is a block diagram showing a configuration of a sound signal processor 41 in an embodiment of the invention;

FIG. 40 (1)–(5) is a waveform diagram to explain the operation of the embodiment shown in FIG. 39;

FIG. 41 is a drawing to explain the storing the transferring actions of data in processors 44, 48;

FIG. 42 is a block diagram showing the composition of processors DSP3, DSP4 for transferring data in an embodiment of the invention;

FIG. 43 (1)–(4) is waveform diagram to explain the data transfer action between processors DSP3 and DSP4;

FIG. 44 is a block diagram to show the configuration when the data transfer system of the invention is employed in the transfer of acoustic signal;

FIG. 45 is a block diagram of an embodiment of the invention;

FIG. 46 is a block diagram showing the details of part of the constitution of the embodiment shown in FIG. 45;

FIG. 47 (1)–(4) is a waveform diagram to explain the operation of data transfer in the constitution shown in FIG. 46;

FIG. 48 is a block diagram of a different embodiment of the invention;

FIG. 49 is a block diagram showing the configuration near processor DSP4 in an embodiment of the invention;

FIG. 50 is a drawing to explain the operation when the function of an electronic variable resistor is added to the processor DSP4;

FIG. 51 is a block diagram to show another embodiment of the invention;

FIG. 52 is a block diagram of an acoustic processor of the invention;

FIG. 53 (1)–(7) is a waveform diagram to explain the operation of FIG. 52;

FIG. 54 is a block diagram of a processor;

FIG. 55 is a block diagram of an acoustic signal processor of the invention;

FIG. 56 (1)–(5) is a waveform diagram to explain the operation of FIG. 55;

FIG. 57 is a block diagram of a processor; and

Figure 58:
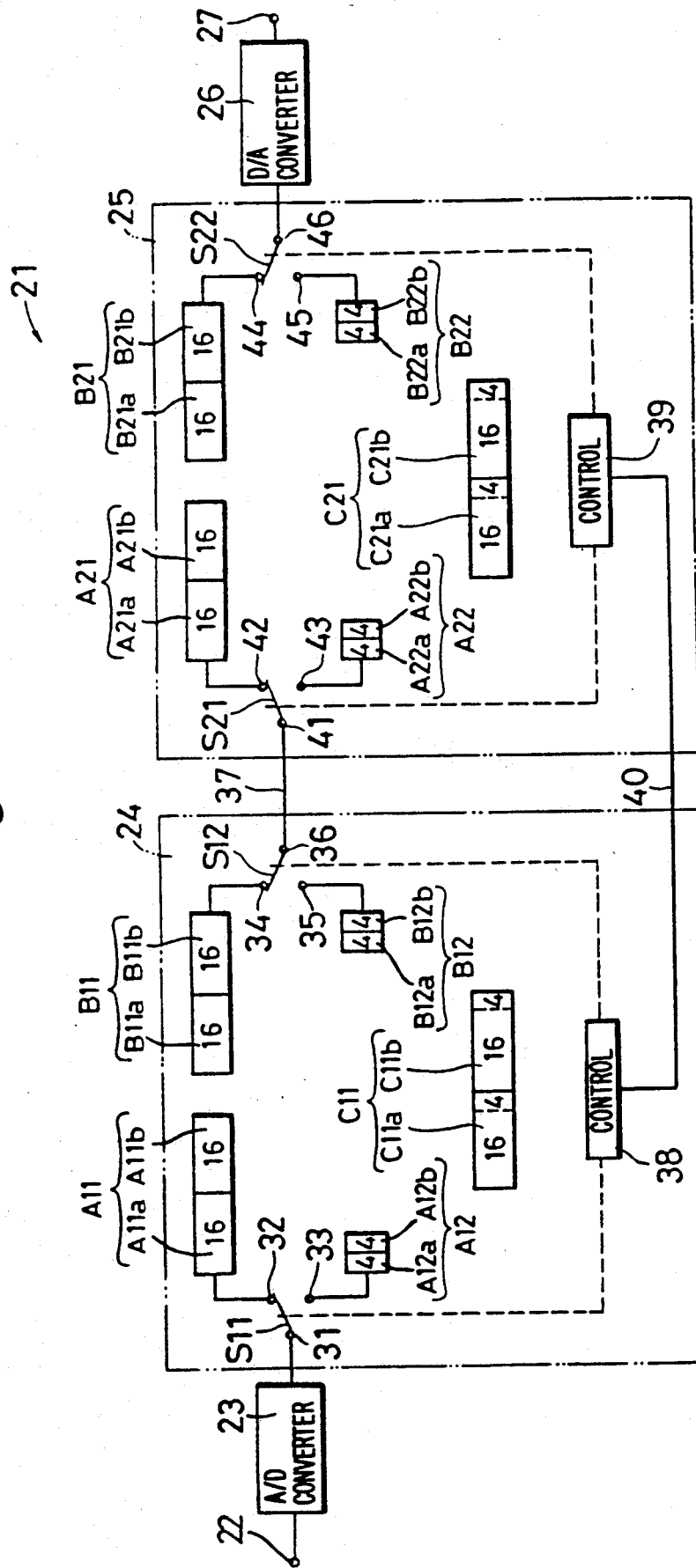

FIG. 58 is a block diagram showing a configuration of a sound signal processor 21 in an embodiment of the invention.

DETAILED DESCRIPTION OF THE PREFERRED EMBODIMENT

Figure 3:
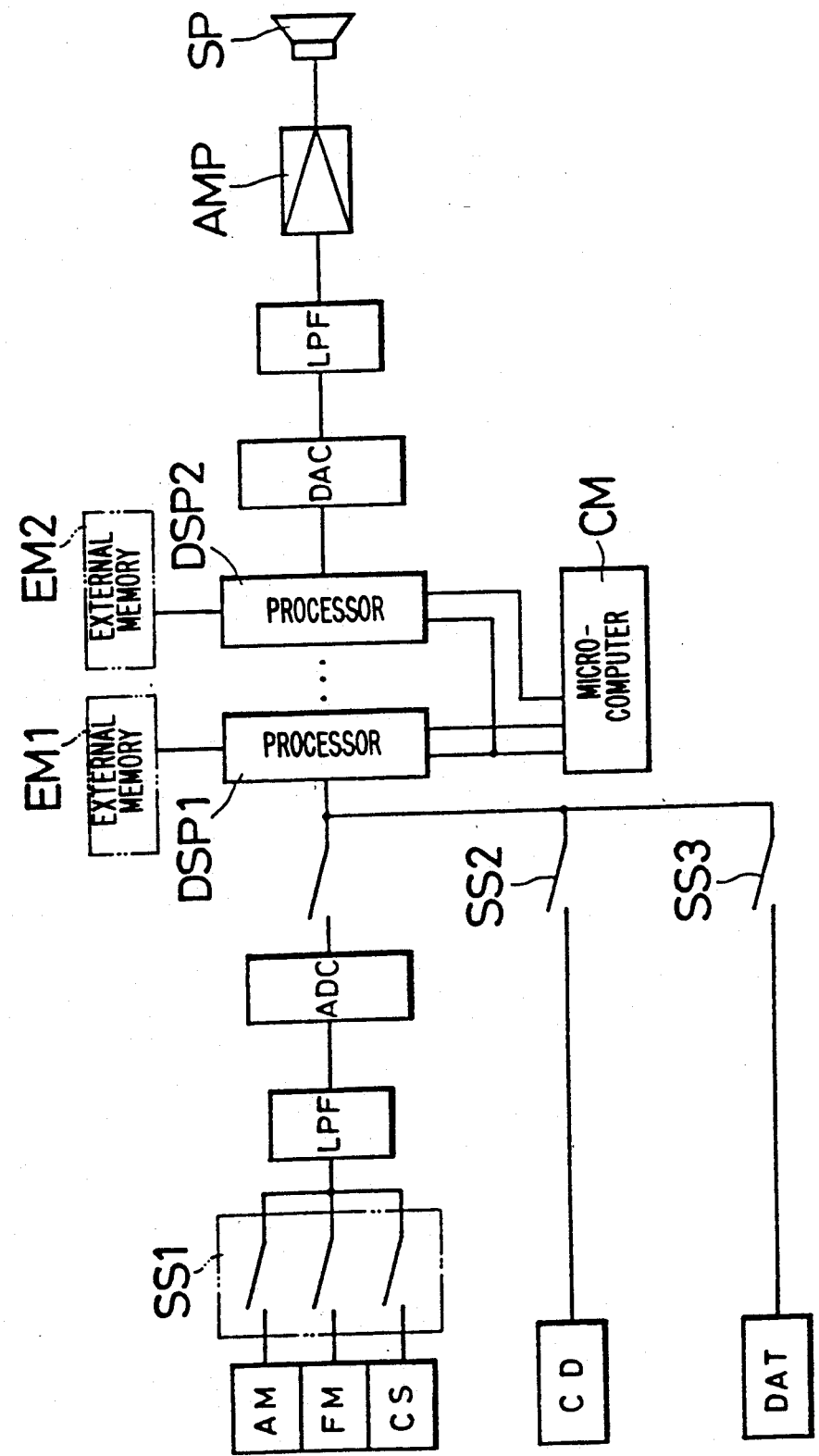
FIG. 3 is a system diagram of a configuration according to an embodiment of the invention.
Figure 4:
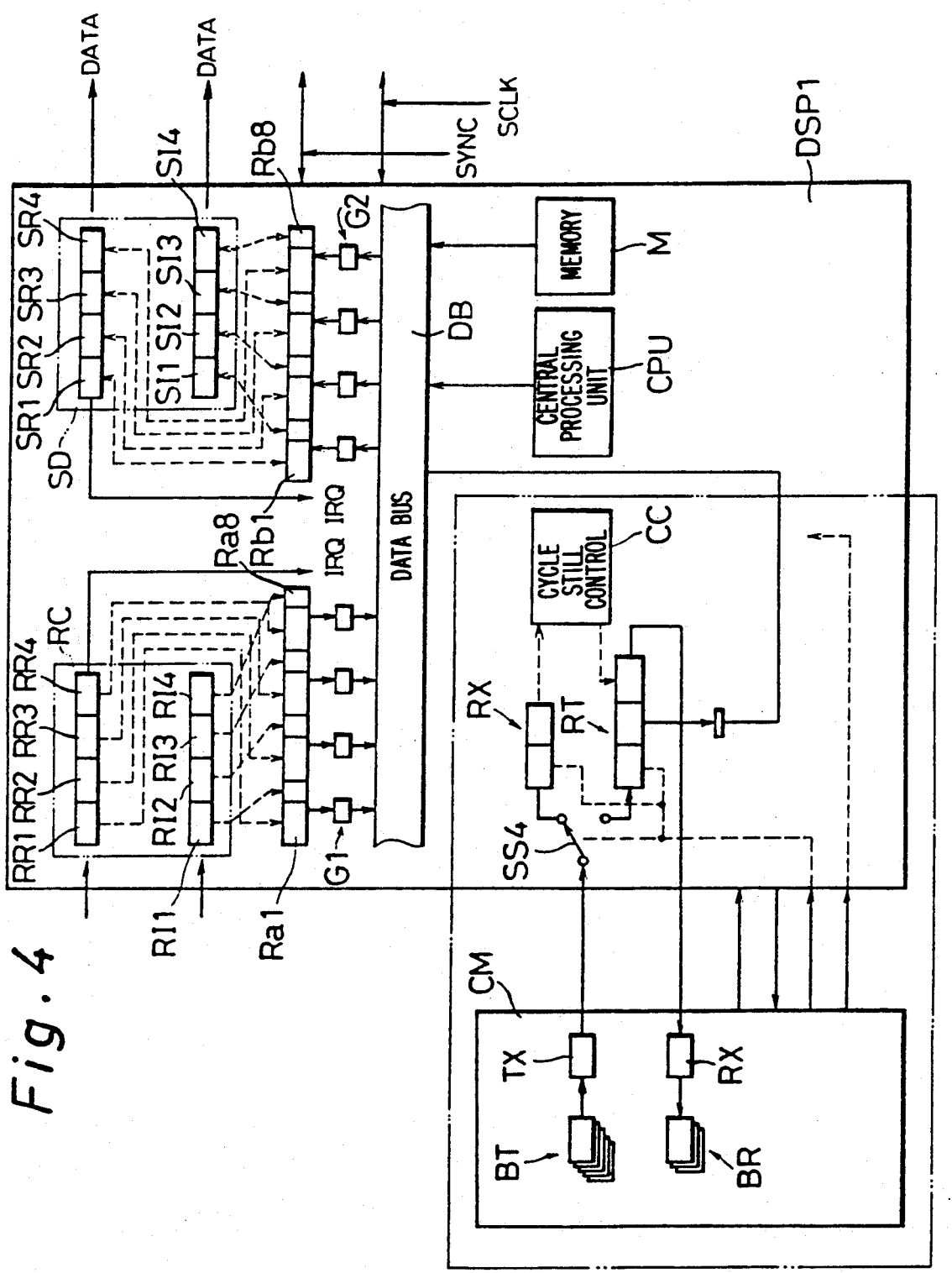
FIG. 4 is a block diagram showing an example of a basic configuration of FIG. 3.

FIG. 3 is a system diagram of a configuration according to an embodiment of the invention, and FIG. 4 is a block diagram showing an example of the basic configuration of FIG. 3. Referring to these drawings together, the configuration of this embodiment is described below. This configuration controls, for example, a car-mount acousting apparatus for possessing several functions such as radio receiver of FM wave band and AM wave band, cassette tape recorder, compact disc player, and digital audio magnetic tape player (DAT).

This embodiment processes signals of AM wave band receiver AM, FM wave band receiver FM, cassette tape recorder CS, compact disc player CD, and digital audio magnetic tape player DAT. The outputs of receivers AM, FM, and cassette tape recorder CS are selected by a changeover switch SS1. This selected output is passed into a low pass filter LPF, in which high frequency noise is removed, and is sent into an analog-to-digital converter (A/D converter) ADC to be digitized, and its output is applied to digital signal processors (hereinafter called processors) DSP1, DSP2. Outputs of processors DSP1, DSP2 are fed into a digital-to-analog converter (D/A converter) DAC to be converted into analog signals, which are sent into the low pass filter LPF to be rid of high frequency noise, and are delivered from speakers SP as sound through an amplifier AMP. On the other hand, outputs from the compact disc player CD and digital audio tape player DAT are selected by changeover switches SS2, SS3, and the selected output is fed into processors DSP1, DSP2. The processors DSP1, DSP2 are controlled by a microcomputer CM, to which are connected external memories EM1, EM2, such as static memories (S-RAM).

FIG. 4 shows the connection state of the microcomputer CM and processor DSP1. The processor DSP1 comprises a receiver RC and a sender SD. The receiver RC and sender SD possess mantissa registers RR1, RR2, RR3, RR4; SR1, SR2, SR3, SR4 for storing the mantissa sections of the floating decimal point type data to be received or sent, and also have index registers RI1, RI2, RI3, RI4; SI1, SI2, SI3, SI4 for storing the index sections. In these registers (collectively mentioned by reference codes RR, SR; RI, SI), buffer registers Ra1 to Ra8; Rb1 to Rb8 (collectively mentioned by reference codes Ra, Rb) are disposed correspondingly.

The buffer registers Ra, Rb are connected to a data bus DB, to which are connected central processing unit CPU and memory M, by way of plural gates G1, G2, respectively.

The processor DSP1 is equipped with a receiving register RX and receiving-transmitting register RT to be used in data transfer with the microcomputer, and the received data is stored in either register RX or RT by means of a changeover switch SS4. There is a cycle still controller CC for controlling the operations of the registers RX, RT. The microcomputer CM is furnished with a transmitting register TX and a receiving register RX for transmitting and receiving data between the above registers RX, RT, and there are buffer registers BT, BR for exchanging data between these registers RX, TX.

Embodiments

Figure 5:
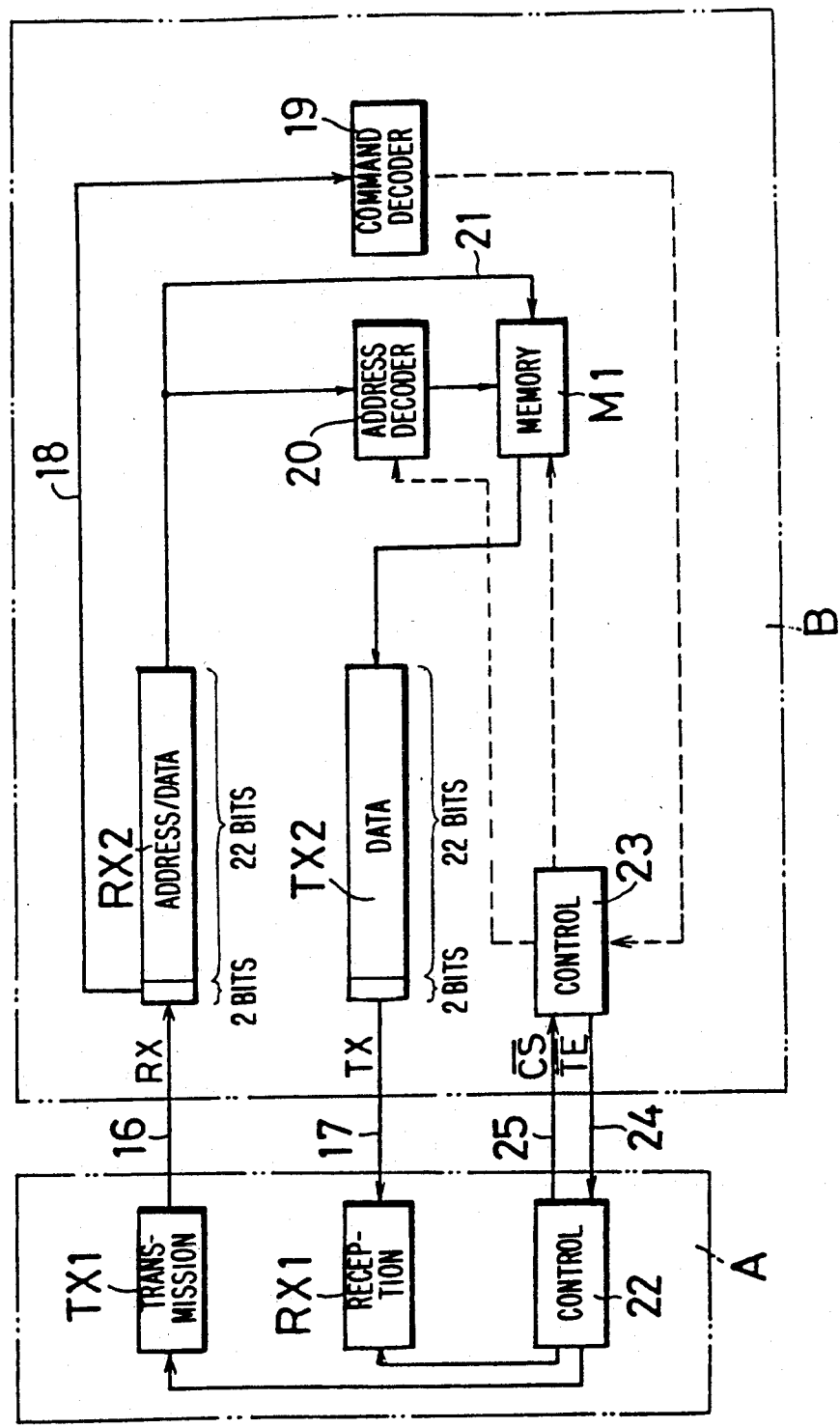
FIG. 5 is a block diagram of an embodiment of the invention.

FIG. 5 is a block diagram of an embodiment of the invention. By the command from a first processor A, (a) the data stored in the storage region of a memory M1 provided in a second processor B is read out and received in the first processor A, or (b) the data from the first processor A may be written into the storage region of the memory M1. From the transmitting register TX1 of the first processor A, a signal composed of a total of 24 bits in units of 8 bits each is sent out in the sequence of bits to the receiving register RX2 of the second processor B by way of a line 16. From the transmitting register TX2 of the second processor B, a bit is sent out in the sequence of bits to the receiving register RX1 of the first processor A through a line 17.

From the first processor A to the second processor B, a 24-bit signal is sent out through the line 16 as stated above, and the first two bits of these 24 bits are a reading or writing command, and this command is given to a decoder 19 for decoding this command by way of a line 18. In the remaining 22 bits of the receiving register RX2, the address information for reading and writing, or data for writing is stored. The address information is applied to an address decoder 20, so that the address in the storage region in the memory MI is specified. The 22-bit data of the receiving register RX2 is given to the memory M1 from the line 21, so that the data through the line 21 is written in the store region specified by the address decoder 20. When reading out the data from the memory M1 and transferring to the first processor A, the data stored in the store region of the memory M1 in which the address is specified by the signal from the address decoder 20 is given to the transmitting register TX2, and the content of this transmitting register TX2 is transferred into the receiving register RX1 of the first processor A by way of the line 17. The registers TX1, RX1 in the first processor A are controlled by a control circuit 22. In the second processor B, a control circuit 23 is installed. This control circuit 23 controls the address decoder 20 and memory M1 in response to the signal from the command decoder 19, and also sends out a control signal $\overline{TE}$ to the control circuit 22 by way of the line 24, and receives a control signal $\overline{CS}$ from the control circuit 22 through the line 25.

Figure 6:
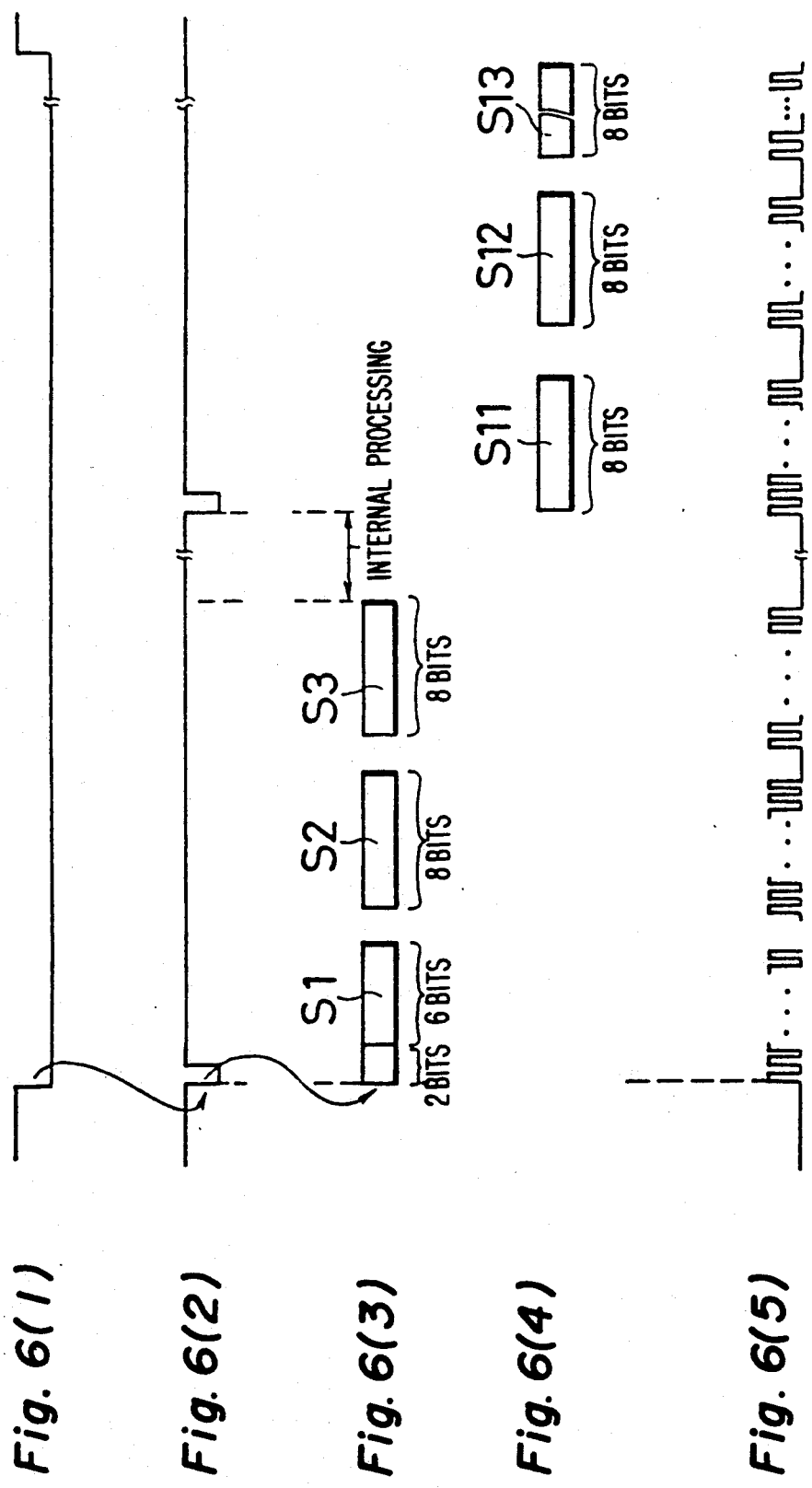
FIGS. 6 (1)-(5) are waveform diagrams for explaining the operation of the embodiment shown in FIG. 5.
Figure 7:
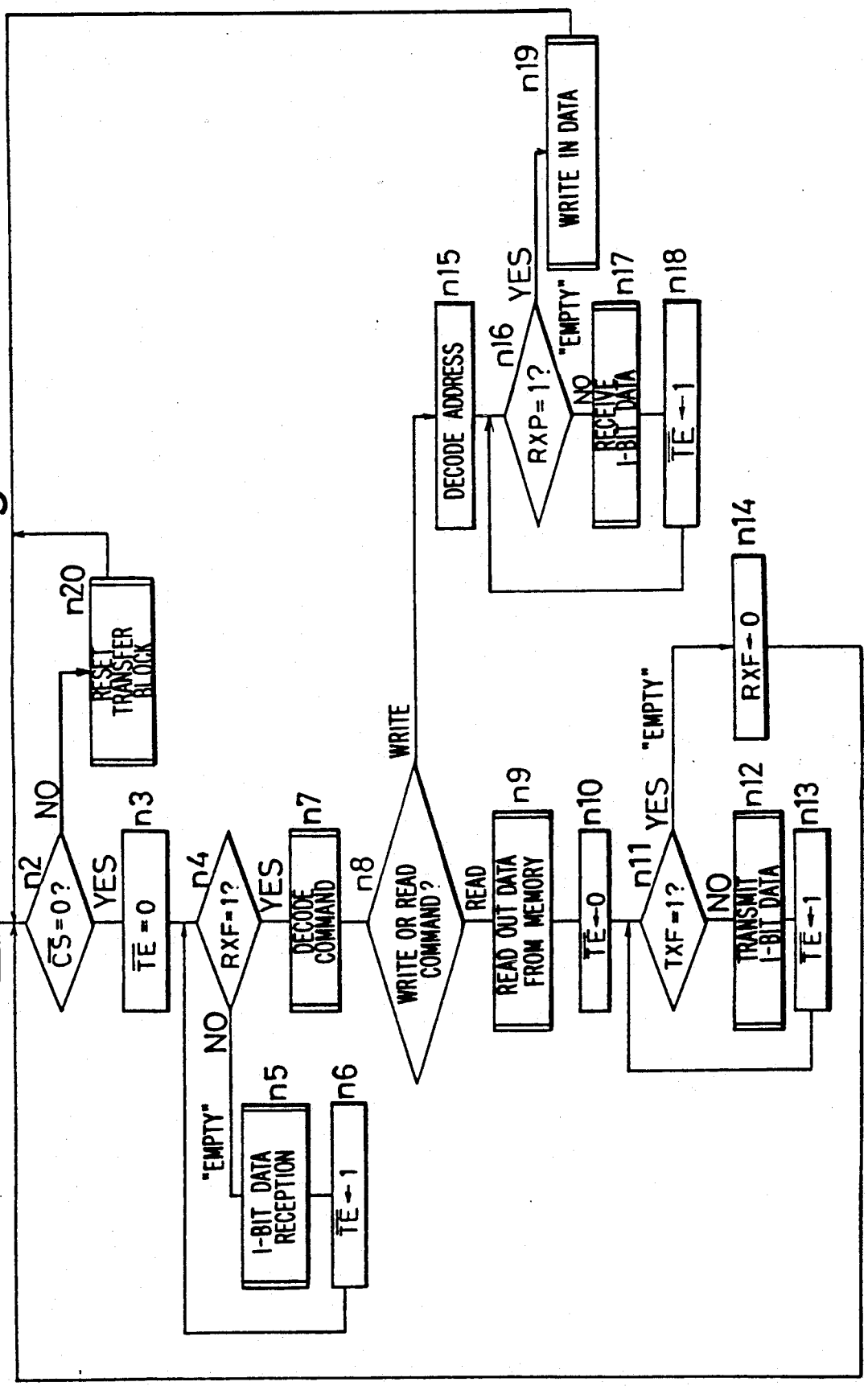
FIG. 7 is a flow chart to explain the operation of the embodiments shown in FIG. 5 and FIG. 6.

FIG. 6 (1)–(5) is a waveform diagram to explain the operation of the embodiment shown in FIG. 5, and FIG. 7 is a flow chart to explain its operation. This flow chart is realized by hardware. When the control signal $\overline{CS}$ is logic 1, it is designed to return to the initial state (reset) by resetting the transfer block at step n20. Changing from step n1 to step n2, it is judged whether the control signal $\overline{CS}$ is logic 0 or not, and this control signal $\overline{CS}$ is indicated in FIG. 6 (1), and when it is judged to be a low level, it means that it is necessary to transfer a signal from the first processor A to the second processor B, thereby advancing to step n3. Here, the control signal $\overline{TE}$ of which logic is 0 is applied from the control circuit 23 to the control circuit 22. The control signal $\overline{TE}$ is intended to permit transfer of a signal, which is indicated in FIG. 6 (2).

At step n4, it is judged whether the transfer action to the receiving register RX2 of the second processor B is finished or not, that is, whether the flag RXF is logic 1 or not, and when the receiving register RX2 is empty, the operation advances to step n5. Here, from the transmitting transistor TX1 of the first processor A to the receiving register RX2 of the second processor B, the signal of one bit out of 24 bits is transmitted through the line 16, in synchronism with the clock signal indicated in FIG. 6 (5). At step n6, the control signal $\overline{TE}$ becomes logic 1, and the operation returns to step n4. Thus, as shown in FIG. 6 (3), signals S1, S2, S3 of 8 bits each are sequentially stored in the receiving register RX2. Of the first 8-bit signal S1, the first two bits are a reading or writing command as stated above, and the remaining 6 bits of the signal S1 and the other two signals S2, S3 are address information of 22 bits in total for specifying the address in the store region in the memory M1.

After the signal is stored in the receiving register RX2, internal arithmetic processing is carried out in the second processor B.

At step n4, when completion of the transfer of 24-bit signal to the receiving register RX2 is judged, the operation goes to the next step n7. The command decoder 19 decodes the first two bits of the command, and applies the result to the control circuit 23. As a result, at step n8, it is judged whether the command is for reading or writing. If reading, the operation goes to step n9. At this step, the address information stored in the receiving register RX2 is decoded by the address decoder 20, and the content in the storage region of the memory M1 in which the address is specified by this is stored in the transmitting register TX2. At step n10, as shown in FIG. 6 (2), the control signal $\overline{TE}$ is logic 0, and at the next step n11, it is judged whether the signal to be transmitted is present or not in the transmitting register TX2, that is, whether the flag TXF is logic 1 or not. Any signal to be transmitted is present in the transmitting register TX2, at step n12, the data is transferred sequentially bit by bit to the receiving register RX1 of the first processor A through line 17 in synchronism with the clock signal shown in FIG. 6 (5). At step n13, the control signal $\overline{TE}$ becomes logic 1. After all the data in the transmitting register TX2 are sent out, the operation advances from step n11 to step n14, and the flag RXF becomes logic 0.

The state of the transfer of data from the transmitting register TX2 to the receiving register RX1 through line 17 is as shown in FIG. 6 (4), and signals S11, S12, S13 in units of 8 bits each are sequentially sent out.

When writing data from the first processor A into the memory M1 of the second processor B, the operation moves from step n8 to step n15. The address information contained in signals S1, S2, S3 is decoded in the address decoder 21. At step n16, it is judged whether a signal is present or not in the receiving register RX2, and if there is no signal left over in the receiving register RX2, the operation advances to step n17, and the signals S11, S12, S13 to express the data to be written are sequentially transferred bit by bit to the receiving register RX2, and stored, as shown in FIG. 6 (4). At step n18, the control signal $\overline{TE}$ becomes logic 1. When signals S11, S12, S13 are stored in the receiving register RX2, the operation moves from step n16 to step n19, and the data of the receiving register RX2 is written into the memory region in which the address is specified through the line 21 by means of the address decoder 20 in the memory M1.

In this way, in the above embodiment, the second processor B is composed of hardware comprising the receiving register RX2, command decoder 19, address decoder 20, memory M1 and transmitting register TX2, and the reading and writing actions by these units are carried out by the hardware, and arithmetic processing other than data transfer can be effected by the control circuit 23 in the processor B, while the data can be transferred at high speed.

Figure 8:
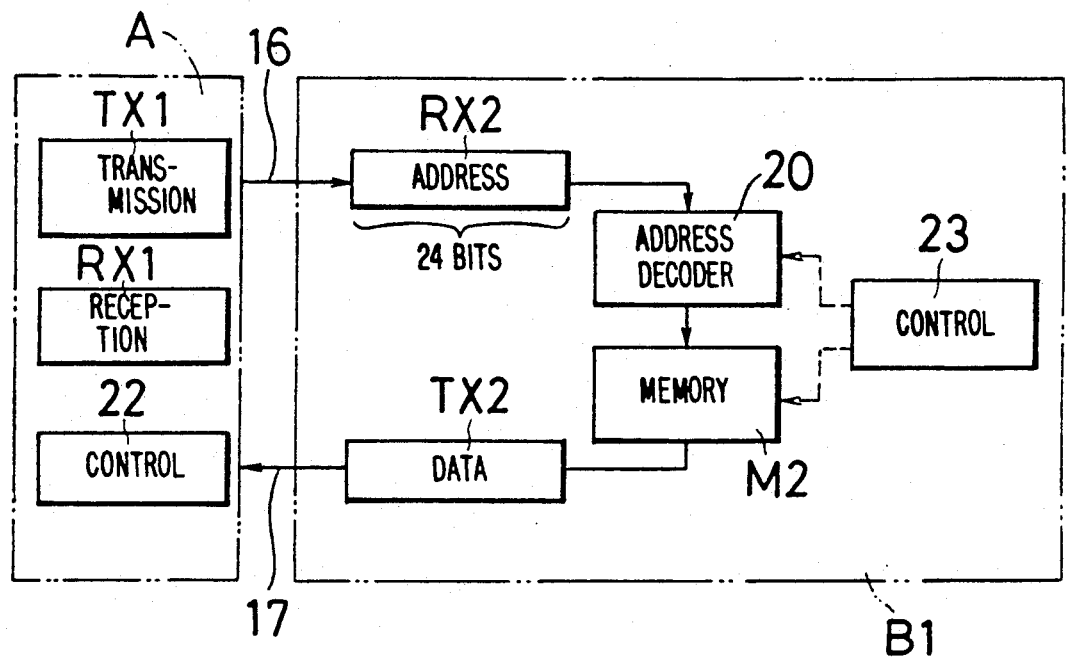
FIG. 8 is a block diagram of other embodiment of the invention.

FIG. 8 is a block diagram of the second processor B1 of a different embodiment of the invention. In this embodiment, which is similar to the foregoing one, corresponding parts are identified with same reference numbers. Of note here is that the data stored in the memory M2 of the second processor B1 is only read out in the first processor A. Therefore, to the receiving register RX2, only the address information for specifying the address in a desired memory region of the memory M2 is transferred by way of the line 16. The address decoder 20 decodes this address information, and consequently the data which is the content stored in the store region of the memory M2 is applied to the transmitting register TX2. This data is transferred from the transmitting register TX2 into the first processor A by way of the line 17. When reading only in this way, the configuration is simplified as compared with the foregoing embodiment.

Figure 9:
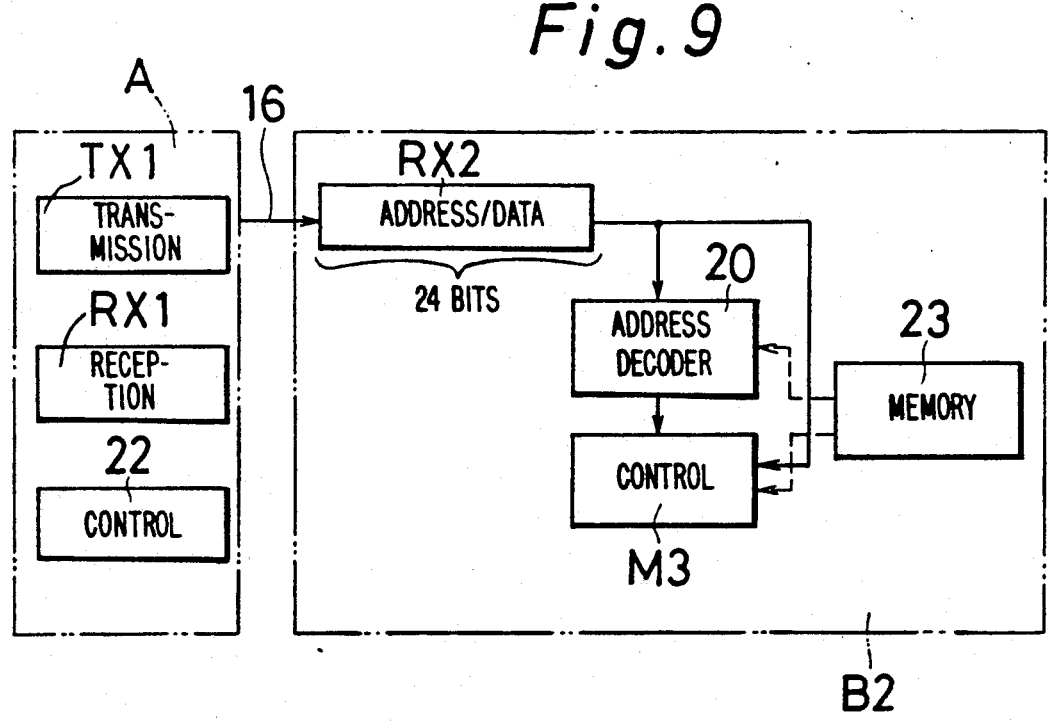
FIG. 9 is a block diagram of a different embodiment of the invention.

FIG. 9 is a block diagram of a further different embodiment of the invention. In this embodiment, which is similar to the foregoing ones, corresponding parts are identified with same reference numbers. Here, the data from the first processor A is only written into a desired storage region in the memory M3 of the second processor B2. First, from the first processor A, the address information is transferred to the receiving register RX2 of the second processor B through line 16. This address information is decoded by the address decoder 20. Next, from the first processor A, the data to be written in the receiving register RX2 is transferred through line 16. This data is provided from the receiving register RX2 into the the memory M3, and the data is thus written into the store region in which the address is specified, by the address decoder 20. In such an embodiment for writing only, the configuration may be simplified as compared with the embodiment shown in FIGS. 5 to 7.

This invention may be also executed in relation to the processing of sound signals, and may be also embodied in other technical fields.

According to the invention, as understood from the description herein, the data can be transferred at high speed, and in the first and second processors adverse effects on other arithmetic processing by data transfer may be avoided.

FIG. 10 is a block diagram showing a configuration of an embodiment of the invention. This embodiment contains an arithmetic control device 21 realized by, for example, an arithmetic processor, and a processor 22. The arithmetic control device 21 comprises a buffer register for transmission 23 and a buffer register for reception 24, and these buffer registers 23, 24 are connected to the address bus and data bus contained in the arithmetic control device 21 to access the data. Transmitting register 25 and receiving register 26 are connected to these buffer registers 23, 24.

The processor 22 comprises, for example, 4-bit command register 27 and 12-bit address register 28, and to these registers 27, 28, transmission data D1 is fed from the transmitting register 25 of the arithmetic control device 21. The content of the command register 27 is analyzed in the command decoder 29, and a corresponding action is executed in the processor 22. On the other hand, the registers 27, 28 are read by a cycle still control unit 30, and the address data is exchanged with the address bus between timings of arithmetic processings.

The processor 22 also possesses a data register 32 of, for example, 24 bits for storing the data main body to be transmitted which is contained in the transmission data D1. It is an important object of this embodiment that this data register 32 can be used commonly for transmission and reception for the arithmetic control device 21. In these registers 27, 28 and data register 32, the clock signal CK generated by the arithmetic control device 21 is entered as being changed over by the changeover switch 33 as described below.

The latch control signal $\overline{LC}$ as stated later to be delivered from the arithmetic control device 21 is entered in the data latch control unit 34 which is provided in the processor 22, and the data latch control unit 34 correspondingly controls the changeover mode of the changeover switch 33 and the data latch actions in the registers 27, 28, 32. The content in the data register 32 is written into the memory 36 realized by, for example, a random access memory, by the address data supplied in the address bus 31 through the data bus 35, and this content is read out.

Figure 1:
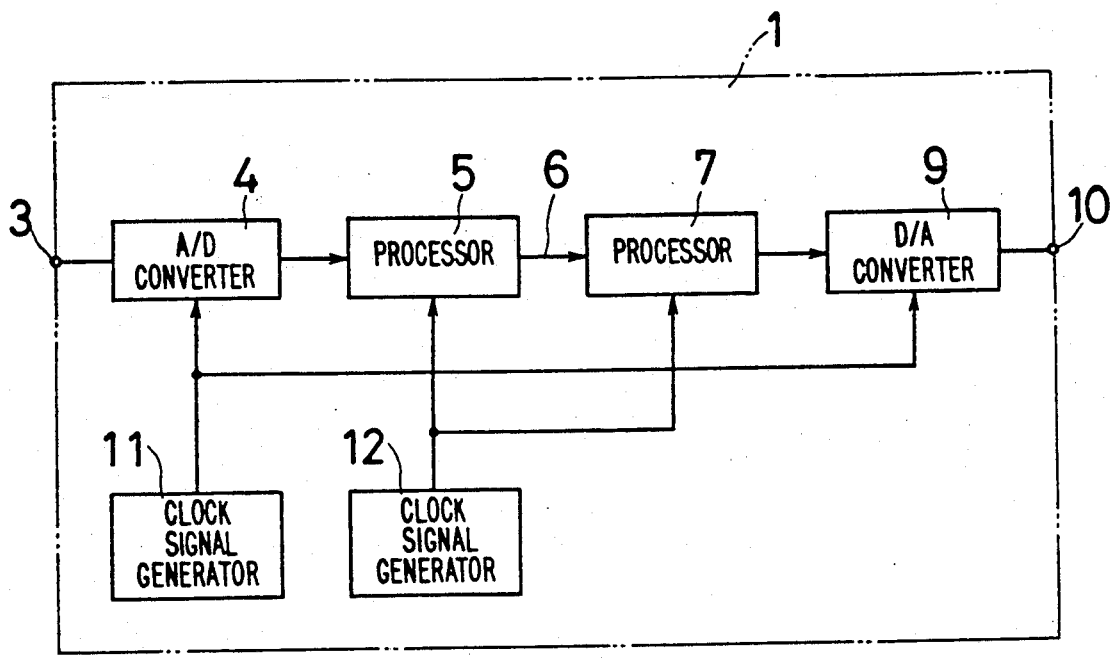
FIG. 1 is a block diagram showing a structure of a sound signal processing apparatus 1 in the prior art.
Figure 2:
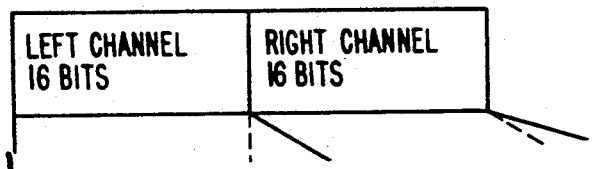
FIGS. 2 (1) and (2) are diagrams showing sound signal processing in the prior art.
Figure 2:
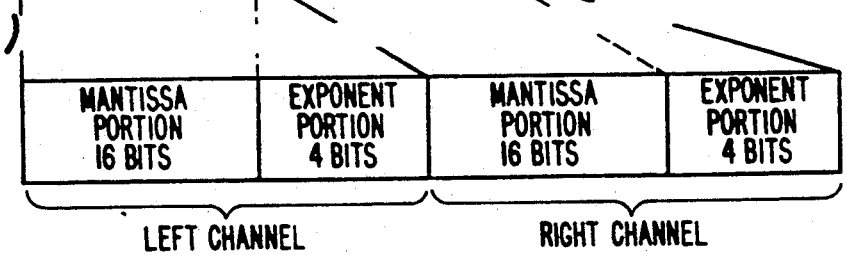

FIG. 11 (1)–(5) constitute a timing chart to explain the writing action in the configuration shown in FIG. 10. Referring to also FIG. 2, the writing action of the embodiment is explained below. At time t1, the arithmetic control device 21 changes the chip select signal $\overline{CS}$ to a low level as shown in FIG. 11 (1), and the processor 22 is selected. In turn, the processor 22 changes the transfer control signal $\overline{TE}$ to a low level, and the data transfer between the arithmetic control device 21 and processor 22 is realized. At this time, the data latch control unit 34 is also reset, and the changeover switch 33 is changed over to the side of registers 27, 28.

Afterwards, as shown in FIG. 11 (4), as the transmission data, the command data denoting the writing command and the address data indicating the destination of writing of the data main body are transferred to the command register 27 and the address register 28, according to the clock signal CK entered from the arithmetic control device 21. When transfer is started, the latch control signal $\overline{LC}$ is set to a low level as shown in FIG. 11 (3). Furthermore, at time t2 when this transfer is complete, as shown in FIG. 11 (3), the latch control signal $\overline{LC}$ is set to high level. At this timing, the command data and address data are latched in the command register 27 and address register 28. At the same time, the changeover switch 33 is changed to the side of the data register 32 by the data latch control unit. Next, in succession, as shown in FIG. 11 (2), the transfer control signal $\overline{TE}$ becomes a high level, and the transfer is prohibited.

At time t3, the transfer control signal $\overline{TE}$ becomes a low level so as to be ready to transfer again, and the data main body to be stored in the address which is stored in the address register 28 is transferred to the processor 22 as shown in FIG. 11 (4). The arithmetic control device 21 delivers a clock signal CK, and transfers the data main body to the data register 32. At the same time, the latch control signal $\overline{LC}$ is set to a low level. When this latch action is complete, the latch control signal $\overline{LC}$ is set to a high level, and the changeover switch 33 is changed again to the side of registers 27, 28.

Consequently the transfer control signal $\overline{TE}$ becomes a high level to prohibit transfer. Later, the chip select signal $\overline{CS}$ becomes a high level, and the writing action is complete.

FIG. 12 (1)–(6) constitute a timing chart to explain the data reading processing from the processor 22 by the arithmetic control device 21 in the configuration shown in FIG. 10. Referring to FIG. 3, the data reading processing is explained below. In the reading process, in this configuration, first the chip select signal $\overline{CS}$ is set to a low level at time t5 as shown in FIG. 12 (1), and the processor 22 is selected. Then the transfer control signal $\overline{TE}$ becomes a low level, and the data can be transferred between the arithmetic control device 21 and the processor 22. From the arithmetic control device.. 21, as shown in FIG. 12 (4), the command data denoting the reading command, and the address data to specify the address in, for example, the memory 36 of the processor 22 in which the data to be read is stored are transferred to the processor 22. At the same time, the latch control signal $\overline{LC}$ is set to a low level.

At this time, similarly to the case of FIG. 11, the latch control signal is reset by the rise of the chip select signal $\overline{CS}$, and the changeover switch 33 is changed to the side of registers 27, 28. Thus, the command data and address data which are transmission data D1 are written into the command register 27 and address register 28. The contents of these registers 27, 28 are latched in the command register 27 and address register 28 at the timing where the latch control signal $\overline{LC}$ becomes a high level at time t6 in FIG. 12. At this time, the changeover switch 33 is changed to the side of register 32.

The latched address information is decoded next in the cycle still control unit 30, and the data of the corresponding address in, for example, the memory 36 provided in the processor 22 is read out, and is stored in the data register 32. At time t7 after such storing, the transfer control signal $\overline{TE}$ becomes a low level. Afterwards, as shown in FIG. 12 (5), the data stored in the data register 32 is read out according to the clock signal CK from the arithmetic control device 21, and is stored as the reception data D2 of the arithmetic control device 21.

When data transmission is complete in this way, as in the case of FIG. 11, the latch control signal $\overline{LC}$ becomes a high level, and the transfer control signal $\overline{TE}$ and chip select signal $\overline{CS}$ sequentially become a high level, thereby finishing the reading processing.

In the above writing processing and reading processing, when the data to be written after time t3 in FIG. 11 has, for example, 24 bits, the time required for this writing action is 753 μs, nearly the same as in the prior art, as calculated by the present inventor.

On the other hand, when reading data out of the processor 22, as explained by reference to FIG. 3, the address of the data to be read out is transferred, and in this case, too, the necessary time has been confirmed to be nearly 753 μs, the same as in the prior art.

As stated above, the configuration shown in FIG. 10 can realize a same action as in the prior art. In this embodiment, the data register 32 is used for both reception and transmission, and the transfer relation has been confirmed to be reduced by about 30% as compared with the prior art shown in FIG. 4. Incidentally the data length to be transferred may be, for example, 40 bits (5 bytes) in both reading and writing processings, the transfer time can be shortened by about 36% as compared with the prior art in the data reading action.

In this embodiment, meanwhile, the input destination of the data delivered from the control device is changed over by changing the clock applied to the first and second memory means, but otherwise the data transfer route itself to the first and second memory means may be changed over.

In this case, however, it is necessary to take in the data immediately when a specified number of pieces of data is entered, and as a result the hardware configuration becomes complicated and the time to take in the data is defined, which are actually demerits.

In this embodiment, moreover, a synchronous communication to synchronize with the external clock is shown, but this invention is also applicable to a synchronous communication (start/stop synchronous communication) by using clock and others generated inside.

Thus, according to the invention, it is possible to transfer data at high frequency by a simple construction.

FIG. 13 is a block diagram showing a configuration of an embodiment of the invention. This embodiment comprises an arithmetic control device 21 realized, for example, by an arithmetic processing unit, and a processor 22.

The arithmetic control device 21 is composed of a transmitting register 23 and a receiving register 24, and the transmitting register 23 delivers the write data DW into the processor 22, while the processor 22 sends the read data DR into the receiving register 24.

The processor 22 incorporates the transfer register 27 composed of the address register 25 and data register 26 for storing the address and data to make up the write data DW, and other data register 50 for delivering internal data. The content of the transfer register 27 is stored in the address register 29 and data register 30 which make up the buffer register 28. The contents of the address register 29 and data register 30 are exchanged with the address bus 31 and data bus 32 of the processor 22.

The processor 22 is provided with a gate control unit 33 for various logic gates (not shown). There is also a binary counter 34 for counting the clock signals CK supplied from the arithmetic control device 21. The output of the binary counter 34 is applied in parallel to the decoders 35, 36. The outputs of the decoders 35, 36 are fed into one of the input terminals of two-input AND circuit 37, 38, respectively.

To the AND circuit 38, a control signal R/$\overline{W}$ for indicating either the reading action state or writing action state to the processor 22 is entered, depending on whether the level is high or low, from the arithmetic control device 21 through the line 39 as stated later. At the other input terminal of the AND circuit 37, a signal being inverted from the control signal R/$\overline{W}$ in the inverter circuit 40 is fed. The outputs of the AND circuits 37, 38 are entered in the OR circuit 41, and the output of the OR circuit 41 is applied to the address register 29 and data register 30 as latch control signal.

Figure 14:
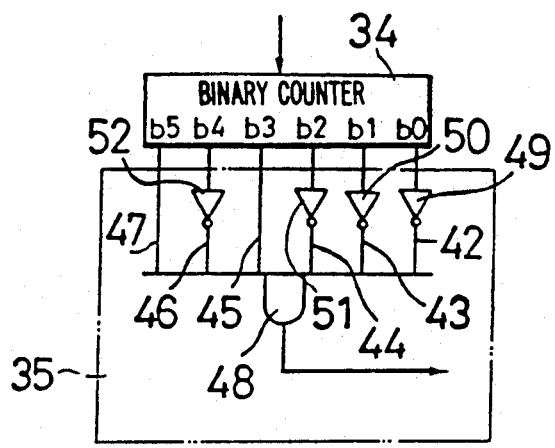
FIG. 14 is a block diagram showing an example of the structure of a decoder 35.
Figure 15:
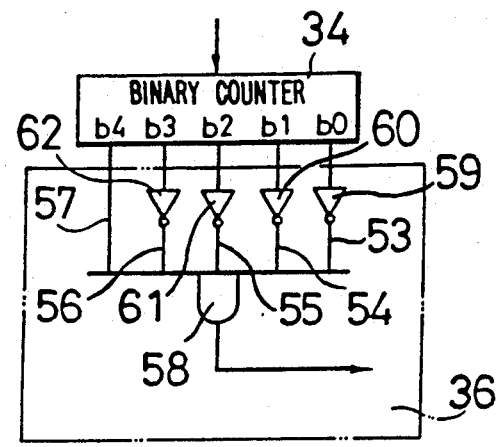
FIG. 15 is a block diagram showing an example of the structure of a decoder 36.

FIG. 14 and FIG. 15 are block diagrams showing the configuration of the decoders 35, 36. In this embodiment, of the data transferred between the arithmetic control device 21 and the processor 22, the address data has 16 bits and the main body data has 24 bits, and therefore, the data length of 40 bits is assumed in the following explanation. The decoder 35 uses the output of the lower 6 bits (b5, b4, b3, b2, b1, b0) of the binary countee 34, for example as shown in FIG. 14. This output of the lower 6 bits is entered in the AND circuit 43 through signal lines 42 to 47 from the lower bit side. On the signal lines 42, 43, 44, 46, there are respective inverter circuits 49 to 52. The output of the AND circuit 48 becomes a high level when the lower 6 bits of the binary counter 34 are $$(b5,b4,b3,b2,b1,b0)=(1,0,1,0,0,0)\ldots \quad (1)$$

and this case corresponds to 40 in decimal notation.

The decoder 36 basically has the same constitution, and the lower 5 bits of the binary counter 34 are used. From the lower bit side, the content of each bit is entered in the AND circuit 58 through signal lines 53 to 57. At this time, inverter circuit 59 to 62 are disposed on the signal lines 53 to 56. By the output of such decoder 36, the output of the AND circuit 58 becomes high level when the lower 5 bits are $$(b4,b3,b2,b1,b0)=(1,0,0,0,0)\ldots \quad (2)$$

and this case corresponds to 16 in decimal notation.

Figure 16:
FIGS. 16 (1)-(5) are timing charts to explain the operation of the same embodiment.
Figure 16:
Figure 16:
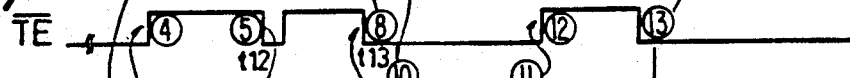
Figure 16:
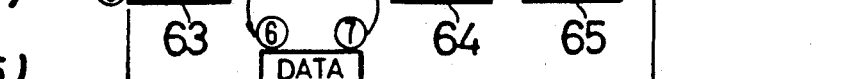
Figure 16:

FIG. 16 (1) to (5) constitute a timing chart to explain the operation of this embodiment. Referring now to these drawings together, the operation of this embodiment, is described below. The symbols (1), (2) . . . (14) which follow correspond to the processing steps denoted by the circled reference numbers shown on FIG. 16. In the reading cycle SR started from time t11 (1) first the control signal R/$\overline{\text{W}}$ is set to high level, and it is instructed to read out the data from the processor 22. (2) Next, as shown in FIG. 16 (1), the chip select signal $\overline{\text{CS}}$ is set to a low level, and the processor is selected.

(3) The arithmetic control device 21, as shown in FIG. 16 (4), starts to transfer the address in which the data to be read in the processor 22 is stored, to the processor 22. Here (4) the processor 22 set the transfer permit signal $\overline{\text{TE}}$ to high level as shown in FIG. 16 (3), and the transfer from the processor 22 is prohibited. When transfer of the address data 63 is complete, the processor 22 reads out the internal data of the address, and when the output to the arithmetic control device 21 is complete, (5) at time t12, the transfer permit signal $\overline{\text{TE}}$ is set to a low level, and the transfer prohibit state is canceled.

(6) On the basis of the clock signal CK from the arithmetic control device 21, as shown in FIG. 16 (5), the data is read out from the processor 22 into the arithmetic control device 21. When the data transfer is over, (7) at time t13, the transfer permit signal $\overline{\text{TE}}$ is set (8) to a low level, and the transfer prohibit state is canceled again. This ends the data reading processing.

In the writing cycle SW, (9) the control signal R/$\overline{\text{W}}$ is set to a low level, and the writing action from the arithmetic control device 21 to the processor 22 is indicated.

(10) Next, as shown in FIG. 16 (4), the arithmetic control device 21 sends out (11) the address data 65 in succession to the main body data 64 to be stored in the processor 22. (12) When send-out of the address data 65 is started, the transfer permit signal $\overline{\text{TE}}$ becomes a high level at the processor 22 side, and the transfer is prohibited. (13) When the transfer of the address data 65 is complete and writing into the specified address of the internal memory is complete, the transfer permit signal $\overline{\text{TE}}$ becomes a low level, and the transfer is ready. (14) Sequentially, at the arithmetic control device 21 side, the chip select signal $\overline{\text{CS}}$ is set to a high level, and data writing is finished.

At this time, as shown in FIG. 13, while the control signal R/$\overline{\text{W}}$ is a high level, the AND circuit 38 is selected. In order words, in order to transfer data, the clock signals delivered from the arithmetic control device 21 are counted by the binary counter 34, and its output is delivered to the decoders 35, 36 as explained by reference to FIG. 14 and FIG. 15. During the period of reading cycle SR, the decoder 36 is selected by the AND circuit 38, and when the binary counter 34 counts 16 bits as explained in relation to FIG. 15, the output of the AND circuit 58 is changed to the high level, and the data is latched into the buffer register 28.

Figure 17:
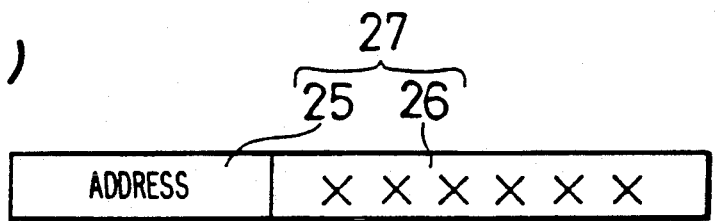
FIGS. 17 (1)-(2) are diagrams to show the relation between the data transfer sequence and register.
Figure 17:
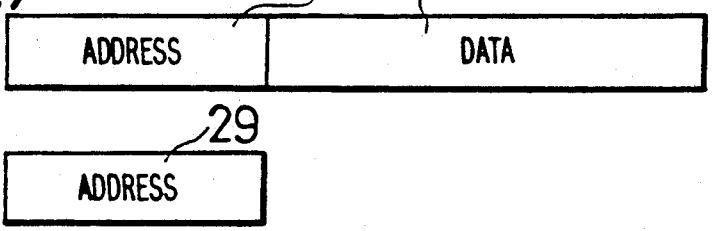

FIG. 17 (1)–(2) shows the setting state of the address and data in the register, in which FIG. 17 (1) indicates the data reading mode, and FIG. 17 (2) denotes the data writing mode.

In this way, when transferring the address from the address register 25 to the buffer register 29, it is sufficient to read out always from the same position, and changeover circuit or the like is not necessary.

At this time, when there are only 16 bits as mentioned above, the address data 63 is only transferred, and the address data stored in the address register 25 is latched in the address register 29 of the buffer register 28. By thus latched address data, reading of internal memory after time t12 is effected.

In the writing cycle SW, on the other hand, the control signal R/$\overline{\text{W}}$ is at a low level, and the decoder 35 is selected by the AND circuit 37. At this time, when counting of 40 bits is finished by the binary counter 34, a latch control signal is delivered to the buffer register 28. Such a case corresponds to transfer of main body data 64 and address data 65 after time t3 in FIG. 16, and when transfer of such address data 65 is complete, the latching action from the transfer register 27 to the buffer register 28 is effected.

By this embodiment, as is obvious from the description herein, the command 15 explained in the prior art may be deleted from the transfer data, and the dummy main body data 17 may be also eliminated. Hence, the data length necessary for transfer is significantly shortened, and the transfer speed is increased, while the transfer efficiency is notably enhanced.

The composition of the decoders 35, 36 is, however, not limited to the configurations in FIG. 14 and FIG. 15.

Thus, according to this invention, reading action and writing action carried out between the control device and the processor may be distinguished only by the level of the signal line, without having to send the corresponding commands to each other. Further, when taking out from the transfer register to the buffer register, it is sufficient to read out only from the same position, and any hardware for changeover is not needed, and the construction may be simplified. Furthermore, the data length responsible for transfer may be reduced, and the data may be transferred efficiently, while the transfer speed may be superbly increased.

FIG. 18 is a block diagram of an embodiment of the invention. By the command from a first processor U1, (a) the data stored in the storage region of memory M1 provided in a second processor U2 is read out, and is received by the first processor U1, or (b) the data from the first processor U1 may be written into the storage region of the memory M1. From the transmitting register TX1 of the first processor U1, various sets of combined information A to E consisting of a total of 24 bits in unit of 8-bits each are sequentially sent out to the receiving register RX2 of the second processor U2 through line 16. From the transmitting register TX2 of the second processor U2, the data is sent out sequentially bit by bit to the receiving register RX1 of the first processor U1 by way of line 17.

Figure 19:
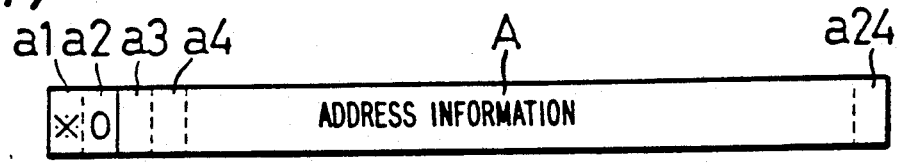
Figure 19:
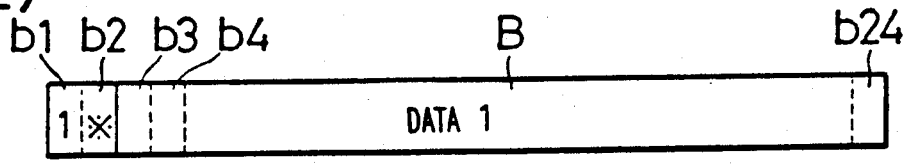
Figure 19:
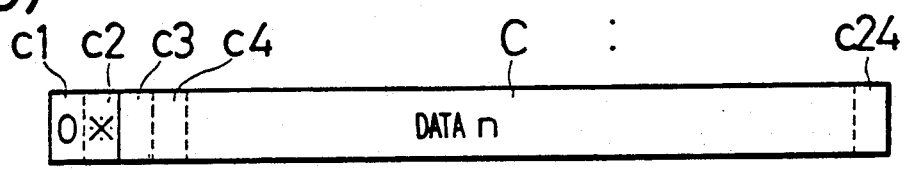

FIG. 19 (1)–(3) shows the composition of combined information sets A to C which are led out into the line 16 when the data is written into the memory M1 of the second processor U2 from the first processor U1. When writing data from the first processor U1 into the memory M1 of the second processor U2, to begin with, the first combined information A is sent out from the first processor U1 as shown in FIG. 19 (1). In this information A, the first bit a1 is a redundancy indicated by the * mark, the second bit a2 is 0 which is a write command to instruct to write the data, and the third bit a3 to the 24th bit a24 are the address information for specifying the first storage region address to be written in.

In succession, from the first processor U1, the second combined information B is sent out as indicated in FIG.

19 (2). In this information B, the first bit b1 is a continued write command, which is 1 to express to continue to write in FIG. 19 (2), the second bit b2 is the * mark to express the redundancy, and the third bit b3 to the 24th bit b24 denote the first data to be written in the memory M1. Such second combined information B is sent out repeatedly by the number of data sets, and in the information C including the final n-th data indicated in FIG. 19 (3), the first bit c1 is 0 to express stopping of the writing action, the second bit c2 is the * mark to denote redundancy, and the third bit c3 to the 24th bit c24 are the n-th data to be written in. If the data sent out from the first processor U1 is only one, after the information A is sent out, the information C is sent out, and the writing action is terminated.

When reading out the data stored in the memory M1 of the second processor U2 into the first processor U1, the third combined information D is sent out as indicated in FIG. 20 (1) from the first processor U1. In this information D, the first bit d1 is a block transfer command to indicate whether or not the block transfer for sequentially reading out from the storage region possessing plural addresses each, the second bit d2 is 1 which is a reading command to instruct to read out the data, and when the first bit d1 is 1 as shown in FIG. 20 (1), it is regarded as block transfer, and the data is sequentially read out from the storage region of the address specified by the address information of the third bit d3 to the 24th bit d24.

When the first bit d1 of this information D is 1, that is, when it is a block transfer, the fourth combined information E shown in FIG. 20 (2) is sent out in succession to the information D from the first processor U1. In this information E, the first and second bits e1, e2 are the *mark to denote the redundancy, and the third bit e3 to the 24th bit e24 are the word number information to express the number of words of the data to be read. Therefore, the data is sequentially read out from the memory M1 by the number of words expressed by the word number information of information E, starting from the storage region in which the address is specified by the address information of information D.

In this way, the 24-bit information sets A to E are sent out from the first processor U1 to the second processor U2. Of these 24 bits, the first two bits are a command to express reading or writing as mentioned above, and this command is given to the command decoder 19 through the line 18. In the remaining 22 bits of the receiving register RX2, the address information for reading and writing, or the data to be written or the word number information to be read out is stored.

The address information stored in the receiving register RX2 is applied to the address decoder 20 through the line 29, and the address is specified in the storage region in the memory M1. In relation to the address decoder 20, a counter 28 is provided, and this counter 28 specifies the address by incrementing sequentially every time the data is written or read, from the first address specified by the address information.

The data stored in the receiving register RX2 is given to the memory M1 from the line 21, and data is stored in the storage region specified by the address decoder 20.

The word number information stored in the receiving register RX2 is given to the counter 26 through the line 30, and the counter 26 stores this word number information as the counting, and every time the data is read out, the counting is decremented until zero, when the signal is led out to the control circuit 23 through the line 27, and the data reading action is stopped.

When reading out data from the memory M1 and transferring to the first processor U1, the data stored in the storage region in the memory M1 in which the address is specified by the signal from the address decoder 20 is applied to the transmitting register TX2, and the content of this transmitting register TX2 is transferred to the receiving register RX1 of the first processor U1 through the line 17.

The registers TX1, RX1 in the first processor U1 are controlled by the control circuit 22. A control circuit 23 is similarly provided in the second processor U2. This control circuit 23 controls the address decoder 20 and the memory M1 in response to the signal from the command decoder 19, and a control signal $\overline{TE}$ is sent out to the control circuit 22 by way of line 24, while the control signal $\overline{CS}$ is received from the control circuit 22 through line 25.

FIG. 21(1)–(5) is a waveform diagram to explain the operation of the embodiment shown in FIG. 18, and FIG. 22 is a flow chart for explaining its operation. Incidentally, the operation conforming to the flow chart in FIG. 22 is realized by hardware. At step n1, in the control signal $\overline{CS}$ is logic 1, the operation advances to step n2, and the transfer block is reset to return to the initial state. At step n1, therefore, it is judged whether the control signal $\overline{CS}$ by way of line 25 is logic 0 or not, and this control signal $\overline{CS}$ is indicated in FIG. 21 (1), and when it is judged to be of a low level, it means that it is necessary to transfer the information A to E to the second processor U2 from the first processor U1, and the operation goes to step n3. Here, the control signal $\overline{TE}$ which is logic 0 is applied to the control circuit 22 from the control circuit 23 by way of line 24. The control signal $\overline{TE}$ is a signal for permitting transfer of information A to E, which is shown in FIG. 21 (2).

At step n4, the first or third combined information A, D is sequentially transferred bit by bit from the transmitting register TX1 of the first processor U1 to the receiving register RX2 of the second processor U2 through line 16, in synchronism with the clock signal indicated in FIG. 21 (5). Thus, as shown in FIG. 21 (3), information A and D are sequentially stored in the receiving register RX2 as 8-bit signals S1, S2, S3. Of the first 8-bit signal S1, the first two bits are a reading or writing command as stated above, and the remaining 6 bits of the signal S1, and the other two signals S2, S3 are address information in a total of 22 bits for specifying the address the store region in the memory M1.

After the signal is stored in the receiving register RX2, internal arithmetic processing is carried out in the second processor U2.

At step n5, the second bit a2 or d2 of the first or third combined information A or D being received is decoded by the command decoder 19, and the result is provided to the control circuit 23. At step n6, the address information stored in the receiving register RX2 is decoded by the address decoder 20. At step n7, the command decoded at step n5 is judged to be a writing or reading command.

At step n7, when the command is judged to be a data writing command, the operation goes to stop n8, and the control signal $\overline{TE}$ is set to logic 0 as shown in FIG. 21 (2), and the second combined information B, C composed of 8-bit signals S11, S12, S13 is received as shown in FIG. 21 (4), and at step n9 the data contained in the third bit b3, c3 to the 24th bit b24, c24 of thus received information B, C is written into the storage region of the address which is decoded by the memory M1. At step n10, it is judged whether or not to continue writing from the first bit b1, c1 of the information B, C, and if yes, at step n11, the address of the address decoder 20 is incremented by the counter 28, thereby returning to step n8, and data writing is continued. If judged to stop writing a step n10, the operation returns to step n1.

At step n7, if the data reading command is identified, the operation advances to step n12, and the counter 26 is cleared. At step n13, it is judged whether or not to transfer block from the first bit d1 of the information D, and if yes, that is, if the first bit d1 is 1, at step n14, the control signal $\overline{TE}$ is set to logic 0 as shown in FIG. 21 (2), and the fourth combined information E composed of 8-bit signals S11, S12, S13 is received as shown in FIG. 21 (4), and the operation advances to step n15. In step n13, if judged not to be block transfer, that is, if the first bit d1 is 0, the operation directly goes to step n15. At step n15, the data in the storage region of the memory M1 in which the address is specified is stored in the transmitting register TX2 and is set. At step n16, the data for one word portion is transferred from the transmitting register TX2 to the receiving register RX1, and at step n17 it is judged whether the counting of the counter 26 is zero or not. If not zero, the operation advances to step n18, and the counter 26 is decremented, and the address is incremented at step 19, thereby returning to step n15. At step n17, if the counting of the counter 26 is zero, the operation return to step n1.

In this embodiment, as described herein, when writing plural data from the first processor U1 into the memory M1 of the second processor U2, the first processor U1 is not required to send out the address information for every data to be written, and the second processor U2 is required only to write in the data sequentially until the continued write command denotes stopping of the writing action. Therefore, the quantity of address information to be sent out from the first processor U1 to the second processor U2 may be saved, and the data writing speed may be enhanced. Similarly, when reading out data from the memory M1 of the second processor U2 into the first processor U1, it is not necessary to sent out the address information for every data to be read out, and the second processor U2 has only to read out the data sequentially by the number of words expressed by the word number information, so that the reading speed may be enhanced. Furthermore, since these processings are realized by the hardware, the period will not become short for digital signal processing in every sampling period as mentioned in relation to the background technology, and it is not needed to extend the sampling period, so that the quality of signal processing may be favorably maintained.

According to the invention, as understood from the above description, when writing plural sets of data from the first processor to the second processor, or when reading out from the second processor to the first processor, it is not necessary to send out the address information for every data to be written or read, and the data writing or reading speed may be enhanced, and the time for digital signal processing may be increased.

FIG. 23 is a block diagram of an embodiment of the invention. The data is sequentially transferred in series bits, from a processor A to another processor B. The processor A is provided with transmitting means 8, and the other processor B has receiving means 9. The data to be transmitted at the transmitting means 8 are stored in first transmitting registers A1 to An in a total number of n, and the store cell of each bit is indicated by reference code a11, a12, a13 ... ; a21, a22, a23, ... ; to an1, an2, an3, .... The data of every bit from these transmitting registers A1 to An are sequentially transferred to the receiving means 9 from the line 11 through OR gate G1. In these transmitting registers A1 to An, signals for synchronizing are given from the first n cells CA1 to CAn of the shift register CA.

From the clock signal generator circuit 10 to line MCLK, a clock signal of a predetermined specified period is provided. This clock signal generator circuit 10 leads out one clock signal once in every n times of the clock signal MCLK to the line CK1, an applies to the shift register CA. The shift register CA, responding to the clock signal by way of line CK1, sets the first cell CA1 to logic 1, and the remaining store cells CA2 to CAn to logic 0. Further, responding to the clock signal by way of the line MCLK, the shift register CA sequentially moves the single store cells CA1 to CAn of which logic is 1. This shift register CA does not return the initial cell CA1 to logic 1, if more than n clock signals are entered from the line MCLK, as far as clock signal is not entered through line CK1, and in the period while the clock signals through the line MCLK are being fed by the number exceeding the plurality n as mentioned above, all cells CA1 to CAn remain at logic 0 unless the clock signals are fed from the line CK1. In the explanation to follow, the reference codes MCLK, CK1 denote the lines, and may also indicate the clock signals by way of such lines.

At the receiving means 9, second m receiving registers B1 to Bm are provided, and data are commonly applied to these receiving registers B1 to Bm by way of line 11. This shift register CB possesses a structure similar to that of the above shift register CA, and also has cells CB1 to CBm. When the logic 1 signals from these cells CB1 to CBm are respectively applied to the corresponding receiving registers B1 to Bm, the store contents of the cells b11, b12, b13, ... ; b21, b22, b23, ... ; b31, b32, b33, ... ; ~; bm1, bm2, bm3, ... are led into the receiving registers B1 to Bm bit by bit. In the shift register CB, clock signals MCLK, CK1 from the clock signal generator circuit 10 are respectively applied.

Referring now to FIG. 24 (1)–(6), the operation when the first plural number n and second plural number m are equal to each other (n=m) is explained below. FIG. 24 (1) shows the sequential data of the bits which are led out into the line (1 through the OR gate G1 from transmitting registers A1 to An of the processor A. Such data is led out in synchronism with the clock signal MCLK shown in FIG. 24 (2). The clock signal CK1, as shown in FIG. 24 (3), is generated at every plural n (=m) clock signals MCLK. To the cells CA1, CA2, CA3 of the shift register CA to the transmitting registers A1, A2, A3, transmission signals T1a, T2a, T3a are sequentially led out as shown in FIG. 24 (4), (5), and (6), and these signals T1a, T2a, T3a correspond to the fact that the contents of the cells CA1, CA2, CA3 are logic 1, and a similar operation is conducted thereafter. Thus, over a whole cycle W, the contents of the first cells a11, a21, a31, ... , an1 of the transmitting registers A1 to An are sent out. In the subsequent cycles, the data from the second cells a12, a22, a32, ... , an2 of the transmitting registers A1 to An are sequentially led out. Repeating such operation, the contents of the transmitting registers A1 to An are led out into line 11, and transferred.

At the processor B, in the receiving means 9, reception to the cells of the receiving registers B1 to Bm is effected on the basis of the output from one cell of which logic is 1 out of the cells CB1 to CBm of the shift register CB. In other words, the transmitting register A1 corresponds to the reception register B1, and the content of the cell a11 is transferred to the cell b11 and stored, while the content of the cell a21 of the transmitting register A2 is transferred to the cell b21 of the receiving register B2 to be stored. Thereafter, similarly, the content of the cell an1 of the transmitting register An is stored in the cell bm1 of the receiving register Bm. In this way, data transfer of one cycle is complete.

Here, a clock signal CK1 is generated, and the first transmitting register A1 and receiving register B1 of the next cycle correspond to each other, and thereafter the contents of the cells a12, a22, ..., an2 of the transmitting registers A1, A2, ..., An are sequentially stored in the cells b12, b22, ..., bm2 of the receiving registers B1, B2, ..., Bm.

FIG. 25 (1)-(8) is a drawing to explain the operation when the first plural number n is less than the second plural number (n<m). As shown in FIG. 25 (1), from the transmitting registers A1 to An to line 11, the data of cells a11, a21, ..., an1 of each stage are sequentially sent out. In the period while the clock signals MCLK shown in FIG. 25 (3) are being generated over the plural number n, data is not sent out on line 11. At the receiving means 9, reception of data to the first stage cells b11 to bm1 of the receiving registers B1 to Bm of second plural number m is realized as shown in FIG. 25 (2), in response to the clock signal MCLK.

Every time a clock signal MCLK of a plural number m is generated, one clock signal CK1 is generated, which causes to transfer the data of the next cycle. The waveform of clock signal CK1 is as shown in FIG. 25 (4). Of the signals being led out from cells CB1 to CBm of the shift register CB, those representatively indicated by reference codes T1b, T2b, T3b, ..., Tmb are respectively shown in FIG. 25 (5), (6), (7) and (8).

FIG. 26 (1)-(8) is a drawing to explain the operation when the first plural number n exceeds the second plural number (n>m). From the transmitting means 8, the bit-sequential data as shown in FIG. 26 (1) is transferred to line 11. At the receiving means 9, the data can be stored to the first stage cells b11, 2b1, ..., bm1 of the receiving registers B1 to Bm as shown in FIG. 26 (2), and if a clock signal MCLK shown in FIG. 26 (3) is further applied later, storing in the receiving registers B1 to Bm in that cycle will not be enabled. The clock signal CLK is generated upon every generation of clock signal MCLK of very first plural number n as shown in FIG. 26 (4). In this way, the signal of logic 1 is sequentially led out into cells CA1 to CAn of the shift register CA of the transmitting means 8 as shown in FIG. 26 (5), (6), (7) and (8), and the data transfer from the first stage cells a11, to an1 of the transmitting registers A1 to An of the first plural number n is finished. In the second cycle, the data is transferred from the second cells a12 to an2 of the transmitting registers A1 to An, and is received at the receiving means 9.

In a further different embodiment of the invention, it may be also possible to compose so that one clock signal CK1 may be generated every time pulses of clock signal MCLK are generated by a predetermined number exceeding the first plural number n and second plural number m.

FIG. 27 is a block diagram of a still different embodiment of the invention, in which between the transmitting means 81 and receiving means 91, digital sound signals in a total of two channels of 16 bits each are transferred, and from another transmitting means 82 to receiving means 92, sound signals in a total of four channels of 16 bits each are transferred. Of the four cells of shift register CAa, the first two cells are given to transmitting registers A1a, A2a individually possessing 16 cells corresponding to each one of two channels, and their outputs are respectively applied to the receiving registers B1a, B2a from the OR gate G2 through line 12. To these receiving registers B1a, B2a are provided signals from the first two cells of the shift register CBa having four cells.

The outputs from each cell of shift register CAb at the transmitting means 82 possessing cells corresponding to four channels are given to the transmitting registers A1b to A4b corresponding to each channel. The transmitting registers A1b to A4b possess 16-bit cells, and their outputs are applied to the receiving registers B1b to B4b of the receiving means 92 by way of line 13 from the OR gate G3. To these receiving registers B1b to B4b are applied signals from the shift register CBb having four cells. Thus, between the transmitting and receiving means 81, 91, the 2-channel portion of sound signals is transferred, while between the transmitting and receiving means 82, 92, the sound signals of 4-channel portion are transferred, and the data transfer periods are identical.

The invention may be embodied in a wide range for data transfer.

In the above embodiment, the data is sent out bit by bit from each transmitting register to receiving register, but in another embodiment of the invention it may be also possible to design to transfer plural bits of each transmitting and receiving register in batch.

Thus, according to the invention, it is possible to transfer various data which are different, for example, in the number of pieces of information, smoothly and in a simple construction.

FIG. 28 is a block diagram showing the composition of the receiving side of an embodiment of the invention, and FIG. 29 is a block diagram showing the composition of its transmitting side. Referring now to FIGS. 28 and 29, the composition of this embodiment is described below. The receiving side shown in FIG. 28 of this embodiment comprises a transfer register 45 composed of four shift registers, for example, 41, 42, 43, 44. This transfer register 45 is composed to possess functions of both transfer registers 1, 21 and buffer registers 2, 22 as explained in relation to the prior art later.

Between shift registers 41 and 42, and 43 and 44, changeover switches 46, 47 are disposed, and they are connected to another changeover switch 49 provided in the receiving line 48 for receiving the transfer data. A data bus 50 is connected to the transfer register 45.

The structure of the transmitting side in FIG. 29 is similar to the receiving side shown in FIG. 28, comprising, for example, a transfer register 55 composed of four shift registers 51, 52, 53, 54, changeover switches 56, 57 disposed between the shift register 51 and 52, and 53 and 54, and a changeover switch 59 connected between these changeover switches 56, 57 and the transmission line 58.

The changeover switches 46, 47 are controlled by a clock signal CK3 which is described later, and the shift action of the shift registers 41 to 44 is executed by the internal clock signal CK3 generated internally. The switching action of the changeover switch 49 is realized by a synchronous signal SY1 which is described later.

The changeover switches 56, 57 are controlled by the clock signal CK3 supplied to the shift registers 51 to 54, and the changeover switch 59 is controlled by the synchronous signal SY1 mentioned later.

FIG. 30 (1)-(6) is a timing chart for explaining the operation of this embodiment. Referring also to FIG. 28, the operation of this embodiment is described below. First, the receiving action of this embodiment is described. When the transfer data to be received reaches the reception line 48, the changeover switch 49 is alternately changed to the changeover switches 46, 47 in every half period relating to the period W1 of the synchronous signal SY1 as shown in FIG. 30 (1). While the changeover switch 49 is selected at the switch 46 side, the changeover switch 46 changes over at the rise timing and fall timing of the clock signal CK3 shown in FIG. 30 (4), and the transfer data on the reception line 48 is stored in the shift registers 41, 42, bit by bit at the rise of the clock signal CK4 generated internally.

In this way, in half period of synchronous signal SY1, data 1, 2 are transferred to the shift registers 41, 42 as shown in FIG. 30 (2) and (3), and at time t3 in FIG. 30 (1) the changeover switch 49 is selected to the switch 47 side, and data 3, 4 are written into the shift registers 43, 44 in the same manner.

This time, the transfer register 45 is connected to the data bus 50, and therefore in the first half period W1a in FIG. 30 (1) while data is transferred to the shift registers 41, 42, if there is data already stored in the shift registers 43, 44, the operator can freely access to the data through the data bus 50. In the second half period W1b in FIG. 30 (1), the same operation is done on the shift registers 41, 42. That is, in the receiving action of the embodiment, different registers are used for data access parallel to the receiving action.

The transmitting action is next described referring to FIG. 29. In this case, too, the operation is basically the same as the receiving action. The data 1 to 4 to be transmitted are stored in the shift registers 51 to 54 through data bus 50, and at time t4 in FIG. 30 the changeover switch 59 is, for example, to the changeover switch 57 side, when the changeover switch 57 is alternately changed to the shift registers 53, 54 by the clock signal CK3, so that the contents in the shift registers 53, 54 are read out bit by bit at every rise and fall of CLK4 similarly. At time t3 in FIG. 30, when this reading action is finished, the changeover switch 59 is changed to the switch 56 side, and by the operation of the changeover switch 56 same as that of the changeover switch 57, the memory contents in the shift registers 51, 52 are led out into the transmission line 58.

While the contents in the shift registers 53, 54 are being transmitted, the contents in the shift registers 51, 52 where data 1, 2 are stored can be freely accessed through the data bus 50. While the contents in the shift registers 51, 52 are being transmitted, of course, the same processing is carried out on the memory contents of the shift registers 53, 54.

In this embodiment, thus, parallel to the transmission/reception action of transfer data, during the period of transmission/reception of the data to be transferred, the remaining data may be freely read out or written in. As a result, the composition of, for example, the processor, is notably simplified.

In this way, according to the invention, when transferring data, it is not necessary to prepare the shift register group for temporarily storing the data to be transferred in the same number as the shift register group responsible for transfer, and the construction may be notably simplified.

FIG. 31 is a block diagram of a processor in an embodiment, in which a sound signal processor 13 is used as an example. The analog sound signals of right and left channels to be fed in input terminal T are converted into digital sound signals of two channels in an analog/digital converter circuit 14, and are applied to a processor DSP1 through line 15. At this processor DSP1, for example, tone control is executed. The output of the processor DSP1 is applied to a processor DSP2 through line 16.

At this processor DSP2, the sound signals in two channels applied from the line 16 are further processed digitally, and in order to enhance the presence as in the sound system, sound signals in four channels are produced in order to deliver them to speakers disposed at the front left side FL, front right side FR, rear left side RL, and rear right side RR, and the sound signals of 16 bits each of the front left and right sides FL, FR are stored in series in the shift register 17, while the sound signals of the rear left and right sides RL, RR are stored in the other shift register 18. In the shift registers 17, 18, the speaker configuration and the corresponding digital sound signals are represented by the same reference codes FL, FR; RL, RR.

From the clock signal generator 19, a first clock signal CLK1 having a predetermined specific frequency shown in FIG. 32 (1) is led out into the line 20, and is given as an external clock signal to the input terminal 21 of the processor DSP2. This external clock signal CLK1 is applied to the frequency converter circuit 22 disposed in the processor DSP2. This frequency converter circuit 22 is, for example, composed of a monostable multivibrator, and, applies a clock signal having a frequency twice that of the external clock signal CLK1 as shown in FIG. 32 (2) into the clock selection circuit 33 through the line 23, in response to the rise and fall of the external clock signal CLK1 applied to the input terminal 21. The external clock signal CLK1 applied to the input terminal 21 is also applied to the clock selection circuit 33 directly through line 24. A clock signal generator circuit 34 is composed of the frequency converter circuit 22 and clock selection circuit 33.

The clock selection circuit 33 changes over and leads out the clock signal through line 23 and external clock signal CLK1 through line 24, in response to the voltage level of the control terminal 35. At the control terminal 35, an output from the control input circuit 36 is applied, and this control input circuit 36 is composed of resistance 37 and switch 38, and one of the terminals of the resistance 37 is connected to the high level power source, while the other terminal is connected to one of the contacts of the switch 38. The other contact of the switch 38 is grounded. In this way, the potential at the connection point of the resistance 37 and switch 38 is applied to the clock selection circuit 33 through control terminal 35.

Therefore, when a control signal as shown in FIG. 32 (3) is entered from the control terminal 35, the clock selection circuit 33 applied the clock signal shown in FIG. 32 (4) to the changeover control circuit 25. The changeover control circuit 25, corresponding to the input clock signal, leads out the changeover circuits of mutually reverse polarities as shown in FIG. 32 (5), (6) to the line 26 and line 27.

The changeover signal coming out to the line 26 is also applied to the shift register 17 and to the AND gate G1. The changeover signal coming out to the line 27 is applied to the shift register 18 and the other AND gate G2. The shift register 17, responding to the changeover signal from the line 26, sequentially leads out bit by bit the sound signals of 16 bits each of the front left and right side FL, FR being stored there as shown in FIG. 32 (7).

Likewise, the shift register 18, responding to the changeover signal from the line 27, sequentially leads out bit by bit the sound signals of 16 bits each of the rear left and right side RL, RR as shown in FIG. 32 (8). Fl1 to FL4 in FIG. 32 (7) represent the data of the first to fourth bit of the sound signal of the front left side FL, and similarly RL1 to RL3 in FIG. 32 (8) denote the data of the first to the third bit of the sound signal of the rear left side RL.

The sound signals of each bit from the shift registers 17, 18 are respectively applied to the AND gates G1, G2. The sound signals from the AND gates G1, G2 are respectively applied to two digital/analog converter circuits 30, 31 through the output terminal 28 and line 29 from the OR gate G3. The digital signal led out from the output terminal 28 is as shown in FIG. 32 (9). In this way, responding to the external clock signal CLK1 applied to the input terminal 21, the sound signal stored in the shift registers 17, 18 is sequentially led out in series alternately bit by bit from the output terminal 28.

The clock signal from the clock signal generating circuit 19 is directly applied to the digital/analog converter circuit 30 from the line 20, and is also applied to the other digital/analog converter circuit 31 through the inverter circuit N1. The digital/analog converter circuits 30, 31 are identical in structure. The digital-/analog converter circuit 30 responds to the rise of the external clock signal CLK1 shown in FIG. 32 (1) through the line 20, and receives and stores the sound signal through the line 29 bit by bit.

Therefore, the digital/analog converter circuit 30 receives only the sound signal stored in the shift register 17 indicated by reference codes FL1, FL2, FL3, and so forth, out of the digital sound signals on the line 29 shown in FIG. 32 (9), sequentially bit by bit, and converts it into analog sound signal in a total of two channels of the front left and right side FL, FR, and leads out.

The other digital/analog converter circuit 31, responding to the rise of the clock signal through the inverter circuit N1, receives only the sound signal stored in the shift register 18 indicated by reference codes RL, RL2, RL9, and so forth, out of the sound signals shown in FIG. 32 (9), sequentially bit by bit, and converts into analog sound signal in a total of two channels of the rear left and right side RL, RR, and leads out. For the sake of simplicity of explanation, here, an example of using clocks of a same frequency is demonstrated, but usually when the control input is of low level, multiple data can be transferred by clock input at faster speed.

In this way, while a clock signal from the frequency converter circuit 22 is applied to the changeover control circuit 25, the shift registers 17, 18 can transfer the data into the digital/analog converter circuits 30, 31 at a frequency twice that of the external clock signal CLK1 from the clock signal generator circuit 19, and the sound signals for the portion of 4 channels can be transferred to using a same external clock signal CLK1 as the two-channel sound signal through the lines 15, 16.

In a special state of use such as when debugging, a high-speed second external clock signal CLK2 is issued from the clock signal generator circuit 19 as shown in FIG. 33 (1). At this time, the clock signal from the frequency converter circuit 22 cannot follow up such rapid external clock signal CLK2 by the effect of the circuit constant element or the like, and therefore by operating the switch 38 to lead out this external clock signal CLK2 through the line 24 from the clock selection circuit 33, the data can be transferred securely as shown in FIG. 33 (2) without causing transfer error or other trouble.

Thus, in this sound signal processor 13, external clock signals CLK1, CLK2 from the clock signal generator circuit 19 through the line 24, and the clock signal having a frequency twice that of the external clock signal CLK1 from the frequency converter circuit 22 through the line 23 are changed over by the clock selection circuit 33, and are used as an internal clock signal in the processor DSP2, and therefore the data can be transferred at a frequency twice that of the external clock signal CLK1, and moreover in a special state of use such as when debugging, data can be transferred in correspondence to the high speed external clock signal CLK2.

The invention may be embodied not only for processing of sound signals, but also widely in other technical fields. Instead of the digital/analog converter circuits 30, 31, circuits having constructions for other digital signal processings may be employed.

According to the invention, as is clear herein, the output data from the first processor may be alternately transferred to two second processors in a simple structure. Further, since it is designed to lead out by changing over the external clock signal and the clock signal from the frequency converter means by the use of the clock selection means, the processing circuit can, for example, process arithmetically or transfer data at a speed of desired times the external clock while responding to the external clock signal, on the basis of the clock signal generated by the frequency converter means, and can also process according to the clock signal when the frequency of the external clock signal is changed.

FIG. 34 is a block diagram showing the composition of the transmission side according to an embodiment of the invention, and FIG. 35 is a block diagram showing the composition of the reception side of the same. In this embodiment, the group data composed of two-word data is transferred, and the one-word data contains, for example, 32 bits. In the composition of the transmission side shown in FIG. 34, there is contained, for example, a transfer register 44 composed of shift registers 41, 42, 43 possessing a capacity of 32 bits each. This transfer register 44 is composed so as to contain the functions of both buffer register 22 and transfer register 21 as explained in relation to the background technology as mentioned later.

To the transfer register 44, a parallel signal is entered from the data bus 47 through changeover switches 45, 46 which are the second switching means. The shift registers 41 to 43 contained in the transfer register 44 are connected to the transmission line 49 for transmitting serial signals through the changeover switch 48 which is the first switching means.

The changeover switch 48 has input terminals 48a, 48b, 48c, and the shift registers 41, 42, 43 are respectively connected to these input terminals. Switching of the changeover switch 48 is based on the synchronous signal SY1 which is mentioned later, and serial signals delivered by the shift registers 41 to 43 are selectively led out to the transmission line 49 as a result of this switching.

The changeover switches 45, 46 respectively possess output terminals 45a, 45b, 45c; 46a, 46b, 46c. The output terminals 45a, 46a are connected to the shift register 41, and the output terminals 45b, 46b are connected to the shift register 42, and the output terminals 45c, 46c are connected to the shift register 43. Changeover switches 45, 46 changeover as shown below on the basis of the synchronous signal SY1, so that the parallel inputs from the data bus 47 may be selectively fed into the shift registers 41 to 43.

Referring next to FIG. 35, the structure of the receiving side is explained below. The composition of the receiving side shown in FIG. 35 is similar to that of the transmission side shown in FIG. 34, and it contains a transfer register 53 composed of shift registers 57, 58, 59. To the shift registers 57 to 59, serial signals are selectively entered from the reception line 54 for receiving serial data through the changeover switch 51 which is the first switching means. The shift registers 57 to 59 are connected to the data bus 60 through changeover switches 55, 56 which are second switching means.

The changeover switch 51 possesses output terminals 51a, 51b, 51c, and these output terminals are respectively connected to the shift registers 57, 58, 59. The switching action of the changeover switch 51 is based on the synchronous signal SY1, and as a result the serial data through the reception line 54 is selectively entered into the shift registers 57 to 59.

The changeover switches 55, 56 possess input terminals 55a, 55b, 55c; 56a, 56b, 56c. The input terminals 55a, 56a are connected to the shift register 57, and the input terminals 55b, 56b are connected to the shift register 58, and input terminals 55c, 56c are connected to the shift register 59. The switching action of the changeover switches 55, 56 is based on the synchronous signal SY1, and as a result the parallel data is selectively applied to the data bus 60 from the shift registers 57 to 59.

Clock signals CK1 are applied to the shift registers 41, 42, 43 in the composition of the above transmission side and shift registers 57, 58, 59 in the composition of the reception side, which realizes the shift action.

FIG. 36 (1)-(7) constitute a timing chart for explaining the data transfer action in the above composition. FIG. 36 (1) shows the synchronous signal SY1, and FIG. 36 (2) indicates the data to be applied to the data bus 60 in each period, and FIG. 36 (3) to (5) respectively represent the state of changeover switches 45 (55), 45 (56), and 48 (51). Furthermore, FIG. 36 (6) indicates the clock signal CK1 and FIG. 36 (7) shows the data to be led out into the transmission line 49 (reception line 54). In FIG. 36 (1), reading of data into the transfer register 44 is indicated by the upward arrow. In FIG. 36 (3) to (5), input (output) terminals selected by the individual changeover switches are shown, and the input (output) terminals connected to the shift registers 41, 57 are represented by reference code a, the input (output) terminals connected to the shift registers 42, 58 by reference code b, and the input (output) terminals. connected to the shift registers 43, 59 by reference code c.

Now, referring to FIGS. 34 and 36, the operation at the transmission side is explained below. At time T1, in the changeover switch 48, its input terminal is changed from 48b to 48c in synchronism with the fall of synchronous signal SY1. At the same time, in the changeover switch 45, its output terminal is changed from the output terminal 45b to 45a, and in the changeover switch 46, its output terminal is changed from 46c to 46b. At this time, the shift register 41 and shift register 42 are connected to the data bus 47, and data D1 and data D2 of 32 bits each are applied parallel in 32 bits or in parallel in 16 bits each. At the shift register 43, synchronizing with the clock signal CK1, the data D0 read into the shift register 43 in the period before time T1 is delivered bit by bit.

Since the changeover switch 48 is selected at its input terminal 48c as stated above, data D0 is sent out into the transmission line 49 bit by bit. In this way, the data D0 is transmitted as a serial signal. Such data transfer is effected in the period from time T1 to time T2 when the synchronous signal SY1 rises. As a result, the 32-bit data D0 is transferred as a serial signal.

At time T2, when the synchronous signal SY1 rises, in the changeover switch 48 synchronously, its input terminal is changed from 48c to 48a. At this time, the changeover switches 45, 46 do not change over, but since the parallel data is applied to the shift registers 41, 42 from the data bus 47, the transfer speed is fast, and when the synchronous signal SY1 rises at time T2, the data D1, D2 are already stored in the shift registers 41, 42. In such a state, along with reading of the data D1 from the shift register 41, parallel data will not be applied to the data bus 47 to the shift register 41.

In the period from time T2 till time T3 when the synchronous signal SY1 falls, data D1 is sent out to the transmission line 49 bit by bit.

When the synchronous signal SY1 rises at time T3, in the changeover switch 48 synchronously, its input terminal is changed from 48a to 48b. In the changeover switches 45, 46, the respective output terminals are changed over from 45a, 46b to 45c, 46a. That is, the changeover switch 45, in synchronism with the fall of the synchronous signal SY1, its output terminal is changed over from 45a to 45c to 45b and to 45a, and in the changeover switch 46, in synchronism with the fall of the synchronous signal SY1, its output terminal is changed over from 46b to 46a to 46c and to 46b. In the changeover switch 48, in synchronism with the rise and fall of the synchronous signal SY1, its output terminal is changed over from 48c to 48a to 48b and to 48c. In this way, in the period of data read-out from any one of the shift registers, the data is applied to the other two shift registers from the data bus 47, and in the period from time T1 to time T3, serial data of 64 bits will be led out into the transmission line 49.

In the period from time T3, data D3, D4 are read parallel into the shift registers 43, 41 from the data bus 47. The shift register 42 is, at this time, connected to the transmission line 49, and the data D2 which is its memory content is delivered bit by bit.

Referring next to FIGS. 35 and 36, the operation at the reception side is explained. To the reception line 54, the serial data as shown in FIG. 36 (7) is transmitted. At this time, the changeover switch 51 is changed over in its output terminal as shown in FIG. 36 (5), and the switching action of the input terminal at changeover switches 55, 56 becomes as shown in FIG. 36 (3), (4).

In the period from time T1 to time T2, at the changeover switch 51, since its output is selected at 51c, the serial data reaching the reception line 54 is applied to the shift register 59. At the shift register 59, the above input serial data is read into inside bit by bit by the clock signal generated inside the transfer register 53. In this way, the 32-bit data D0 is read into the shift register 59 in the period from time T1 to time T2. Thus, the data D0 is held inside the shift register 59 at time T2.

In the period from T1 to T2, the shift registers 57, 58 are connected to the data bus 60, and the data Da, Db entered in the shift registers 57, 58 before time T1 are applied to the data bus 60 in a relatively short time after time T1.

In the period from time T2 to time T3, at the changeover switch 51, since the output terminal is selected at 51a, the data D which is the serial data reaching the reception line 54 is applied to the shift register 57. At this time, in the changeover switch 55, its input is selected at 55a, and the shift register 57 is connected to the data bus 60 but since the data Da taken in before time T1 is applied to the data bus 60 in a relatively short time after T1, the shift register 57 is ready to receive the next data.

At time T3, in the changeover switch 51, its output terminal is changed to 51b, and the input terminals of the changeover switches 55 and 56 are respectively changed to 55c, 56a. As a result, in a relatively short period after time T3, the data bus 60 is supplied with the data D0, D1 held by the shift registers 59, 57 respectively, and the shift register 58 with the next data D2, bit by bit.

Thus, in this embodiment, at the transmission side transfer register 44, the data held by the shift registers 41, 42, 43 are selectively sent out bit by bit to the transmission line 49 by the changeover action of the changeover switch 48. To the remaining two shift registers which are not delivering data at the time, parallel data is provided from the data bus 47 in a relatively short time.

At the transfer register 53 at the reception side, the serial data reaching the reception line 54 is selectively fed to the shift registers 57, 58, 59, and the data held by the remaining two shift registers to which the serial data is not fed is entered to the data bus 60 as parallel data.

As a result, at the transmission side and reception side, the individually installed registers possess the functions of both buffer register and transfer register as mentioned in relation to the prior art, so that the number of registers may be reduced to ⅔.

Further, generally, in transfer of group data composed of m word data, 2m registers were needed in the prior art, but in the invention only m+1 shift registers are needed, and the number of shift registers is reduced to (m+1)/2m. Hence, the structure necessary for data transfer may be substantially simplified.

According to the invention, thereby, in transferring group data composed of m word data, the equivalent functions as 2m registers needed in the prior art may be realized by m+1 registers only, and the number of required registers is only (m+1)/2m, and the structure for data transfer may be notably simplified. Therefore, the construction will not become too large if the data length to be transferred is very large.

FIG. 37 is a block diagram of a main embodiment of the invention. The analog sound signals of right and left channels fed to the input terminal 13 are converted into a digital sound signal of two channels in the analog/-digital converter circuit 14, and is applied to the processor DSP1 from line 15. In this processor DSP1, the sound signal of two channels entered through the line 15 is digitally processed, and in order to enhance the presence as in the surround system, the sound signals of four channels to be applied to the speakers disposed at the front left side FL, front right side FR, rear left side RL, and rear right side RR is sent out into a line 16, and is applied to the first processor DSP2 of the invention.

At this processor DSP2, the sound signal of four channels given from the line 16 is further digitally processed, and the 16-bit sound signals at the front left and right side FL, FR are stored in series into the shift register 17, while the sound signals of the rear left and right side RL, RR are stored in the other shift register 18. At the shift register 17, 18, the speaker configuration and the corresponding digital sound signals are indicated by the same reference codes FL, FR; RL, RR.

From a clock signal generator circuit 19, a clock signal having a predetermined frequency shown in FIG. 38 (1) is led out into a line 20, and is applied to the input terminal, 21 of the processor DSP2. This clock signal is applied to a control circuit 22 provided in the processor DSP2. This control circuit 22, responding to the clock signal applied to the input terminal 21, leads out the signal indicated in FIG. 38 (2) to the line 23, while a signal shown in FIG. 38 (2) possessing an inverted waveform of the signal from the line 23 is sent out to a line 24. Another control circuit 25 receives signals from the lines 23, 24, leads out a signal shown in FIG. 38 (4) to a line 26, and also sends out a signal shown in FIG. 38 (5) to a line 27. The signals led out from the lines 26, 27 are synchronized with the clock signal applied to the input terminal 21, and the signals led out from these lines 26, 27 are waveforms of mutually reverse polarity.

The signal sent out from the line 26 is applied to the shift register 17, and is also applied to the AND gate G1. The signal led out from the line 27 is applied to the shift register 18, and is also added to the other AND gate G2. The shift register 17, responding to the signal from the line 26 as shown in FIG. 38 (6), sequentially leads out the sound signals of 16 bits each of the front left and right side FR, FL stored there bit by bit. Likewise, the shift register 18, responding to the signal from line 27, sequentially leads out the sound signal of 16 bits each of the rear left and right side RL, RR, bit by bit as shown in FIG. 38 (7). In FIG. 38 (6), FL1 to FL6 denote the data of the first to sixth bit of the sound signal of the front left side FL, and in FIG. 38 (7), similarly, RL1 to RL5 represent the data of the first to fifth bit of the sound signal of the rear left side RL.

The sound signals of every bit from the shift registers 17, 18 are applied to AND gates G1, G2. The sound signals from AND gates G1, G2 are applied to two second digital signal processing circuits, digital/analog converter circuits 30, 31, respectively through output terminal 28 and line 29 from the OR gate G3. The digital signal led out from output terminal 28 is as shown in FIG. 38 (8). In this way, responding to the clock signal applied to the input terminal 21, the sound signals stored in the shift registers 17, 18 are led out from the output terminals 28, bit by bit alternately, serially and sequentially. The changeover means is composed by comprising the AND gates G1, G2.

The clock signal from the clock signal generator circuit 19 is directly applied from the line 20 to the digital/analog converter circuit 30, and is also applied to another digital/analog converter circuit 31 by way of an inverter circuit N1. The digital/analog converter circuits 30, 31 have identical structures. The digital/analog converter circuit 30, responding to the rise of the clock signal indicated in FIG. 38 (1) through line 20, receives and stores the sound signal through line 29 bit by bit. Therefore, the digital/analog converter circuit 30 receives only the sound signal stored in the shift register 17 indicated by reference codes FL1, FL2, FL3, . . . , among the digital sound signals on the line 29 indicated in FIG. 38 (8), bit-sequentially, and converts it into an analog sound signal of two channels in total of the front left and left side FL, FR, and leads it out.

The other digital/analog converter circuit 31, responding to the rise of clock signal through the inverter circuit N1, receives only the sound signal stored in the shift register 18 as indicated by RL1, RL2, RL3, ..., among the sound signals shown in FIG. 38 (8), bit-sequentially, and converts it into an analog sound signal in a total of two channels of rear left and right side, RL, RR, and leads it out.

In this way, the sound signal from the output terminal 28 of the processor DSP2 is commonly given to the two digital/analog converter circuits 30, 31 connected after the line 29, and the clock signal from the clock generator circuit 19 is applied to these circuits DSP2; 30, 31 directly and by way of inverter circuit N1 to control. Therefore, the structure may be simplified.

The invention may be embodied not only for processing of sound signal, but also widely in other technical fields. Further, instead of the digital/analog converter circuits 30, 31, other circuits for digital signal processing may be used.

The invention enables, as is clear from the description herein, the transfer of output data from a first processor to two second processors alternately, and in a simple structure.

FIG. 39 is a block diagram showing a structure of a sound signal processor 41 in an embodiment of the invention. For example, an analog sound signal from a radio receiver is given to an analog/digital converter 46 from an input terminal 45, and is converted into a digital signal, and is fed into a digital signal processor (hereinafter called processor) 44 composed of large-scale integration or the like.

The processor 44 controls the tone, or processes echo or sound signals, for example, by performing arithmetic calculations of input signals such as addition and multiplication, of delaying. The output of the processor 44 is applied to the processor 48 for a different arithmetic processing, and is applied to the digital/analog converter 52 to be converted into an analog signal, which is given to a power amplifier circuit or the like by way of output terminal 53.

The output of the analog/digital converter 46 is composed of 16 bits each of right and left channels per sampling period, in a total of 32 bits of fixed decimal point data as shown in FIG. 40 (1). Digital signal processors 44, 48, analog/digital converter 46, and digital/analog converter 52 perform arithmetic operation on the basis of the clock signal SCLK from a clock generator 54 shown in FIG. 40 (2) and synchronous signal SYNC shown in FIG. 40 (3). At the processors 44, 48, in order to suppress deterioration of dynamic range or S/N ratio due to overflow or underflow during arithmetic operation, the sound signal data is floating decimal point data composed of 16-bit mantissa data shown in FIG. 40 (4) and 4-bit exponent data shown in FIG. 40 (5), and arithmetic operation and transfer are carried out accordingly.

FIG. 41 is a diagram to show the conversion action of the fixed decimal point data and floating decimal point data. The input signal to the processor 44 is 32-bit fixed decimal point data per sampling period as mentioned above. The processor 44 calculates this input signal into floating decimal point data, and stores the result of calculation in the mantissa transmitting registers 61, 62 of 16 bits for each and exponent transmitting registers 63, 64 of 16 bits for each provided each for right and left channels. Thus stored data are processed arithmetically, in the processor 44, as 20-bit floating decimal point data per channel as indicated by reference code 81, 82.

The data stored in the mantissa transmitting registers 61, 62, and exponent transmitting registers 63, 64 are transferred from input terminals 73, 74 of the processor 48 to mantissa receiving registers 67, 68 and exponent receiving registers 69, 70, through lines 65, 66 from output terminals 71, 72 provided separately for each one of registers 61, 62; 63, 64. The mantissa data transferred through the line 65 is shown in FIG. 40 (4), and the exponent data transferred through line 66 is shown in FIG. 40 (5). The processor 48, after arithmetically processing the transferred data as floating decimal point data of 20 bits per channel of right and left as shown by reference codes 83, 84, converts into fixed decimal point data and applies to the digital/analog converter 62.

The mantissa data stored thus in the mantissa transmitting registers 61, 62 is transferred to the mantissa receiving registers 67, 68 through line 65, while the exponent data stored in the exponent transmitting registers 63, 64 is transferred to the exponent receiving registers 69, 70 through line 66, so that the mantissa data and exponent data may be transferred in parallel. Without using special converter circuitry such as bit number converting circuits 25, 29 as mentioned in relation to the background technology, it is possible to process arithmetically or transfer by using clock signals common with the analog/digital converter 46 and others, so that the structure may be simplified.

Thus, according to the invention, since the mantissa portion and exponent portion of the floating decimal point data are stored in the separate registers, it is possible to process arithmetically and transfer by synchronously controlling both registers by a common clock signal, and the structure may be simplified at the same time.

FIG. 42 is a block diagram showing a construction of an embodiment of the invention, in which the data is transferred by the data transfer method of the invention between processors DSP3, DSP4.

The processors DSP3, DSP4 are similar in structure, and the structure of the processor DSP3 is explained below.

If the signal entering the processor DSP3 is fixed decimal point data, this fixed decimal point data is entered from line 7 as a serial signal. If the data entering the processor DSP3 is floating decimal point data, the exponent portion of the floating decimal point data is entered from line 7, and the exponent portion of the floating decimal point data is entered from line Pa as a parallel signal. The serial signal of line 7 is applied to the mantissa receiving register 11, and the parallel signal of line Pa is applied to the exponent receiving register 12. The data in the mantissa receiving register 11 is entered in the mantissa register 13a of the register 13, while the data in the exponent receiving register 12 is fed into the exponent register 13b of the register 13 similarly.

The data in the mantissa register 13a and exponent register 13b are applied to an internal bus 16 by way of gates 14a and 14b, respectively. These data are applied from the internal bus 16 to the memory circuit (not shown), etc. A processing circuit 15 arithmetically processes such data.

If the result of arithmetic processing in the processor DSP3 is fixed decimal point data, the fixed decimal point data as the result of arithmetic processing is entered from the internal bus 16 into the mantissa register 18a through gate 17a. This fixed decimal point data is applied to the mantissa transmitting register 19 of the mantissa register 18a. The data of this mantissa transmitting register 19 is transferred to the processor DSP4 as a serial signal through line 8.

If the result of arithmetic processing at the processor DSP3 is floating decimal point data, the mantissa portion and exponent portion of the floating decimal point data which is the result of calculation are delivered to the mantissa register 18a and exponent register 18b of the register 18 respectively through gates 17a, 17b from internal bus 16.

The data of the mantissa register 18a is applied to the exponent transmitting register 19. The data in the exponent register 18b is applied to the exponent transmitting register 20.

The mantissa portion of the floating decimal point data which is the result of arithmetic processing at the processor DSP3 is transferred from the mantissa transmitting register 19 to the processor DSP4 as a serial signal through line 8, and the exponent portion of the floating decimal point data is transferred to the processor DSP4 through line Pb as a parallel signal from the exponent transmitting register 20.

At the processor DSP4, the serial signal of line 8 is entered into the mantissa receiving register 21, and the parallel signal of line Pb is entered into the exponent receiving register 22. Afterwards, after arithmetic processing, as in the case of processor DSP3, the result of arithmetic processing is led out into lines 9 and Pc from the mantissa transmitting register 29 and exponent transmitting register 30.

To the processors DSP3, DSP4, synchronous clock signal SYNC and serial clock signal SCK for transferring the data synchronously are applied.

FIG. 43 (1)-(4) is a waveform diagram for explaining the data transfer operation between the processors DSP3, DSP4, and the following explanation is made by reference to this diagram.

The synchronous signal SYNC entered in the processor DSP3 is shown in FIG. 43 (1). From rise or fall of the synchronous signal SYNC, data transfer of one of the serial signals is started, and upon rise of the serial clock signal SCK shown in FIG. 43 (2), the serial signal of line 7 shown in FIG. 43 (3) is latched.

Upon a next fall or rise of synchronous signal SYNC, one data transfer of serial signal is terminated, and a next data transfer is started. At this time, the data of serial signal expresses the fixed decimal point data when the processor DSP3 delivers fixed decimal point data, and represents the mantissa portion of the floating decimal point data when it delivers floating decimal point data.

When the processor DSP3 delivers floating decimal point data, the exponent portion of the floating decimal point data is led out as a parallel signal shown in FIG. 43 (4) to the line Pb, and at the processor DSP4, this parallel signal is latched upon the rise and fall of the synchronous signal SYNC.

In this embodiment, thus, the transfer at the serial port for data input, output is effected similarly by same serial clock signal whether the data is fixed decimal point data or floating decimal point data. Therefore, at the processors DSP3, 4, it is possible to distinguish the fixed decimal point data from floating decimal point data by detecting the presence or absence of exponent portion by the software, so that the structure of processor may be simplified. Further, as compared with the parallel transfer of all these data transfers, for example, the number of conductors for input and output can be decreased, and the wiring may be simplified. Furthermore, if the data format differs between input and output, only one kind of frequency is enough for serial clock signal, and the composition of the clock signal generator may be simplified.

In this embodiment, as the parallel port for input and output of the mantissa portion of the floating decimal point data, a general-purpose parallel port may be used, or when an exclusive parallel port is provided, this parallel port may be used as the input, output port of other data when inputting or outputting fixed decimal point data.

FIG. 44 is a further practical embodiment of the invention, and corresponding parts to those mentioned in the foregoing embodiments are identified with same reference codes.

In this embodiment, data is transferred between an analog/digital converter AD2 and processor DSP3, between processors DSP3 and DSP4, and between processor DSP4 and a digital/analog converter DA2.

An analog signal, for example, an acoustic signal is entered from line 6 into the analog/digital converter AD2. From the analog/digital converter AD2, a digital signal of fixed decimal point data having a data length of, for example, 16 bits is delivered from line 7 into processor DSP3. Data transfer from the analog/digital converter AD2 to processor DSP3 is effected synchronously by the serial clock signal SCK and synchronous signal SYNC delivered from the clock signal generator CK2.

The fixed decimal point data entered in the processor DSP3 is arithmetically processed, and floating decimal point data possessing, for example, 16-bit mantissa portion and 3-bit exponent portion is delivered. As stated above, the mantissa portion of the floating decimal point data is applied to the processor DSP4 through line 8, and the exponent portion of the floating decimal point data is applied to the processor DSP4 through line Pb. In the data transfer of this case, too, as in the data transfer from the analog/digital converter AD2 to processor DSP3, the data is transferred synchronously by the serial clock signal SCK from the clock signal generator CK2 and synchronous signal SYNC.

The floating decimal point data entered in the processor DSP4 is arithmetically processed, and is converted into fixed decimal point data. This fixed decimal point data is delivered to the digital/analog converter DA2 through line 9. In this data transfer also, data is transferred synchronously by the serial clock signal SCK from the clock signal generator CKS and synchronous signal SYNC. At the digital/analog converter DA2, the input fixed decimal point data is converted into an analog signal, and is led out to line 10.

When transferring the acoustic signal after analog/digital conversion as in this embodiment, the output from the analog/digital converter circuit and the input to the digital/analog converter circuit are usually fixed decimal point data, and the data transfer between processors is carried out by the floating decimal point data. When the data transfer method of the invention is employed in such case, if the data format differs between the input and output at the processors DSP3, DSP4, data can be transferred by the same serial clock signal, and the structure of the processor may be simplified, and all data can be transferred by only one kind of serial clock signal. Therefore, the wiring may be simplified, and complicated circuit composition such as digital phase-locked loop is not needed for the purpose of generation of clock signal.

As explained herein, in the data transfer method of the invention, transfer of fixed decimal point data in the same format as the mantissa portion of floating decimal point data, for example, may be similarly effected by a synchronous signal same as the floating decimal point data, by using the mantissa registers of the processor.

Therefore, both fixed decimal point data and floating decimal point data can be transferred in a simple structure.

FIG. 45 is a block diagram of an embodiment of the invention. Analog sound signals of right and left channels are fed into the analog/digital converter AD2 from line 11, and the fixed decimal point data is applied to the processor DSP4 for the portion of two channels. This processor DSP4 arithmetically processes the sound signal which is the two-channel fixed decimal point data, and produces floating decimal data. The signal from the processor DSP4 is transmitted from the mantissa transmitting register A11 and exponent transmitting register B11 through lines 15, 16, and is applied to the mantissa receiving register A12 and exponent receiving register B12 of the other processor DSP5.

At the processor DSP5, various floating decimal point data processings are carried out, and finally they are converted into fixed decimal point format, and the sound signal data for four channels for four speakers 2 are stored in the mantissa transmitting register A13, and the fixed decimal point data which is the sound signal for a superwoofer 3 is stored in the exponent register B13.

The signal from the mantissa transmitting register A13 is stored in the register A14 of the digital/analog converter DA3 from line 12, and the sound signals for the portion of four channels are converted into analog sound signals as fixed decimal point data. To the low pass filter 4 provided thus for each channel, analog sound signals are applied, and the output from this low pass filter 4 is amplified by the amplifier circuit 5, and the speakers 2 are driven.

The sound signal for the superwoofer 3 from the exponent transmitting register B13 of the processor DSP5 is applied from line 13 to serial/parallel converter 14 to be converted into parallel bit signals, which are sent into digital/analog converter DA4 to be converted into analog signal. The analog sound signal from this digital/analog converter DA4 is applied to the amplifier circuit through low pass filter 6, and the superwoofer 3 is driven.

FIG. 46 is a block diagram showing a composition relating to processors DSP4, DSP5, digital/analog converter DA3, and registers X1 to X7, A11 to A14, B11 to B13 of serial/parallel converter 14. The two-channel sound signal data which is the fixed decimal point data from the analog/digital converter AD2 is fed into the receiving register X1 in the processor DSP4 through line 41.

The data thus input is two-channel fixed decimal point data, and is fed into store regions N1, N2 of receiving register X1, while the remaining store regions N3, N4, and store regions H1 to H4 of receiving register X2 are empty. When the data input is complete, the empty store regions N3, N4; H1 to H4 are handled as 0, and the contents in the store regions N1 to N4 of receiving register X1 are stored in the store regions R1 to R4 of the register X3, while the contents in the store regions H1 to H4 of receiving register X2 are stored in the store regions R1 to R4 of the register X3. At this time, the fixed decimal point data is converted into the floating decimal point data at the exponent portion 0.

A processing circuit 29 reads out these data through gates 42, 43, and data bus 17, and various floating decimal point arithmetic processings such as tone control are effected to the two-channel sound signal (floating decimal point data) by using the data of a memory (not shown), and four-channel floating decimal point data is created, which is stored in the register X4 through gates 44, 45.

The register X4 can store a total of four sets of floating decimal point data, and the mantissa portion of the floating decimal point data is indicated by reference codes L1 to L4, and the exponent portion is indicated by M1 to M4. For example, the first floating decimal point data is composed of mantissa portion L1 and exponent portion M1, and these floating decimal point data M1, L1; M2, L2; M3, L3; M4, L4 are sound signals for four channels. The mantissa portions L1 to L4 stored in the register X4 are respectively stored in the store regions C1 to C4 of the mantissa transmitting register A11. The exponent portions M1 to M4 are respectively stored in the store regions D1 to D4 by the exponent transmitting register B11. Each one of mantissa portions L1 to L4 is composed of 16 bits, and each one of exponent portions M1 to M4 is 4-bit data.

The contents in the store regions C1 to C4 of the mantissa transmitting register A11 are transferred to the store regions E1 to E4 respectively of the mantissa receiving register A12 of the processor DSP5 through line 15. Likewise, the contents in the store regions D1 to D4 of the exponent transmitting register B11 are transferred to store regions F1 to F4 of the exponent receiving register B12 through line 16, respectively. The store contents in the mantissa receiving register A12 and exponent receiving register B12 are fed into the register X5.

The register X5 possesses the regions for receiving four sets of floating decimal point data, and the mantissa portions P1 to P4 and exponent portions Q1 to Q4 of each one of floating decimal point data are stored in the unit of floating decimal point data. The processing circuit 24 of the processor DSP5 reads out the data, when the input of the data is complete, from the register X5 through the gates 45, 46, and the floating decimal point arithmetic processings are effected again, and the results are added to the four-channel sound signal data, and the sound signal data for one-channel superwoofer 3 is obtained. Such arithmetic processing is carried out by using the data stored in the memory (not shown) provided in the processor DSP5, and the one-channel floating decimal point data (the sound signal for the superwoofer 3 in this embodiment) is obtained additionally.

These data are stored in the register X6 by way of data bus 23 and gates 47, 48. The register X6 possesses the region for receiving four sets of floating decimal point data, and the mantissa portions T1 to T4 and exponent portions U1 to U4 of the floating decimal point data are stored in the unit of floating decimal point data.

Here, since the digital/analog converters DA3, DA4 handle the fixed decimal point data, finally five sets of floating decimal point data, that is, four sets of floating decimal point data expressing sound signals for four channels, and the floating decimal point data expressing the sound signal for the superwoofer 3 are converted into fixed decimal point data, and the data for four channels are stored in the register for mantissa A13, and the data for superwoofer 3 for one channel is stored in the register for exponent B13, and are transferred to the receiving register A14 of the digital/analog converter DA3, and the receiving register X7 of the serial/parallel converter 14 which is the interface circuit for the digital/analog converter DA4.

FIG. 47 (1)-(4) are a waveform diagram for explaining the operation of the constitution shown in FIG. 46. From the clock signal generator 25 to the line 26, a control signal SYNC shown in FIG. 47 (1) is led out, and a control signal SCLK shown in FIG. 47 (2) is led out to the line 27. In one period from the fall of the control signal SYNC to the next trailing edge, the bit-sequential data from the mantissa transmitting register A11 is sequentially transferred to the line 15 as shown in FIG. 47 (3). In the period when the control signal SYNC is at a low level, the bit-sequential data from the exponent transmitting register B11 is led out to the line 16 as shown in FIG. 47 (4), and is transferred. In this way, the mantissa transmitting register A11 and exponent transmitting register B11 deliver outputs independently, and are controlled in synchronism by the control signals SYNC, SCLK which are common clock signals. This holds true with the mantissa receiving register A12 and exponent receiving register B12, and also with the registers A13, A14, B13, X7.

The exponent portion has 4 bits in the above embodiment, and 16-bit sound signal is transferred for the superwoofer 3 from the processor DSP5, but as another embodiment of the invention it may be also possible to process the sound signal in 8 bits, for example, for the superwoofer 3 by using the exponent portion.

FIG. 48 is a block diagram of a different embodiment of the invention, which is similar to the foregoing embodiment, and corresponding parts are identified with same reference codes. Of note in this embodiment is that the floating decimal point data is bit-sequentially transferred by single data lines 30, 31. In this embodiment, the data is transferred in the common lines 30, 31 by the mantissa portion and exponent portion of the floating decimal point data, but by controlling this transfer timing, the mantissa portion and exponent portion are distinguished at the transmitting and receiving sides, and are separately stored in the registers, so that the sound signals for four channels and the sound signal for the superwoofer 3 may be arithmetically processed, and used. Moreover, by using the 4-bit sound signal of each channel from the exponent transmitting register B13 by two each, it is also possible to process the sound signal for the speaker of another channel indicated by reference code 3a, aside from the superwoofer 3 mentioned above. The constituent elements relating to the speaker 3a are indicated by broken lines, and the constitution for the superwoofer 3 is indicated by the subscript a.

The invention may be embodied not only in processing of sound signal, but also widely in other technical fields.

Thus, according to this invention, eliminating the unneeded circuit composition, the cost may be reduced in the processing apparatus.

FIG. 49 is a block diagram showing the configuration near processor DSP4 in an embodiment of the invention. The processor DSP4 is composed of mantissa receiving register A10 and mantissa transmitting register A11 which are mantissa registers, and exponent receiving register B10 and exponent transmitting register B11 which are exponent registers, and is designed to transfer data with a similarly composed processor DSP5.

For example, an analog signal such as an acoustic signal is fed from line 11 into analog/digital converter AD2 to be converted into a digital signal. This digital signal is usually fixed decimal point data, and possesses a data length of, for example, 16 bits. The fixed decimal point data is delivered from the transmitting register A9 of the analog/digital converter AD2 into the mantissa receiving register A10 of the processor DSP4.

To the exponent receiving register B10 of the processor DSP4, a signal, for example, from a potentiometer for detecting fluctuations in external voltage is entered after being converted into a digital signal of low bits, such as 3 bits, in the analog/digital converter AD1. The data in the mantissa receiving register A10 and exponent receiving register B10 are applied to the internal bus D1 by way of mantissa register C1a and exponent register C1b of the internal register C1.

At the processor DSP4, according to the data from the exponent register C1b, the data from the mantissa register C1a is arithmetically processed, and the floating decimal point data is obtained as the result of this calculation. The mantissa portion and exponent portion of this floating decimal point data are delivered to the mantissa transmitting register A11 and exponent transmitting register B11 through the mantissa register C1a and exponent register C1b of the internal register C1.

The data in the mantissa transmitting register A11 and exponent transmitting register B11 of the processor DSP4 are transferred to the manitssa receiving register A12 and exponent receiving register B12 of the processor DSP5 through lines 15, 16 respectively, and the floating decimal point data is thus transferred between the processors DSP4, DSP5.

At the processor DSP5, the floating decimal point data in the mantissa receiving register A12 and exponent receiving decimal register B12 are sent into the internal bus D2 through the mantissa register C2a and exponent register C2b of the internal register C2 to be processed arithmetically. If this result of calculation is, for example, fixed decimal point data, the fixed decimal point data from the internal bus D2 is applied to the mantissa transmitting register A13 through the mantissa register C2a of the internal register C2. The output from the mantissa transmitting register A13 is applied to the digital/analog converter or the like through the line 12.

At this time, if the result of calculation obtained by a different processing from the floating decimal point data of the mantissa receiving register A12 and exponent receiving register B12 is entered in the exponent transmitting register B13, it may be designed to deliver the signal from the line 13 through the exponent transmitting register B13.

In this embodiment, since it is designed to process arithmetically at the processor DSP4 according to the data entered in the exponent receiving register B12 rough the analog/digital converter AD1 from the potentiometer 1, the configuration shown in FIG. 49 may be applied, for example, in the linear control such as volume control and open loop adaptive control.

FIG. 50 is a diagram to explain the operation when a function of an electronic volume control is added to the processor DSP4. Fixed decimal point data representing acoustic signal is led out from the analog/digital converter AD2 to the line 14, while the signal from the potentiometer 1 is converted into a digital signal by the analog/digital converter AD1 and is led out into the line 10.

At the processor DSP4, as shown in FIG. 50, the data from the line 14 is digitally amplified at an amplifcation factor according to the data from the line 10, and is delivered. In this way, the acoustic signal can be controlled to a desired volume level by the potentiometer 1.

FIG. 51 is a block diagram showing a different embodiment of the invention, and the parts corresponding to those in the foregoing embodiment are identified with same reference codes.

In this embodiment, the signal entered in the exponent receiving register B10 of the processor DSP4 is a control command of the processor DSP4. The signal to represent the control command of the processor DSP4 is entered in a flag generator 2, and a flag to show a control command is entered in the exponent receiving register B10 through line 10 from the flag generator circuit 2.

The exponent portion of the floating decimal point data is generally of low bits, but its data length is sufficient as the flag of command for controlling the processor DSP4 externally, and it may be used when changing over the operation program of the processor DSP4 by force, for example.

In this way, the processor DSP4, when entering the fixed decimal point data of, for example, analog/digital converter, enters the fluctuations of external power source or control command by effectively utilizing, without any waste, the input terminal of the exponent portion of floating decimal point data or exponent receiving register B10. Therefore, the processor can process the data at higher speed, and the application range of the processor is expanded.

In this embodiment, as the port for input and output of the processor DSP4, the serial port and general-purpose parallel port usually possessed by the processor may be utilized as for the mantissa portion of the floating decimal point data, fixed decimal point data, and exponent portion of floating decimal point data.

According to the invention, as is clear from the description herein, when fixed decimal point data in the same format as the mantissa portion of floating decimal point data is entered in, for example, the processor, the fixed decimal point data is stored in the mantissa register, and other data may be entered and stored in the exponent register.

Therefore, waste in the construction of the processor may be eliminated, and more advanced data processing making full use of the functions of the processor may be realized.

FIG. 52 is a block diagram showing a composition of an acoustic signal processor 21 in an embodiment of the invention. For example, an analog, acoustic signal from a radio receiver is applied to an analog/digital converter 23 from an input terminal 22 to be converted into a digital signal, and is fed into a processor 24 realized by large scale integration.

The processor 24 arithmetically processes the input signal by addition, multiplication or the like, or by delay operation, and processes the acoustic signal for tone control or echo. The output of the processor 24 is applied to a processor 25 for another arithmetic processing, and is applied to digital/analog converters 26, 27 to be converted into analog signal, which is applied to a power amplifier circuit or the like from output terminals 28 and 29.

The output of the analog/digital converter 23 is, as shown in FIG. 53 (1), composed of a total of 32 bits of fixed decimal point data, of 16 bits each of right and left channels per sampling period. The processors 24, 25, analog/digital converter 23, and digital/analog converters 26, 27 operate arithmetically on the basis of clock signal SCLK from clock generator circuit 30 shown in FIG. 53 (2), and synchronous signal SYNC shown in FIG. 53 (3).

FIG. 54 is a block diagram showing an internal structure of processors 24, 25. The processors 24, 25 are identical in structure, and for the sake of simplicity, in FIG. 54, only the transmission system is shown as the processor 24 and only the reception system is given as the processor 25. The input signal to the processors 24 is, as stated above, 32-bit fixed decimal point data per sampling period.

Here, in order to inhibit deterioration of dynamic range or S/N ratio due to overflow or underflow at the time of arithmetic processing, when using the processors 24, 25 for use in transfer of floating decimal point data, the processor 24 converts this input signal into floating decimal point data, and stores. Thus stored data is, in the processor 24, arithmetically processed as floating decimal point data of 20 bits each of right and left channels as indicated by reference codes 35, 36. The data in 16-bit mantissa regions B1, B3 are stored in 16-bit mantissa transmitting registers 31, 32, and the data in 4-bit exponent regions B2, B4 are stored in 4-bit regions A1, A2 of 16-bit exponent transmitting registers 33, 34.

The data stored in the mantissa transmitting registers 31, 32 and exponent transmitting registers 33, 34 are transferred from the output terminals 51, 52 individually provided for registers 31, 32, 33, 34, to 4-bit regions C1, C2 of 16-bit mantissa registers 41, 42 and 16-bit exponent receiving registers 43, 44 from input terminals 61, 62 of the processor 25 through lines 71, 72.

At this time, the mantissa data transferred through line 71 is indicated in FIG. 53 (4), and the exponent data transferred through line 72 is indicated in FIG. 53 (5). At the processor 25, the transferred data is arithmetically processed as 20-bit floating decimal point data each of right and left channels composed of 16-bit mantissa portion and 4-bit exponent portion as shown by reference codes 45, 46, and is converted into fixed decimal point data of two channels each of 16 bits of each channel (total 4 channels), and is applied to the digital-/analog converters 26, 27.

On the other hand, in order to transfer multiple data simultaneously between processors 24 and 25, if slightly lowering the precision, when the processors 24, 25 are used for transfer of fixed decimal point data, the processors 24 converts the input signal of fixed decimal point data into floating decimal point data, and processes arithmetically, and converts into fixed decimal point data, and the result of this operation is stored in 16-bit mantissa transmitting registers 31, 32 provided for right and left channels. Meanwhile, the exponent transmitting registers 33, 34 store the fixed decimal point data aside from 16 bits of right and left channels indicated by reference codes 37, 38. In this case, too, the operation is the same as in the above case in that the arithmetic processing is carried out after converting into floating decimal point data of 20 bits each of right and left channels in the processor 24.

The data stored in the mantissa transmitting registers 31, 32 and exponent transmitting registers 33, 34 are transferred to the mantissa receiving registers 41, 42 and exponent receiving registers 43, 44 through lines 71, 72, as in the above case. At this time, the fixed decimal point data transferred through the line 71 is indicated in FIG. 53 (6), and the other fixed decimal point data transferred through the line 72 is indicated in FIG. 53 (7). They are both 16-bit fixed decimal data per channel (32 bits per sampling period).

The processor 25 arithmetically processes the transferred fixed decimal point data as 20-bit floating decimal data each of right and left channels, and processes in the same manner as the processor 24 to convert into fixed decimal point data of two channels each of right and left of 16 bits per channel (total 4 channels), and sends into digital/analog converters 26, 27 in every data per sampling period.

In this way, since the exponent registers 33, 34, and 43, 44 are of the same big length (16 bits in this embodiment) as the mantissa registers 31, 32, and 41, 43, when transferring fixed decimal point data between processors 24 and 25, it is possible to transfer simultaneously the other 16-bit fixed decimal point data of right and left channels by using the exponent registers 33, 34, and 43, 44, so that the transfer capacity is twice as much as in the prior art. Moreover, between the processor 25 and the digital/analog converters 26, 27, since fixed decimal point data of two channels each of 16 bits per channel can be transferred simultaneously, it is extremely effective when applying the acoustic signal processor 21 in a processor for a four-channel stereo audio appliance.

In the invention, therefore, since the exponent registers are set in the same bit length as the mantissa registers, it may be effectively used in processing of floating decimal point data and fixed decimal point data, so that multiple data can be transferred.

FIG. 55 is a block diagram showing a structure of an acoustic signal processor 21 in an embodiment of the invention. For example, an analog acoustic signal from a radio receiver is sent into an analog/digital converter 23 from an input terminal 22, and is converted into a digital signal, which is sent into a processor 24 realized by large scale integration or the like.

The processor 24 processes this input signal by addition, multiplication or other arithmetic operation or delay operation, and processes the acoustic signal such as tone control and surround. The output of the processor 24 is applied to a processor 25 for other arithmetic processing, and is applied to a digital/analog converter 26 to be converted into an analog signal, which is applied to a power amplifier or the like through output terminal 27.

The output of analog/digital converter 23 is composed of a total of 32 bits of fixed decimal point data of 16 bits each of right and left channels per sampling period as shown in FIG. 56 (1). The processors 24, 25, analog/digital converter 23, and digital/analog converter 26 process arithmetically on the basis of the clock signal SCLK from clock generator 28 shown in FIG. 56 (2) and synchronous signal SYNC shown in FIG. 56 (3).

The processors 24, 25, in order to inhibit deterioration of dynamic range of S/N ratio due to overflow or underflow at the time of processing, process arithmetically and transfer as floating decimal point data. Further, the mantissa portion of the floating decimal point data handled in the processors 24, 25 is set in a longer bit length (18 bits in this embodiment) than the bit length (16 bits) of the fixed decimal point data handled externally in order to reduce operational errors and enhance the precision.

FIG. 57 is a block diagram showing an internal structure of processors 24, 25. The processors 24, 25 are identical in structure, and for the sake of simplicity, in FIG. 57, only the transmission system is shown as the processor 24 and only the reception system as the processor 25. The input signal to the processor 24 is 32-bit fixed decimal point data per sampling period as mentioned above.

The processor 24 receives this input signal by 16-bit mantissa receiving register (not shown) each of right and left channels. At this time, the exponent receiving register (not shown) composed of 2-bit mantissa region and 6-bit exponent region is not provided with data and is empty. When the input into the mantissa receiving register is complete, the empty register is handled as 0, and the 16-bit fixed decimal point data each of right and left channels from the analog/digital converter 23 is converted into 24-bit floating decimal point data each of right and left channels composed of 18-bit mantissa portion and 6-bit exponent portion, and is processed arithmetically. The configuration of the reception system of the processor 24 is the same as that in the processor 25, of which details are described below.

The arithmetically processed floating decimal point data is stored in buffer registers 35, 36 for transfer of 24 bits each for right and left channels from data bus 39 through gates 37, 38. At this time, the 18-bit mantissa data of each channel is stored in regions A1, C1, D1, and regions A2, C2, D2, while the 6-bit exponent data is stored in region B1 and region B2. Of the 18-bit mantissa data, the data of upper 16 bits composed of 1-bit sign bit expressing the polarity stored in regions A1, A2 and 15-bit data stored in regions C1, C2 is stored in the shift registers 31, 32 for mantissa transmission of 16 bits each. Further, the 6-bit exponent data stored in regions B1, B2 and the lower 2-bit remaining mantissa data stored in regions D1, D2 are respectively stored in shift registers 33, 34 for exponent transmission of 8 bits each.

The data stored in the mantissa transmitting registers 31, 32, and exponent transmitting registers 3, 34 are transferred through lines 71, 72 from the output terminals 51, 52 individually provided for registers 31 and 32, 33 and 34 on the basis of the common clock signal SCLK and synchronous signal SYNC, to 16-bit exponent receiving registers 41, 42, and 8-bit exponent receiving registers 43, 44, from input terminals 61, 62 of the processor 25. Incidentally, the data is stored in the buffer registers 35, 36 at arbitrary timing, and data transfer from the buffer registers 35, 36 to the mantissa transmitting registers 31, 32 and to exponent transmitting registers 33, 34 is effected, for example, after every termination of data transfer from the mantissa transmitting registers 31, 32. The mantissa data transferred through the line 71 is indicated in FIG. 56 (4), and the exponent data and remaining mantissa data transferred through the line 72 is shown in FIG. 56 (5). The contents of the registers 41, 42, 43, 44 are stored in the buffer registers 45, 46 for transfer upon every termination of data transfer to the mantissa receiving registers 41, 42 and exponent receiving registers 43, 44. At this time, of the data transferred to the mantissa receiving registers 41, 42, sign bits of 1 bit each are stored in regions A3, A4 of buffer registers 45, 46, and the mantissa data of the remaining 15 bits each are stored in regions C3, C4 of the buffer registers 45, 46. Of the data transferred to the exponent receiving registers 43, 44, the exponent data of 6 bits each are stored in regions B3, B4 of buffer registers 45, 46, and the remaining mantissa data of 2 bits each are stored in regions D3, D4 of buffer registers 45, 46. The floating decimal point data of 24 bits each of right and left channels stored in the buffer registers 45, 46 are read out through gates 47, 48 at arbitrary timing, and are transferred through the data bus 49, and are processed arithmetically by an arithmetic processing circuit (not shown).

The floating decimal point data of 24 bits of each channel arithmetically processed are converted into data expressed only by the mantissa portion of 18 bits while the exponent portion is all 0, that is, fixed decimal point data. In the 18-bit mantissa data, the upper 16 bits are stored in the mantissa transmitting register (not shown) as mentioned above, and the 6-bit exponent data of all 0 and the remaining mantissa data of lower 2 bits are stored in the exponent transmitting register (not shown), and the 16-bit mantissa data stored in the mantissa transmitting register is transferred to the digital-/analog converter 26 in the lower stage as 16-bit fixed decimal point data according to the clock signal SCLK and synchronous signal SYNC. In this way, part of mantissa portion (in this embodiment, data of upper 16 bits each) in the floating decimal data is stored in the mantissa registers 31, 32 and 41, 42, whereas the exponent portion (data of 6 bits each in this embodiment) and the remaining portion of mantissa (lower 2 bits) are stored in the exponent registers 33, 34, and 43, 44, and terminals 51, 52, and 61, 42 are provided in order to enter and deliver the contents in the mantissa registers 31, 32, and 41, 42, and the contents in the exponent registers 33, 34, and 43, 44 individually, so that it is not necessary to use a special converting circuit if the bit number of the mantissa portion in the floating decimal point data is longer than the bit length of the fixed decimal point data handled externally thereby making it possible to process arithmetically and transfer on the basis of a common clock signal (in this embodiment, 32 pulse signals per sampling period). In the data transfer between processors 24 and 25, too, the floating decimal point data may be directly transferred in the same format, and if the processor is divided into a plurality depending on the content or quantity of the arithmetic processing, the same processing precision as in a single processor is obtained.

As explained in detail herein, according to the invention, if the bit number of the mantissa in the floating decimal point data for arithmetic processing is longer than the bit length of the fixed decimal point data handle externally, special converting circuitry is not needed, and it is possible to process arithmetically and transfer on a basis of a common clock signal, and the precision does not deteriorate.

FIG. 58 is a block diagram showing a structure of a sound signal processor 21 in an embodiment of the invention. An analog sound signal, for example, from a radio receiver entered from an input terminal 22 is converted into a digital signal in an analog/digital converter 23, and is supplied into a processor 24 realized by large scale integration or the like. At the processor 24, the input digital sound signal is processed arithmetically or by delay for the purpose of tone control or the like, and the output is sent into another processor 25. At this processor 25, a different arithmetic processing is carried out, and is thus processed digital sound signal is converted into an analog signal in a digital/analog converter 26, of which output is applied to a power amplifier or the like connected to an output terminal 27.

In the thus composed sound signal processor 21, if the output led out into the processor 24 from the analog/digital converter 23 and the output led out into the digital/analog converter 26 from the processor 25 are stereo signals, supposing the right and left channels to have 16 bits each, they are fixed decimal point data of 32 bits in total per sampling period. By contrast, in the processors 24, 25, in order to enhance the dynamic range and S/N ratio, the sound signal is composed of 16-bit mantissa portion and 4-bit exponent portion for each of the left and right channels, so that the sound signal is handled as floating decimal point data of 40 bits in total per sampling period in arithmetic processing and data transfer.

The processor 24, in order to store the input data, comprises a 32-bit mantissa receiving register A11 composed of 16-bit left channel cell A11a and 16-bit right channel cell A11b, and an 8-bit exponent receiving register A12 composed of 4-bit left channel cell A12a and 4-bit right channel cell A12b, in which the received data is given to a common contact 31 of a switch S11, and is selectively written into the mantissa receiving register A11 or exponent receiving register A12 respectively connected to the individual contacts 32, 33. The processor 24 also comprises a 32-bit mantissa transmitting register B11 composed of 16-bit left channel cell B11a and 16-bit right channel cell B11b, and an 8-bit exponent transmitting register B12 composed of 4-bit left channel cell B12a and 4-bit right channel cell B12b, in which the data from the mantissa transmitting register B11 or exponent transmitting register B12 is applied to the individual contacts 34, 35 of the switch S12, and is read out selectively from the common contact 36. The switching format of the switch S11 and switch S12 is controlled by a control circuit 38.

The processor 25 is composed the same as the processor 24, comprising a mantissa receiving register A21 composed of 16-bit left channel cell A21a and 16-bit right channel cell A21b, exponent receiving register A22 composed of 4-bit left channel cell A22a and 4-bit right channel cell A22b, manitssa transmitting register B21 composed of 16-bit left channel cell B21a and 16-bit right channel cell B21b, exponent transmitting register B22 composed of 4-bit left cell B22a and 4-bit right cell B22b, switches S21, S22, and control circuit 39. The control circuits 38 and 39 are coupled together by a line 40. The common contact 41 of the switch S21 is connected to the common contact 36 of the switch S12 through line 37, while one individual contact 42 is connected to the mantissa receiving register A21 and the other individual contact 43 is connected to the exponent receiving register A22. One individual contact 44 of the switch S22 is connected to the mantissa transmitting register B12 and the other individual contact 45 is connected to the exponent transmitting register B22, while the common contact 46 is connected to the digital-/analog converter 26. In FIG. 58, numerals 16, 4 shown in each register denote the number of bits in the store region of each register.

In this embodiment, at the processor 24 in the previous stage, the common contact 31 of the switch S11 keeps conduction with the individual contact 32, while at the processor 25 in the later stage, the common contact 46 of the switch S22 keeps conduction with the individual contact 44.

Therefore, the 32-bit fixed decimal point data from the analog/digital converter 23 is stored in the left and right channel cells A11a, A11b of the mantissa receiving register A11 of the processor 24, and is converted into 4-bit floating decimal point data, and is stored in the 4-bit register C11 composed of 20-bit left channel cell C11a and 20-bit right channel cell C11b. The data in the register C11 is arithmetically processed, and the data in the left channel cell C11a is stored in the left channel cell B11a of the mantissa transmitting register B11 and the left channel cell B12a of the exponent transmitting register B12, while the data in the right channel cell C11b of the register C11 is stored in the right channel cell B11b of the mantissa transmitting register B11 and right channel cell B12b of exponent transmitting register B12. While the switch S12 is conducting with the individual contact 34, the switch S21 is conducting with the individual contact 42, and while the switch S12 is conducting with the individual contact 35, the switch S21 is conducting with the individual contact 43. In this way, since the switching format of the switches S12, S21 is controlled in cooperation, the contents in the left and right channel cells B11a, B11b of the mantissa transmitting register B11 are respectively transferred to the left and right channel cells A21a, A21b of the mantissa receiving register A21, while the contents in the left and right channel cells B12a, B12b of the exponent transmitting register B12 are respectively transferred to the left and right channel cells A22a, A22b of the exponent receiving register A22.

In the processor 25, the left channel data received by the left channel cell A21a of the mantissa receiving register A21 and the left channel cell A22a of the exponent receiving register A22 is stored in the 20-bit left channel cell C21a of the register C21; while the right channel data received by the right channel cell A21b of the mantissa receiving register A21 and the right channel cell A22b of the exponent receiving register A22 is stored in the 20-bit right channel cell C21b of the register C21. Thus stored data are arithmetically processed, and converted into 32-bit fixed decimal point data, and is applied from the left and right channel cells B21a, B21b of the mantissa transmitting register B21 into the digital/analog converter 26.

By controlling the switching format of the switches S11, S12, S21, and S22 in this manner, the processors 24, 25 can share a same integrated circuit, and moreover this integrated circuit may be realized in a relatively simple circuit configuration, so that the cost for components may be reduced.

According to the invention, hence, since the mantissa register and exponent register can be selectively connected to terminals for transmission or terminals for reception, by the switching means controlled in switching format by control means, if the formats of the data transmitted are different, the circuit configuration can be commonly shared for transmission and reception, and therefore it is extremely advantageous for realizing the processor by integrated circuits in particular.

What is claimed is:

1. A data transfer apparatus for serially transferring input data from an external device or output data to an external device in the form of floating decimal point data, comprising:
   a mantissa shift register for storing a plurality of bits representing the mantissa of one or more floating decimal point data,
   an exponent shift register for storing a plurality of bits representing the exponent of said floating decimal point data, and
   terminals through which the mantissa and exponent of the floating decimal point are separately transferred to or from the external device,
   wherein a clock signal from a clock signal generating source is applied in common to the mantissa shift register and exponent shift register, and wherein the mantissa shift register and the exponent shift register rae operated in synchronism with each other.

2. A data transfer apparatus for serially transferring input data from an external device or output data to an external device in the form of floating decimal point data or fixed decimal point data, comprising:
   an exponent shift register for storing a plurality of bits representing the exponent of floating decimal point data; and
   a mantissa shift register for storing a plurality of bits representing fixed decimal point data or the mantissa of floating decimal point data having the same bits as said fixed decimal point data;
   wherein said fixed decimal point data is stored in the mantissa shift register when transferring said fixed decimal point data.

3. A data transfer apparatus according to claim 2, wherein during transfer of said fixed decimal point data, the exponent shift register holds different fixed decimal point data which is input or output as fixed decimal point data.

4. A data transfer apparatus for serially transferring input data from an external device or output data to an external device in the form of floating decimal point data or fixed decimal point data, comprising:
   a mantissa shift register for storing a plurality of bits representing the mantissa of floating decimal point data or a plurality of bits representing fixed decimal point data:
   an exponent shift register for selectively storing either the exponent of said floating decimal point data or other arbitrary data, said exponent shift register having the same bit length as said mantissa shift register, and
   terminals through which the contents of the mantissa shift register and the contents of the exponent shift register are separately transferred to or from an external device,
   wherein a clock signal from a clock signal generating source is applied in common to the mantissa shift register and the exponent shift register, and wherein the mantissa shift register and the exponent shift register are operated in synchronism with each other.

5. A data transfer apparatus for serially transferring input data from an external device or output data to an external device in the form of floating decimal point data or fixed decimal point data comprising:

a mantissa shift register consisting of a plurality of bits for storing a portion of the mantissa of floating decimal point data, an exponent shift register for storing plurality of bits representing the exponent portion of said floating decimal point data and for storing the remaining portion of the mantissa of said floating decimal point data, and terminals through which the contents in the mantissa shift register and the contents in the exponent shift register are separately transferred to or from the external device, wherein a clock signal from a clock signal generating source is applied in common to the mantissa shift register and exponent shift register, and wherein the mantissa shift register and exponent shift register are operated in synchronism with each other.

6. A data transfer apparatus for serially transferring input data from an external device or output data to an external device in the form of floating decimal point data comprising:

a mantissa shift register for sequentially storing the mantissa of each of a plurality of floating decimal point data, an exponent portion register for sequentially storing the exponent of each of said plurality of floating decimal point data, switching means for switching between the mantissa shift register and the exponent shift register for connection to a terminal for transfer to or from the external device, and control means for controlling the switching mode of the switching means.

* * * * *